United States Patent [19]
Lisniansky

[11] Patent Number: 5,794,437
[45] Date of Patent: Aug. 18, 1998

[54] REGENERATIVE ADAPTIVE FLUID MOTOR CONTROL

[76] Inventor: Robert Moshe Lisniansky, 8 Brighton 15-th St., Apt. 2J, Brooklyn, N.Y. 11235

[21] Appl. No.: 715,470

[22] Filed: Sep. 18, 1996

Related U.S. Application Data

[63] Continuation-in-part of Ser. No. 399,134, Mar. 6, 1995, abandoned, which is a continuation-in-part of Ser. No. 75,287, Jun. 11, 1993, abandoned, which is a continuation-in-part of Ser. No. 814,781, Dec. 30, 1991, abandoned, which is a continuation-in-part of Ser. No. 521,390, May 10, 1990, abandoned, which is a continuation-in-part of Ser. No. 291,431, Dec. 28, 1988, abandoned, which is a continuation-in-part of Ser. No. 1,514, Jan. 7, 1987, abandoned, which is a division of Ser. No. 704,325, Feb. 13, 1985, abandoned, which is a continuation-in-part of Ser. No. 318,672, Nov. 5, 1981, abandoned.

[51] Int. Cl.$^6$ ........................................ F16D 31/02

[52] U.S. Cl. .................. 60/414; 60/417; 60/419; 60/461; 60/451

[58] Field of Search .................. 60/413, 414, 417, 60/419, 461, 462, 493, 450, 451, 452; 91/520

[56] References Cited

U.S. PATENT DOCUMENTS

| | | | |
|---|---|---|---|
| 2,924,940 | 2/1960 | Covert et al. | 60/430 |
| 3,777,773 | 12/1973 | Tolbert | 91/361 |
| 3,882,896 | 5/1975 | Budzich | 91/446 |
| 4,118,149 | 10/1978 | Hagberg | 60/431 |
| 4,301,870 | 11/1981 | Carre et al. | 91/446 |
| 4,364,229 | 12/1982 | Shiber | 60/414 |
| 4,693,080 | 9/1987 | Van Hooff | 60/417 |

*Primary Examiner*—F. Daniel Lopez

[57] ABSTRACT

A regenerative adaptive fluid motor control system integrating a load adaptive fluid motor control system and a load adaptive energy regenerating system having an energy accumulator. The fluid motor control system includes a primary constant displacement pump powering a spool valve controlling a fluid motor accumulating a load related energy, such as a kinetic energy of a mass load of the fluid motor or a compressed fluid energy of the fluid motor-cylinder. The load related energy of the fluid motor is regenerated to provide a load adaptive exchange of energy between the fluid motor and the energy accumulator. This load adaptive exchange of energy is combined with a load adaptive primary energy supply for maximizing the over-all energy efficiency and performance potentials of the fluid motor control. The load adaptability is achieved by regulating the exhaust and supply fluid pressure drops across the spool valve. The regenerative adaptive fluid motor control can be used, for example, for constructing the high energy-efficient, load adaptive motor vehicles and the high energy-efficient, load adaptive hydraulic presses.

21 Claims, 27 Drawing Sheets

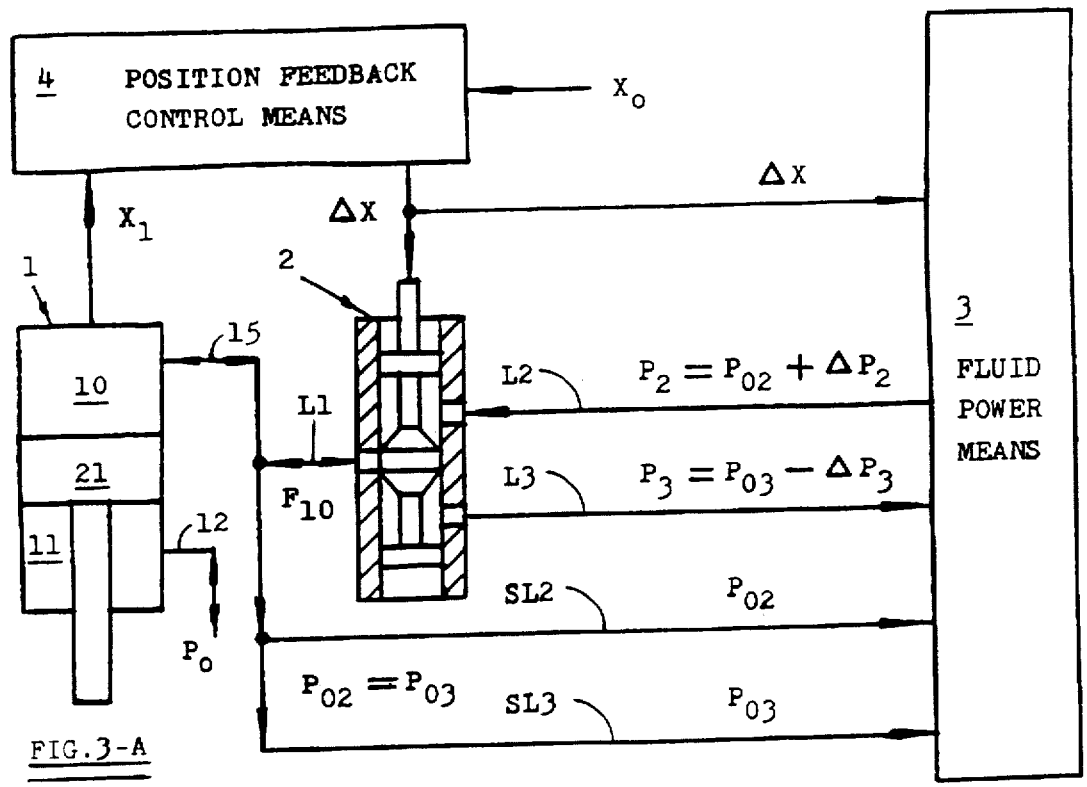
FIG.3-A
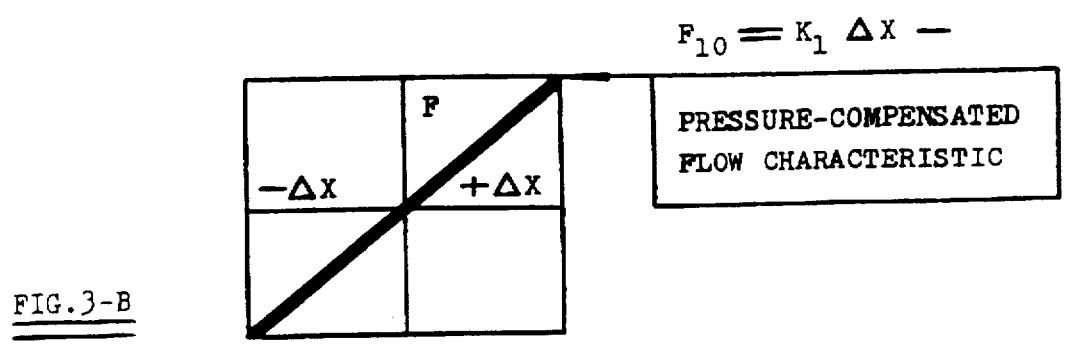
FIG.3-B

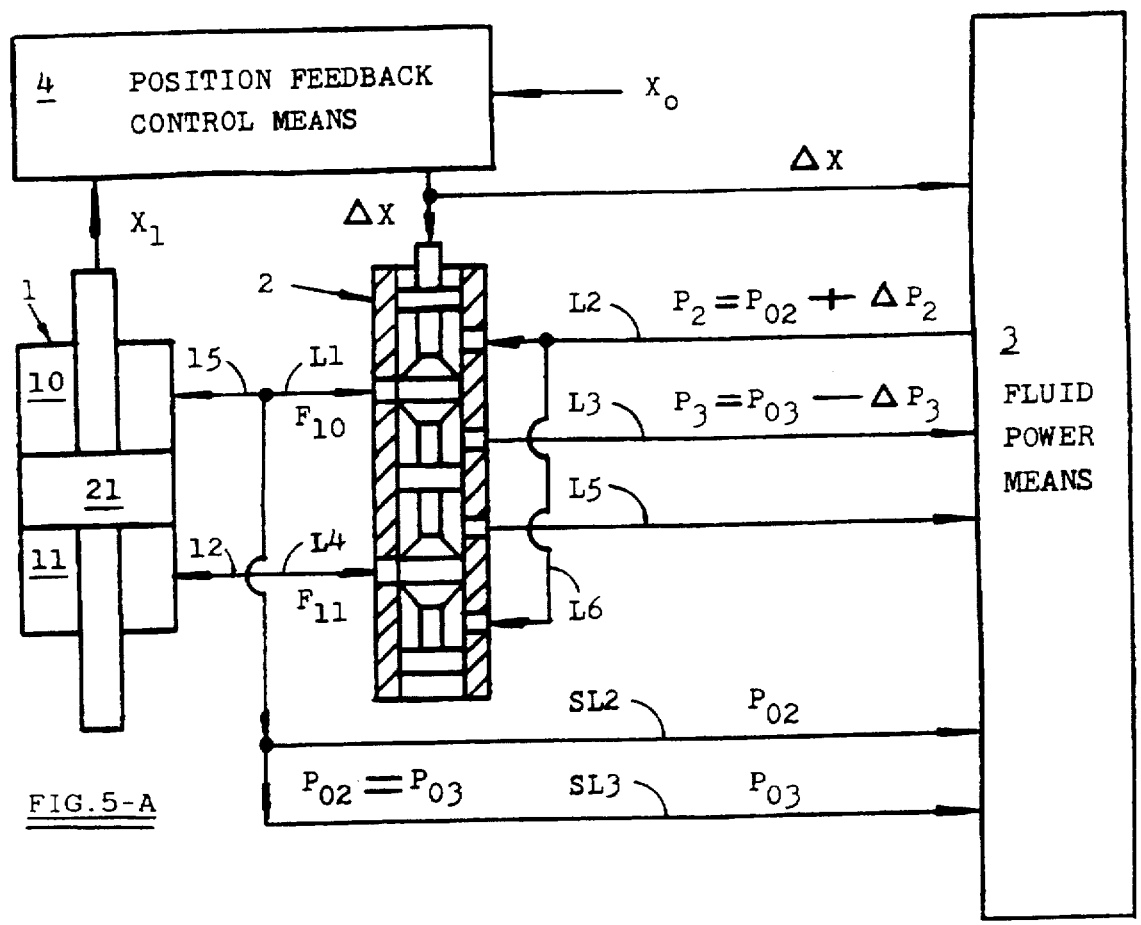
FIG.5-A
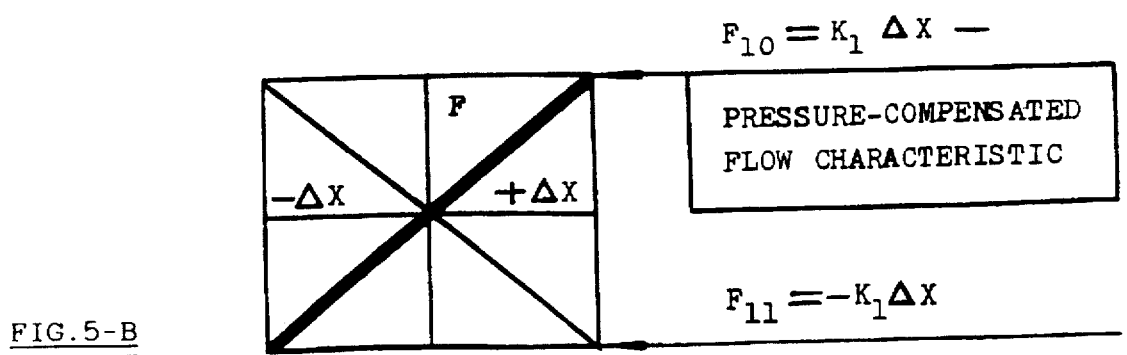
FIG.5-B

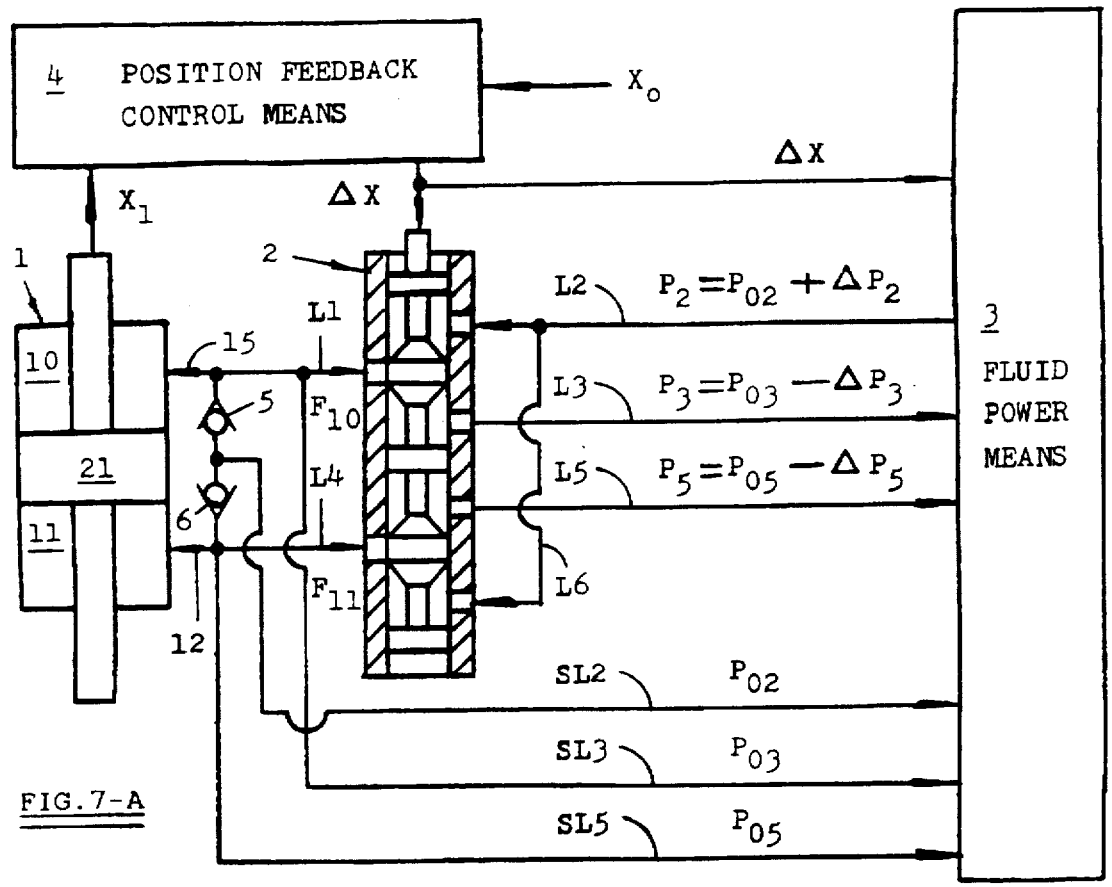
FIG.7-A
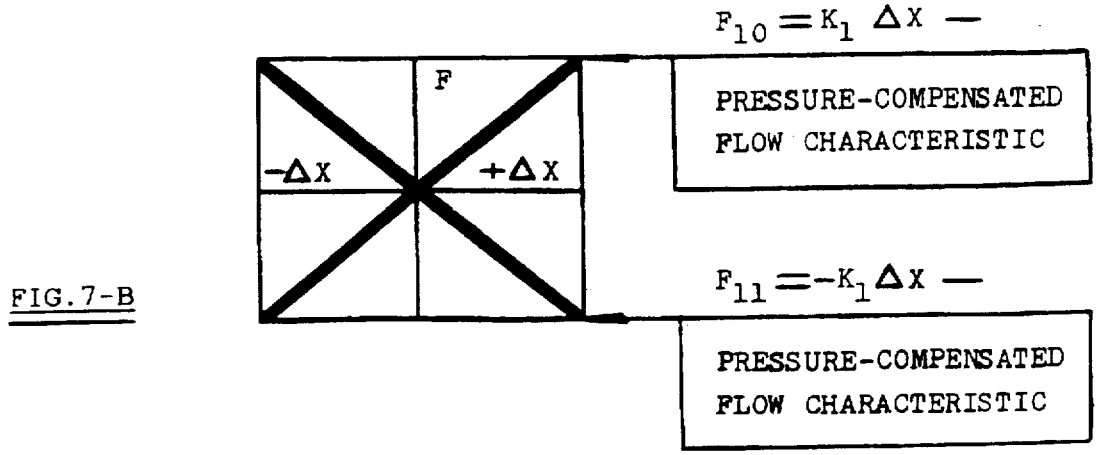
FIG.7-B

| THE EXAMPLIFIED STOP-AND-GO ENERGY-REGENERATING CIRCLE OF THE LOAD ADAPTIVE WHEELED VEHICLE | | | | | | |
|---|---|---|---|---|---|---|
| STAGE OF THE CIRCLE: THE WHEELED VEHICLE IS | LOAD OF THE FLUID MOTOR DRIVING THE WHEELS | APPROXIMATE LOAD PRESSURE SIGNALS | | | PRINCIPAL ANGULAR POSITION OF SWASHPLATE OF THE VARIABLE DISPLACEMENT MEANS | | THE LOAD RELATED ENERGY IS |
| | | $P_{O2}$ | $P_{O5}$ | | 196 OF ASSISTING PUMP 194 | 130 OF EXH. LINE PUMP 120 | |
| MOVING WITH A CONSTANT SPEED | POSITIVE | LARGE | VERY SMALL | | (*) ZERO ANGLE | SMALL NEGATIVE ANGLE | STORED ONLY BY THE VEHICLE |
| DECELERATED | NEGATIVE | ZERO | LARGE | | (**) ZERO ANGLE | REGULATED ANGLE | TRANSMITTED TO THE ACCUMULATOR |
| COMPLETELY STOPED | ZERO | ZERO | ZERO | | (**) ZERO ANGLE | SMALL NEGATIVE ANGLE | STORED ONLY BY THE ACCUMULATOR |
| ACCELERATED | POSITIVE | LARGE | VERY SMALL | | REGULATED ANGLE | SMALL NEGATIVE ANGLE | TRANSMITTED BACK TO THE VEHICLE |

*) THE ACCUMULATOR IS DISCHARGE.

**) THE SHUT-OFF VALVE IS CLOSED.

FIG. 25

REGENERATIVE ADAPTIVE FLUID MOTOR CONTROL

This is a continuation-in-part of application Ser. No. 08/399,134, filed Mar. 6, 1995, now abandoned, which is a continuation-in-part of application Ser. No. 08/075,287, filed Jun. 11, 1993, now abandoned, which is a continuation-in-part of application Ser. No. 07/814,781, filed Dec. 30, 1991, now abandoned, which is a continuation-in-part of application Ser. No. 07/521,390, filed May 10, 1990, now abandoned, which is a continuation-in-part of application Ser. No. 07/291,431, filed Dec. 28, 1988, now abandoned, which is a continuation-in-part of application Ser. No. 07/001,514, filed Jan. 7, 1987, now abandoned, which is a divisional of application Ser. No. 06/704,325, filed Feb. 13, 1985, now abandoned, which is a continuation-in-part of application Ser. No. 06/318,672, filed Nov. 5, 1981, now abandoned.

FIELD OF THE INVENTION

The present invention relates primarily to a fluid motor position feedback control system, such as the electrohydraulic or hydromechanical position feedback control system, which includes a fluid motor, a primary variable displacement pump, and a spool type directional control valve being interposed between the motor and the pump and being modulated by a motor position feedback signal. More generally, this invention relates to the respective fluid motor output feedback control systems and to the respective fluid motor open-loop control systems. In a way of possible applications, this invention relates, in particular, to the hydraulic presses and the motor vehicles.

BACKGROUND ART: TWO MAJOR PROBLEMS

The hydraulic fluid motor is usually driving a variable load. In the variable load environments, the exhaust and supply fluid pressure drops across the directional control valve are changed, which destroys the linearity of a static speed characteristic describing the fluid motor speed versus the valve spool displacement. As a result, a system gain and the related qualities, such as the dynamic performance and accuracy, are all the functions of the variable load. Moreover, an energy efficiency of the position feedback control is also a function of the variable load.

The more the load rate and fluctuations, and the higher the performance requirements, the more obvious are the limitations of the conventional fluid motor position feedback control systems.

In fact, the heavy loaded hydraulic motor is especially difficult to deal with when several critical performance factors, such as the high speed, accuracy, and energy efficiency, as well as quiet operation, must be combined. A hydraulic press is an impressive example of the heavy loaded hydraulic motor-mechanism. The load conditions are changed substantially within each press circle, including approaching the work, compressing the fluid, the working stroke, decompressing the fluid, and the return stroke.

A more comprehensive study of the conventional fluid motor position feedback control systems can be found in numerous prior art patents and publications—see, for example:

a) Johnson, J. E., "Electrohydraulic Servo Systems", Second Edition, Cleveland, Ohio: Penton/IPC, 1977.
  b) Merritt, H. E., "Hydraulic Control Systems". New York—London—Sydney: John Wiley & Sons, Inc., 1967.
  c) Lisniansky, R. M., "Avtomatika e Regulirovanie Gidravlicheskikh Pressov". Moscow: Mashinostroenie, 1975 (this book had been published in Russian only).

The underlying structural weakness of the conventional fluid motor position feedback control systems can be best characterized by saying that these systems are not adaptive to the changing load environments.

The problem of load adaptability of the conventional electrohydraulic and hydromechanical position feedback control systems can be more specifically identified by analyzing two typical hydraulic schematics.

The first typical hydraulic schematic includes a three-way directional control valve in combination with the two counteractive (expansible) chambers. The first of these chambers is controlled by said three-way valve which is also connected to the pressure and tank lines of the fluid power means. The second chamber is under a relatively constant pressure provided by said pressure line. In this case, it is not possible to automatically maintain a supply fluid pressure drop across the three-way valve without a "schematic operation interference" with the position feedback control system. Indeed, maintaining the supply fluid pressure drop can be achieved only by changing the pressure line pressure, which is also applied to the second chamber and, therefore, must be kept approximately constant.

The second typical schematic includes a four-way directional control valve in combination with the two counteractive chambers. Both of these chambers are controlled by the four-way valve which is also connected to the pressure and tank lines of the fluid power means. In this schematic, it is not possible to automatically maintain an exhaust fluid pressure drop across the four-way valve without encountering the complications which can also be viewed as a schematic operation interference with the position feedback control system. Indeed, a chamber's pressure signal which is needed for maintaining the exhaust fluid pressure drop, must be switched over from one chamber to the other in exact accordance with a valve spool transition through a neutral spool position, where the chamber lines are switched over, to avoid damaging the spool valve flow characteristics. In addition, a pressure differential between the two chambers at the neutral spool position will affect the pressure drop regulation and may generate the dynamic unstability of the position feedback control system.

The problem of load adaptability can be still further identified by emphasizing a possible dynamic operation interference between the position feedback control and the regulation of the exhaust and supply fluid pressure drops.

The problem of load adaptability can be still further identified by emphasizing a possible pressure drop regulation interference between the supply and exhaust line pressure drop feedback control systems.

The structural weakness of the conventional fluid motor position feedback control systems can be still further characterized by that these systems are not equipped for regenerating a load related energy, such as a kinetic energy of a load mass or a compressed fluid energy of the fluid motor-cylinder. As a result, this load related energy is normally lost. The problem of load adaptive regeneration of energy is actually correlated with the problem of load adaptability of the fluid motor position feedback control system, as it will be illustrated later.

Speaking in general, the problem of load adaptability and the problem of load adaptive regeneration of energy are two major and interconnected problems which are to be solved consecutively by this invention, in order to create a regenerative adaptive fluid motor position feedback control system and, finally, in order to create a regenerative adaptive fluid motor output feedback control system and a regenerative adaptive fluid motor open-loop control system.

SUMMARY OF THE INVENTION

The present invention is primarily aimed to improve the performance qualities and energy efficiency of the fluid motor position feedback control system, such as the electrohydraulic or hydromechanical position feedback control system, operating usually in the variable load environments. The improvement of performance qualities, such as the dynamic performance and accuracy, is the first concern of this invention, while the improvement of energy efficiency is the second but closely related concern.

This principal object is achieved by:

(a) shaping and typically linearizing the flow characteristics of the directional control valve by regulating the supply and exhaust fluid pressure drops across this valve;

(b) regulating the hydraulic fluid power delivered to the directional control valve, in accordance with, but above, what is required by the fluid motor;

(c) preventing a schematic operation interference between the regulation of said pressure drops and the position feedback control;

(d) preventing a dynamic operation interference between the regulation of said pressure drops and the position feedback control (as it will be explained later);

(e) preventing a pressure drop regulation interference between the supply and exhaust line pressure drop feedback control systems (as it will also be explained later).

The implementation of these interrelated steps and conditions is a way of transition from the conventional fluid motor position feedback control systems to the load adaptive fluid motor position feedback control systems. These load adaptive systems can generally be classified by the amount of controlled and loadable chambers of the fluid motor, by the spool valve design configurations, and by the actual shape of the spool valve flow characteristics.

In a case when only one of two counteractive chambers of the fluid motor is controllable, the fluid motor can be loaded only in one direction. The controlled chamber is connected to the three-way spool valve which also has a supply power line and an exhaust power line. In this case, the second chamber is under a relatively constant pressure supplied by an independent source of fluid power.

In a case when both chambers are controllable, the fluid motor can be loaded in only one or in both directions. The controlled chambers are connected to a five-way spool valve which also has a common supply power line and two separate exhaust power lines. When the fluid motor is loaded in only one direction, only one of two exhaust lines is also a counterpressure line. When the fluid motor is loaded in both directions, both exhaust lines are used as counterpressure lines.

Using the three-way or five-way spool valve with a separate exhaust line for each controllable chamber, makes it possible to prevent a schematic operation interference between the position feedback control and the regulation of pressure drops. In particular, the problem of measuring a chamber's pressure signal is eliminated. Each counterpressure line is provided with an exhaust line pressure drop regulator, which is modulated by an exhaust line pressure drop feedback signal which is measured between this counterpressure line and the related chamber.

In the process of maintaining the supply fluid pressure drop across the spool valve, a supply fluid flow rate is being monitored continuously by a supply line pressure drop regulator which by passes the primary constant displacement pump (or pumps). Maintaining the supply fluid pressure drop is also helpful for regulating the hydraulic power delivered to the spool type directional control valve, as it will be explained still further later.

In the process of maintaining the exhaust fluid pressure drop across the spool valve, all the flow is being released from the counterpressure line through the exhaust line pressure drop regulator to the tank. Counterpressure may be created in the counterpressure line only for a short time while the hydraulic fluid in the preloaded chamber is being decompressed. However, the control over the decompression is critically important for improving the system's dynamic performance potential.

A family of load adaptive fluid position servomechanisms may include the three-, four-, five-, and six-way directional valves. The three-way spool valve is used to provide the individual pressure and counterpressure lines for only one controllable chamber. The six-way spool valve is used to provide the separate supply and exhaust lines for each of two controllable chambers. The five-way spool valve can be derived from the six-way spool valve by connecting together two separate supply lines. The four-way spool valve can be derived from the five-way spool valve by connecting together two separate exhaust lines. The four-way spool valve does create a problem of schematic operation interference between the position feedback control and the regulation of pressure drops, as it is already explained above. However, the principal possibility of using the four-way spool valve in the adaptive position servomechanisms is not excluded.

What is in common for the adaptive fluid position servomechanisms being considered is that the fluid motor is provided with at least one controlled and loadable chamber, and that this chamber is provided with the pressure-compensated spool valve flow characteristics. These pressure-compensated flow characteristics are shaped by the related exhaust line pressure drop feedback control system which includes the exhaust line pressure drop regulator and by the related supply line pressure drop feedback control system which includes the primary variable displacement pump.

The desired (linear or unlinear) shape of the spool valve flow characteristics is actually implemented by programming the supply and exhaust line pressure drop command signals of the supply and exhaust line pressure drop feedback control systems, respectively. Some possible principals of programming these command signals are illustrated below.

(1) The supply and exhaust line pressure drop command signals are set approximately constant for linearizing the pressure-compensated spool valve flow characteristics. The related adaptive hydraulic (electrohydraulic or hydromechanical) position servomechanisms can be referred to as the linear adaptive servomechanisms, or as the fully-compensated adaptive servomechanisms. Still other method of programming the pressure drop command signals can be specified with respect to the linear adaptive servomechanisms, as it is illustrated below—by points 2 to 5.

(2) The supply line pressure drop command signal is being increased slightly as the respective load pressure rate is increased, so that to provide at least some overcompensation along the supply power line.

(3) The supply line pressure drop command signal is being reduced slightly as the respective load pressure rate is increased, so that to provide at least some undercompensation along the supply power line.

(4) The exhaust line pressure drop command signal is being increased slightly as the respective load pressure rate is increased, so that to provide at least some undercompensation along the exhaust power line.

(5) The exhaust line pressure drop command signal is being reduced slightly as the respective load pressure rate is increased, so that to provide at least some overcompensation along the exhaust power line.

It is understood that the choice of flow characteristics do not effect the basic structure and operation of the load adaptive fluid motor control systems. For this reason and without the loss of generality, in the following detailed description, the linear adaptive servomechanisms are basically considered.

It is a further object of this invention to develop a concept of load adaptive regeneration of a load related energy, such as a kinetic energy of a load mass or a compressed fluid energy of the fluid motor-cylinder. This is achieved by replacing the exhaust line pressure drop regulator by a counterpressure varying and energy recupturing means (such as an exhaust line variable displacement motor or an exhaust line constant displacement motor driving an exhaust line variable displacement pump), by replacing the exhaust line pressure drop feedback control system by an energy recupturing pressure drop feedback control system, and finally, by creating a load adaptive energy regenerating system including fluid motor and load means and energy accumulating means.

It is still further object of this invention to develop a concept of load adaptive exchange of energy between the fluid motor and load means and the energy accumulating means of the load adaptive energy regenerating system. The load adaptive regeneration of the load related energy of the fluid motor and load means can be viewed as a part (or as a larger part) of a complete circle of the load adaptive exchange of energy between the fluid motor and load means and the energy accumulating means.

It is still further object of this invention to develop a regenerative adaptive fluid motor position feedback control system which is an integrated system combining the load adaptive fluid motor position feedback control system and the load adaptive energy regenerating system.

It is still further object of this invention to develop a regenerative adaptive fluid motor output feedback control system and a regenerative adaptive fluid motor open-loop control system. In general, the regenerative adaptive fluid control makes it possible to combine the load adaptive primary power supply and the load adaptive regeneration of energy for maximizing the over-all energy efficiency and performance potentials of the fluid motor control systems.

It is still further object of this invention to develop the high energy-efficient, load adaptive hydraulic presses utilizing the regenerative adaptive fluid control.

It is still further object of this invention to develop the high energy-efficient, load adaptive motor vehicles utilizing the regenerative adaptive fluid control.

It is still further object of this invention to develop the high energy-efficient, load adaptive City Transit Buses utilizing the regenerative adaptive fluid control.

Further objects, advantages, and futures of this invention will be apparent from the following detailed description when read in conjunction with the drawings.

BRIEF DESCRIPTION OF THE DRAWINGS

FIG. 3-A is a generalization of FIG. 1.

FIG. 3-B illustrates the flow characteristics of valve 2.

FIG. 5-A is a generalization of FIG. 4.

FIG. 5-B illustrates the flow characteristics of valve 2.

FIG. 7-A is a generalization of FIG. 6.

FIG. 7-B illustrates the flow characteristics of valve 2.

FIG. 25 illustrates a stop-and-go energy regenerating circle.

DESCRIPTION OF THE INVENTION

GENERAL LAYOUT AND THEORY

Introduction: Adaptive fluid position feedback control.

Figure 1:
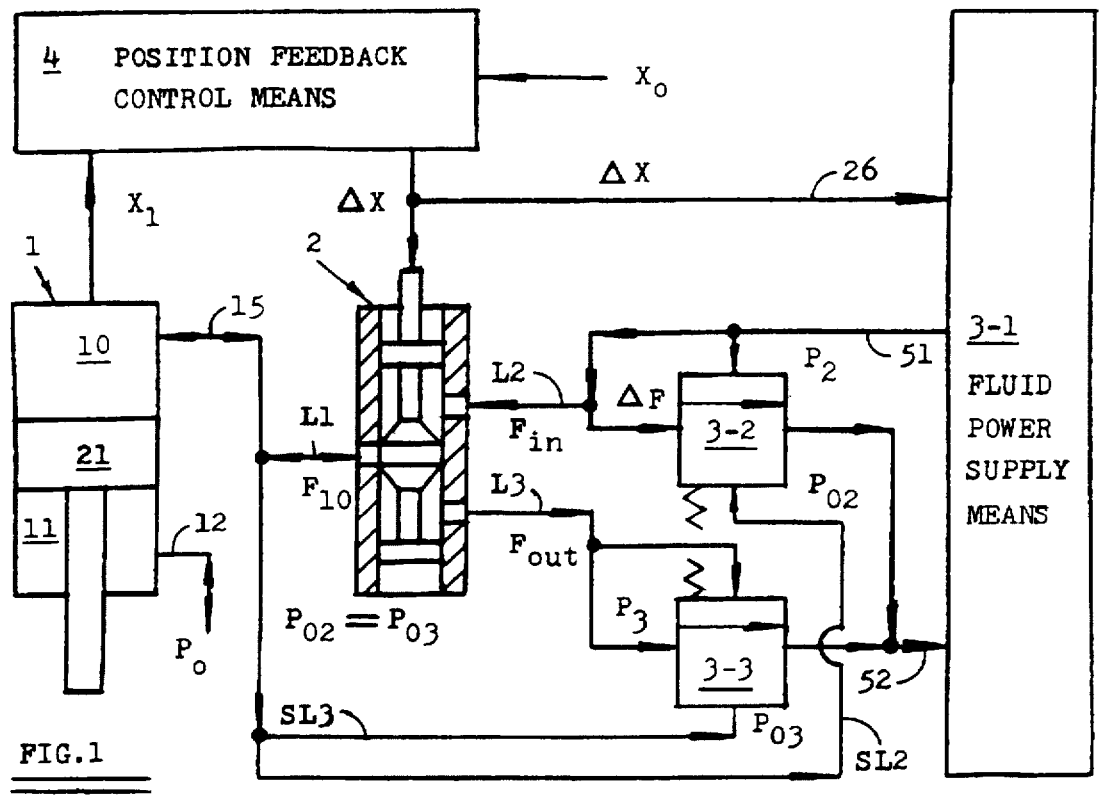
FIG. 1 shows the adaptive fluid servomechanism having only one controllable chamber.

FIG. 1 shows a simplified schematic of the load adaptive fluid motor positioned feedback control system having only one controllable chamber. The moving part 21 of the fluid motor-cylinder 1 is driven by two counteractive expansible chambers—chambers 10 and 11, only one of which—chamber 10—is controllable and can be loaded. The second chamber—chamber 11—is under a relatively low (and constant) pressure $P_o$ supplied by an independent pressure source. This schematic is developed primarily for the hydraulic press type applications. As is already mentioned above, the load conditions are changed substantially within each press circle including approaching the work, compressing the fluid (in chamber 10), the working strock, decompressing the fluid (in chamber 10), and the return strock.

The schematic of FIG. 1 further includes the hydraulic power supply means 3-1 having a primary variable displacement pump powering the pressure line 51. The three-way spool-type directional control valve 2 is provided with three hydraulic power lines including a motor line—line L1—connected to line 15 of chamber 10, the supply power line L2 connected to pressure line 51, and the exhaust power line L3. Lines L2 and L3 are commutated with line L1 by the spool valve 2. To consider all the picture, FIG. 1 should be studied together with the related-supplementary FIGS. 2, 3-A, and 3-B.

The block 4 represents a generalized model of the optional position feedback control means. This block is needed to actually make-up the fluid motor position feedback control system, which is capable of regulating the motor position $X_1$ of motor 1 by employing the motor position feedback signal $CX_1$, where coefficient "C" is, usually, constant. The motor position feedback signal $CX_1$ is generated by a motor position sensor, which is included into block 4 and is connected to the moving part 21 of the hydraulic fluid motor 1.

An original position feedback control error signal $\Delta X_{or}$ is produced as a difference between the position input-command signal $X_o$ and the motor position feedback signal $CX_1$. There are at least two typical fluid motor position feedback control systems—the electrohydraulic and hydromechanical position feedback control systems. In the electrohydraulic system, the equation $\Delta X_{or}=X_o-CX_1$ or the like is simulated by electrical means located within block 4. In the hydromechanical system, the equation $\Delta X_{or}=X_o-CX_1$ or the like is simulated by mechanical means located within block 4.

The block 4 may also include the electrical and hydraulic amplifiers, an electrical torque motor, the stabilization—optimization technique and other components to properly amplify and condition said signal $\Delta X_{or}$ for modulating said valve 2. In other words, the original position feedback control error signal $\Delta X_{or}$ is finally translated into a manipulated position feedback control error signal $\Delta X$ which can be identified with the valve spool displacement $\Delta X$ from the neutral spool position $\Delta X=0$.

In general, it can be said that the manipulated position feedback control error signal $\Delta X$ is derived in accordance with a difference between the position input-command signal $X_o$ and the output position signal $X_1$. At the balance of the position feedback control: $\Delta X_{or}=X_o-CX_1 \cong 0$ and, hence, $\Delta X \cong 0$. On the other hand and for simplicity, it can also be often assumed that $\Delta X \cong X_o-CX_1$.

This principal characterization of the optional position feedback control means is, in fact, well known in the prior art and will be extended to still further details later.

The exhaust line pressure drop regulator 3-3 is introduced to make up the exhaust line pressure drop feedback control system which is capable of regulating the exhaust fluid pressure drop across valve 2 by varying the counterpressure rate $P_3$ in the exhaust power line L3. This exhaust fluid pressure drop is represented by the exhaust line pressure drop feedback signal, which is equal $P_{O3}-P_3$ and is measured between the exhaust power line L3 and the related exhaust signal line SL3 connected to line L1.

The regulator 3-3 is connected to the exhaust power line L3 and to the tank line 52 and is modulated by an exhaust line pressure drop feedback control error signal, which is produced in accordance with a difference between the exhaust line pressure drop command signal $\Delta P_3$ and the exhaust line pressure drop feedback signal $P_{O3}-P_3$.

The supply line pressure drop regulator 3-2 is introduced to make-up the supply line pressure drop feedback control system, which is capable of regulating the supply fluid pressure drop across valve 2 by varying the pressure rate $P_2$ in the supply power line L2. This supply fluid pressure drop is represented by the supply line pressure drop feedback signal, which is equal $P_2-P_{O2}$ and is measured between the supply power line L2 and the related supply signal line SL2 connected to line L1. The supply line (by-pass) pressure drop regulator 3-2 is connected to the supply power line L2 and to the tank line 52 and is modulated by a supply line pressure drop feedback control error signal, which is produced in accordance with a difference between the supply line pressure drop command signal $\Delta P_2$ and the supply line pressure drop feedback signal $P_2-P_{O2}$.

The schematic shown on FIG. 1 operates as follows. At the balance of the motor position feedback control: $\Delta X \cong X_o - CX_1=0$. When the hydraulic fluid motor 1 is moving from the one position $X_1$ to the other, the motor speed is defined by the valve spool displacement $\Delta X \cong X_o - CX_1$ from the neutral spool position $\Delta X=0$. The system performance potential is substantially improved by providing the linearity of the spool valve flow characteristic $F=K_1 \Delta X$, where $K_1$ is the constant coefficient and F is the fluid flow rate to $(F_{in})$ or the fluid flow rate from $(F_{out})$ the controllable chamber 10. This linearity is achieved by applying the supply line pressure drop command signal $\Delta P_2$=constant and the exhaust line pressure drop command signal $\Delta P_3$=constant to the supply line pressure drop feedback control system and the exhaust line pressure drop feedback control system, respectively.

The pressure maintained in the supply power line L2 by the supply line pressure drop feedback control system is $P_2=P_{O2}+\Delta P_2$ and can be just slightly above what is required for chamber 10 to overcome the load.

On the other hand, the counterpressure maintained in the exhaust power line L3 by the exhaust line pressure drop feedback control system is $P_3=P_{O3}-\Delta P_3$ and can be just slightly below the pressure $P_{O3}=P_{O2}$ in chamber 10. However, there are some limits for acceptable reduction of the pressure drop command signals $\Delta P_2$ and $\Delta P_3$.

The pressure drop command signals $\Delta P_2$ and $\Delta P_3$, the pressure $P_o$ and their interrelationship are selected for linearising the spool valve flow characteristic $(F=K_1 \Delta X)$ without "running a risk" of full decompressing the hydraulic motor (chamber 10) and generating the hydraulic shocks in the hydraulic system. Some of the related considerations are:

1. The pressure $P_o$ has to compress the hydraulic fluid in chamber 10 to such an extent as to prevent the full decompression under the dynamic operation conditions.

In the absence of static and dynamic loading, the pressure $P_{10}$ in chamber 10 is fixed by the pressure $P_o$ applied to chamber 11 so that $P_{10}=K_o P_o$, where $K_o$ is the constant coefficient.

9

2. The pressure drop command signal $\Delta P_3$ is selected as:
$\Delta P_3 = P_{10} = K_o P_o$.

Under this condition, the pressure drop $P_{O3}-P_3=\Delta P_3$ can be maintained even during the return stroke. Indeed, after decompressing the preloaded chamber 10, the regulator 3-3 is open ($P_3=0$), but the pressure drop $P_{O3}-0=\Delta P_3=K_o P_o$ is still maintained simply by approximately constant pressure $P_o$.

3. If the passages of the spool valve 2 are symmetrical relative to the point $\Delta X=0$, the pressure drop command signals $\Delta P_2$ and $\Delta P_3$ are to be approximately equal. In this case:

$$\Delta P_2 = \Delta P_3 = P_{10} = K_0 P_0 = \frac{P_{2min}}{2}, \quad (1)$$

where:

$P_{2min}$ is the minimum pressure rate maintained in line L2 by the supply line pressure drop feedback control system.

4. The smaller pressure drop command signals $\Delta P_2$ and $\Delta P_3$, the larger spool valve 2 is required to conduct the given fluid flow rate.

The regulator 3-3 is opened by a force of the spring shown on FIG. 1 and is being closed to provide the counterpressure $P_3$ only after the actual pressure drop $P_{O3}-P_3$ exceeds its preinstalled value $\Delta P_3$, which is defined by the spring force. Practically, at the very beginning of the return stroke, when the regulator 3-3 has to enter into the operation, the controllable chamber 10 is still under the pressure.

It means that regulator 3-3 is preliminarily closed and is ready to provide the counterpressure $P_3$, which is being maintained by regulator 3-3 only for a short time of decompressing chamber 10. However, the control over the decompression is critically important for improving the system's dynamic performance potential.

Figure 2:
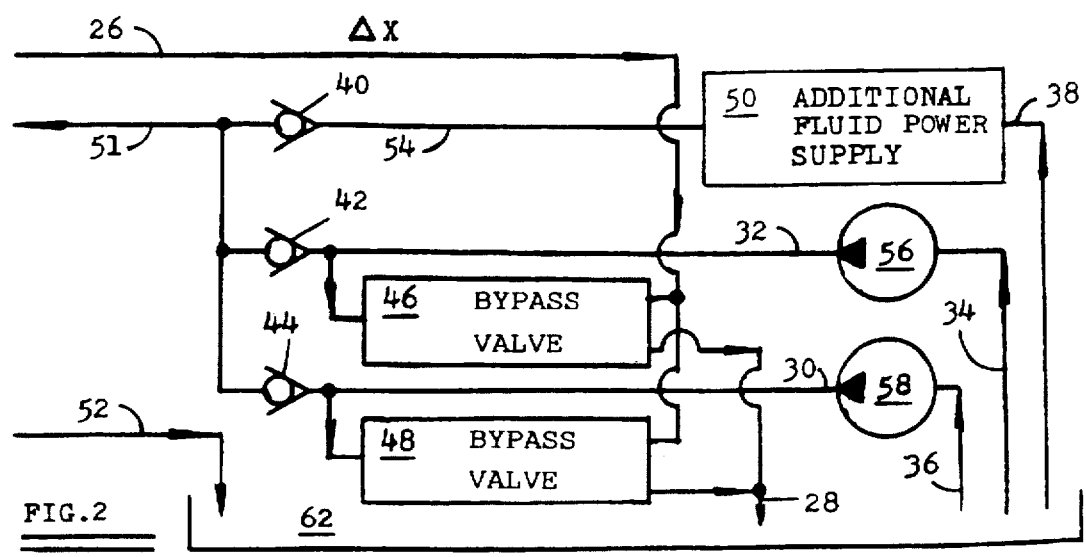
FIG. 2 shows a power supply schematic version.

The schematic shown on FIG. 2 is a disclosure of block 3-1 shown on FIG. 1. This schematic includes the primary constant displacement pumps 56 and 58, is connected through check valves 42 and 44 to the common pressure line 51. This schematic also includes the controllable bypass (discharge) velves 46 and 48 connected to the pressure lines 32 and 30 of constant displacement pumps and to the tank line 28. A relatively low pressure, high capacity power supply 50 (such as a centrifugal pump) is connected through check valve 40 to the pressure line 51. The primary motors, usually electrical motors, driving the pumps are not shown on FIG. 2. The pressure line 51 is protected by the maximum pressure relief valve which is not shown on FIG. 2.

The linear flow characteristic $F=K_1\Delta X$ of valve 2 can also be written as $\Delta X=KF$, where $K=1/K_1$ is the constant coefficient. The signal $\Delta X=KF$, shown on FIG. 1 as directed to block 3-1, is finally applied to the bypass (discharge) valves 46 and 48, in order to regulate the total fluid flow rate of the constant displacement pumps, switched over to line 51, in approximately direct proportion to the valve spool displacement $\Delta X$ from the neutral spool position $\Delta X=0$. Generally, there could be several constant displacement pumps. One of the constant displacement pumps has to operate all the time, in order to pressurize line 51 even at the neutral point $\Delta=0$.

The total fluid flow rate of the constant displacement pumps, switched over to line 51, must be always above the fluid motor requirement for any given spool displacement $\Delta X$, in order to provide the by-passing fluid flow rate $\Delta F$, which is being released constantly from the line 51 through regulator 3-2 to the tank line 52. In a simple case, only two constant displacement pumps are left: the first pump being operated all the time and the second pump being controlled

10 by the spool displacement signal $\Delta X$, as explained above. If only one pump is left, the signal $\Delta X$ is not applicable.

Maintaining the pressure drop $P_2-P_{02}=\Delta P_2$ is the first step in improving the system energy efficiency. Regulating the total fluid flow rate, as explained above, is the second step in the same direction. Finally, these two steps make it possible to regulate the fluid power delivery to valve 2 in accordance with but above, what is required for the fluid motor 1.

The valves 46 and 48 can be constructed as electrically or mechanically controlled bypass valves. In a case of using the electrically controlled—on-off bypass valves, the signal modulating these valves is electrical, and these bypass valves can be physically separated from valve 2. In a case of using mechanically controlled bypass valves, the signal modulating these valves is mechanical, and the spool of valve 2 can be connected directly with the spools of bypass valves.

In accordance with FIG. 2, a relatively low pressure fluid from the high capacity fluid power supply 50 is introduced through check valve 40 into the pressure line 51 to increase the speed limit of the hydraulic cylinder 1 (FIG. 1), as the pressure rate in line 51 is sufficiently declined. Actually, the hydraulic power supply 50 is being entered into the operation just after the spool of valve 2 passes its critical point, beyond which the pressure $P_2$ in line 51 is dropped below the minimum regulated pressure $P_{2min}$.

The schematic shown on FIG. 1 is assymmetrical, relative to the chambers 10 and 11. The functional operation of this schematic can be still better visualized by considering its generalized model, which is presented on FIG. 3-A and is accompanied by the related pressure-compensated flow characteristic $F_{10}=K_1\Delta X$ of valve 2. The fluid power means 3 shown on FIG. 3-A, combine the fluid power supply means 3-1 and the regulators 3—3, which are shown on FIG. 1. The concept of preventing a substantial schematic operation interference.

Figure 4:
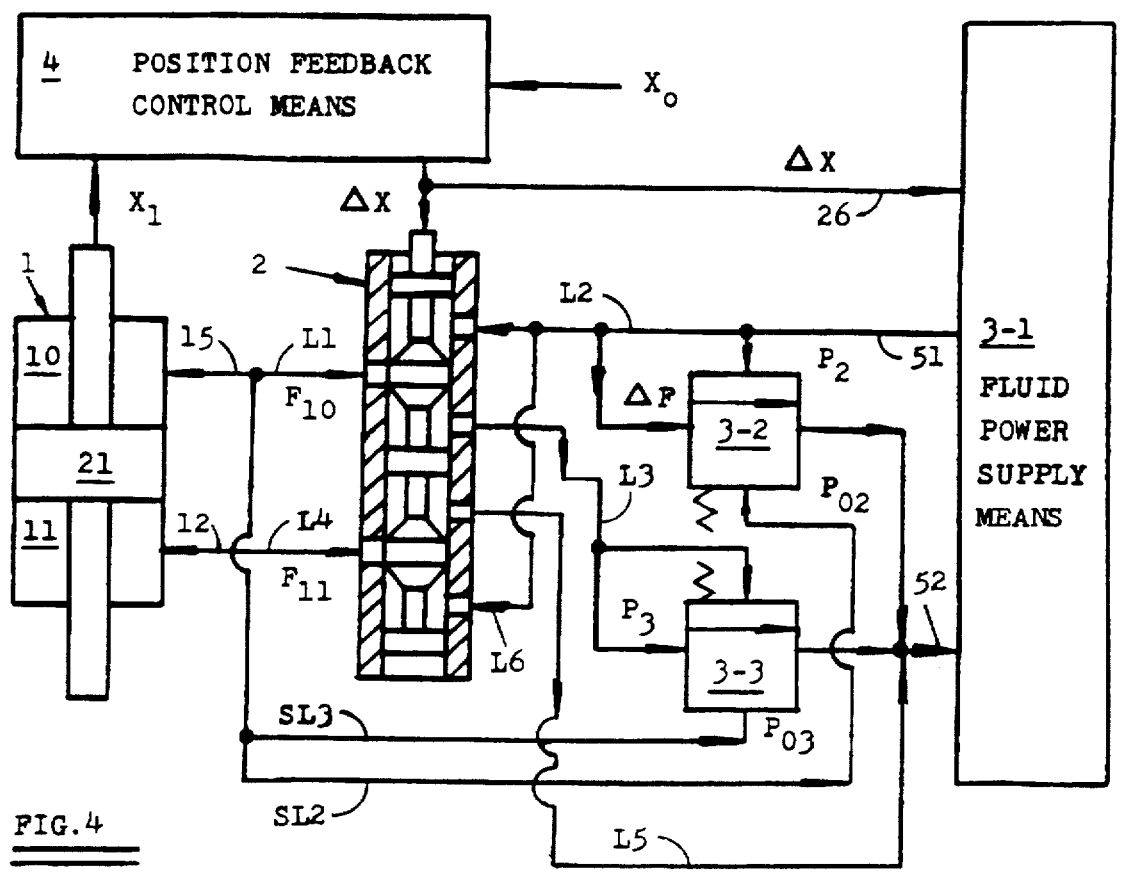
FIG. 4 shows the adaptive fluid servomechanism having two controllable chambers but loadable only in one direction.

FIG. 4 shows a simplified schematic of the load adaptive fluid motor position feedback control system having two controllable chambers but loadable only in one direction. This schematic is also developed primarily for the hydraulic press type applications, is provided with the five-way spool valve 2, and is easily understood when compared with FIG. 1. The line 12 of chamber 11 is connected to line L4 of valve 2. The loadable chamber 10 is controlled as before. The chamber 11 is commutated by valve 2 with the supply power line L6 and with the "unregulated" separate exhaust line L5. The supply power line L6 is connected to line L2 but is also considered to be "unregulated", because the supply signal line SL2 is communicated (connected) only with chamber 10. The exhaust line L5 is, in fact, the tank line. In this case, equation (1) can be generalized as:

$$\Delta P_2 = \Delta P_3 = P_{10} = P_{11} = \frac{P_{2min}}{2}, \quad (2)$$

where:

$P_{10}$ and $P_{11}$ are the pressures in chambers 10 and 11, respectively, at the absence of static and dynamic loading.

The pressures $P_{10}$ and $P_{11}$ have to be high enough to prevent the full decompression of chambers 10 and 11 under the dynamic operation conditions. On the other hand, the pressure drop command signals $\Delta P_2$ and $P\Delta P_3$ have to be small enough to improve the system energy efficiency.

The schematic shown on FIG. 4 is assymmetrical, relative to the chambers 10 and 11. The functional operation of this schematic can be still better visualized by considering its generated model, which is presented on FIG. 5-A and is accompanied by the related flow characteristics $F_{10}=K_1\Delta X$ and $F_{11}=K_1\Delta X$ of valve 2. The first of these flow characteristics is pressure-compensated. The fluid power means 3 shown on FIG. 5-A, combine the fluid power supply means 3-1 and the regulator 3-3, which are shown in FIG. 4.

Figure 6:
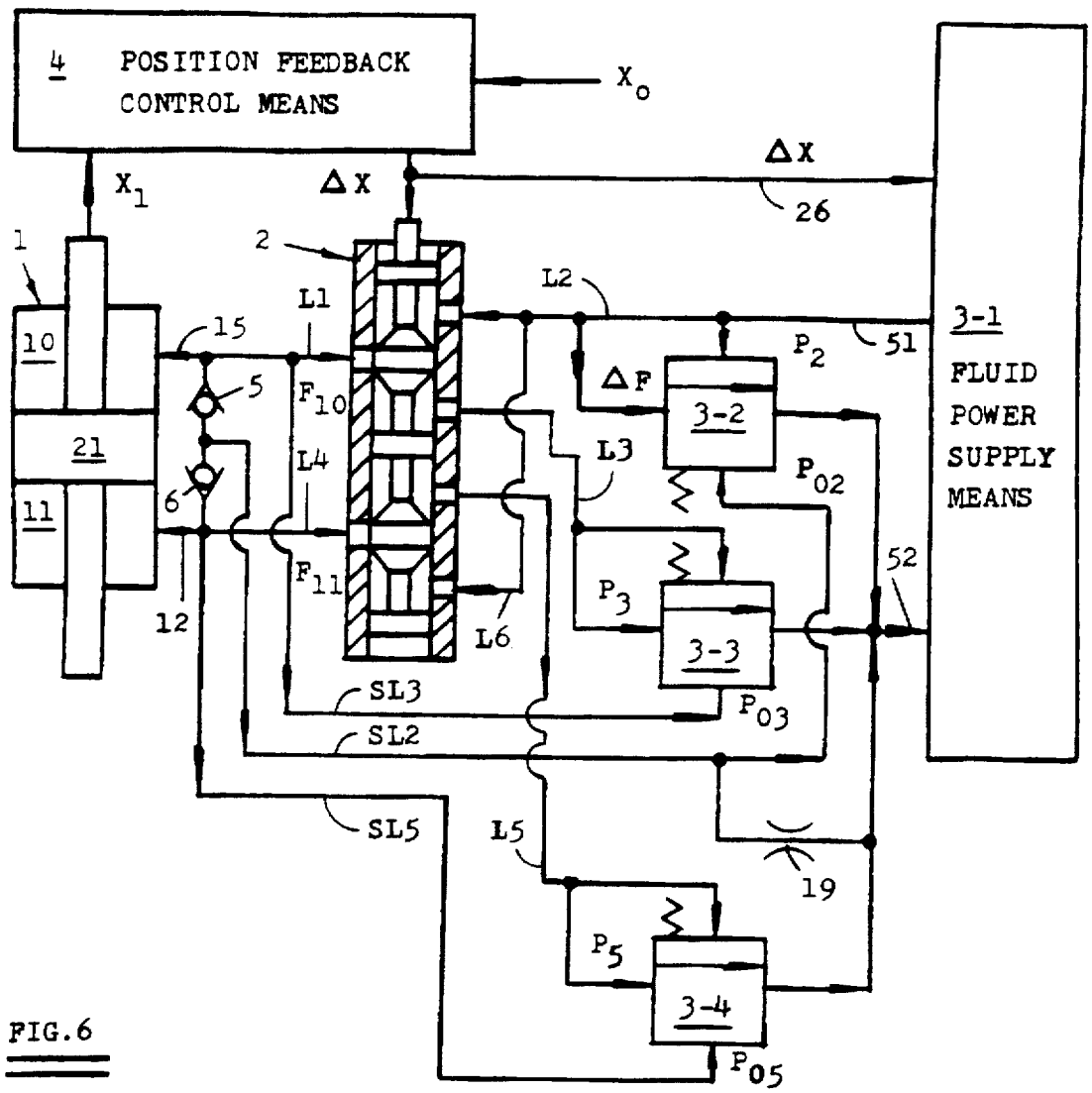
FIG. 6 shows the adaptive fluid servomechanism having two controllable chambers and loadable in both directions.

The schematic shown on FIG. 6 is related to the load adaptive hydraulic position servomechanism having two controllable chambers and loadable in both directions. This schematic is provided with the five-way spool valve and is easily understood when compared with FIG. 4. The loadable chamber 10 is controlled as before except that the supply signal line SL2 is communicated (commutated) with chamber 10 through check valve 5. The second loadable chamber—chamber 11—is commutated by valve 2 with the supply power line L6 and with the exhaust power line L5. The line L6 is connected to line L2. The supply signal line SL2 is also communicated (commutated) with chamber 11 through check valve 6.

The exhaust line L5 is a separate counterpressure line which is provided with an additional exhaust line pressure drop feedback control system including an additional exhaust line pressure drop regulator 3-4 which is shown on FIG. 6. The related exhaust signal line SL5 transmitting signal $P_{O5}$, is connected to line 12 of chamber 11. The counterpressure maintained in line L5 by the additional exhaust line pressure drop feedback control system, is: $P_5=P_{O5}-\Delta P_5$, where $\Delta P_5$ is the related pressure drop command signal.

The check valve logic makes it possible for the line SL2 to select one of two chambers, whichever has the higher pressure rate, causing no problem for maitaining the supply fluid pressure drop across valve 2, as well as for the dynamic stability of the fluid motor position feedback control system. A very small throttle valve 19 connecting line SL2 with the tank line 52, is helpfull in extracting signal $P_{O2}$.

The schematic shown on FIG. 6 is symmetrical, relative to the chambers 10 and 11. The functional operation of this schematic can be still better visualized by considering its generalized model, which is presented on FIG. 7-A and is accompanied by the related pressure-compensated flow characteristics $F_{10}=K_1\Delta X$ and $F_{11}=-K_1\Delta X$ of valve 2. The fluid power means 3 shown on FIG. 7-A, combine the fluid power supply means 3-1, the regulators 3-3, 3-4, and the small throttle valve 19, which are shown on FIG. 6.

Of course, the linear flow characteristics shown on FIG. 3-B, FIG. 5-B, and FIG. 7-B, are only the approximations of the practically expected flow characteristics of valve 2, while they are not saturated.

The motor load which is not shown on the previous schematics, is applied to the moving part 21 of the hydraulic fluid motor 1. This load is usually a variable load, in terms of its magnitude and (or) direction, and may generally include the static and dynamic components. The static loading components are the one-directional or two-directional forces. The dynamic (inertia) loading component is produced by accelerating and decelerating a load mass (including the mass of moving part 21) and is usually a two-directional force. If the fluid motor 1 is loaded mainly only in one direction by a static force, the schematic of FIG. 1 or FIG. 4 is likely to be selected. If the fluid motor 1 is loaded substantially in both directions by the static forces, the schematic of FIG. 6 is more likely to be used.

What is in common for schematics shown on FIG. 3-A, FIG. 5-A, and FIG. 7-A, is that fluid motor 1 is provided with at least one controlled and loadable chamber, and that this chamber is provided with the pressure-compensated spool valve flow characteristics. This idea can be best illustrated by a model of FIG. 8 which is a generalization of FIG. 3-A, FIG. 5-A, and FIG. 7-A. The block 5 of FIG. 8 combines fluid motor means (the fluid motor 1) and spool valve means (the spool valve 2), which are shown on previous schematics.

It is understood that load adaptive fluid motor position feedback control systems being considered are not limited to the hydraulic press type applications. As the supply and exhaust power lines L2, L3, L5, L6 are commutated with the chamber lines L1 L4, the related signal lines SL2, SL3, SL5, SL6 must be communicated accordingly with the same chamber lines L1, L4.

The communication of signal lines SL2, SL3, SL5, SL6 with the chambers can be provided by connecting or commutating these signal lines with the chambers. Having the separate supply and exhaust power lines for each controllable chamber, as well as having only one loadable chamber, makes it possible to eliminate the need for commutating these signal lines.

Finally, it can be concluded that:

1. Providing a separate exhaust power line for each controllable chamber is a basic precondition for preventing a substantial schematic operation interference between the pressure drop feedback control systems and the fluid motor position feedback control system. This schematic operation interference may lead to the dynamic instability of the fluid motor position feedback control system, as it was already explained before.

2. By virtue of providing the separate exhaust power lines L3 and L5, the need for commutating the related signal line SL3 and SL5 is eliminated, as it is illustrated by FIGS. 4 and 6.

3. In a case of having only one controllable chamber, the commutation of supply signal line SL2 is not needed, as it is illustrated by FIG. 1.

4. In a case of having only one loadable chamber, the commutation of supply signal line SL2 can be avoided, as it is illustrated by FIG. 4.

5. In a case of having two loadable chambers, the commutation of supply signal line SL2 can be accomplished by such commutators as follows:

(a) the commutator using check valves 5 and 6 and being operated by the pressure differential between the power lines of motor 1, as it is illustrated by FIG. 6;

(b) the commutator using an additional directional control valve which is operated by the spool of valve 2.

6. In accordance with point 5, the schematic of FIG. 6 can be modified by replacing the first-named commutator by the second-named commutator. The modified schematic is of a very general nature and is applicable to the complex load environments.

Position feedback control means.

It should be noted that transition from the conventional fluid position servomechanisms to the load adaptive fluid position servomechanisms does not change the part of the system which is outlined by block 4. The optional physical structure of the position feedback control means is disclosed in numerous prior art patents and publications describing the conventional fluid motor position feedback control systems and the related position feedback control technique—see, for example, the above named books and also:

a) Davis, S. A., and B. K. Ledgerwood, "Electromechanical Components for Servomechanisms". New York: McGraw-Hill, 1961.

b) Wilson, D. R., Ed., "Modern Practice in Servo Design". Oxford-New York-Toronto-Sydney-Braunschweig: Pergamon Press, 1970.

c) Analog Devices, Inc. "Analog-Digital Conversion Handbook", Edited by Sheingold D. H., Third Edition. Englewood Cliffs, N.J.; Prentice-Hall, 1986.

d) D'Souza, A. F., "Design of control systems". Englewood Cliffs, N.J.: Prentice-Hall, 1988.

It should also be noted that the electrical position feedback control circuitry of electrohydraulic position servomechanisms is quite similar to that of electromechanical position servomechanisms. It is to say that in the case of electrohydraulic position servomechanisms, the electrical portion of block 4—including the optional position sensor but excluding the electrical torque motor—can also be characterize by the analogy with the comparable portion of the electric motor position feedback control systems—see, for example, the books already named above.

In accordance with the prior art patents and publications, the above brief description of block 4 is further emphasized and extended by the comments as follows:

1. The motor position $X_1$ is the position of moving part 21 (piston, shaft and so on) of the fluid motor 1. In fact, the motor position $X_1$ can also be viewed as a mechanical signal—the output position signal of the fluid motor position feedback control system being considered.

2. The motor position $X_1$ is measured by the position feedback control means due to the position sensor, which is included into block 4 and is connected to the moving part 21 of the fluid motor 1.

3. In the electrohydraulic position servomechanisms, an electromechanical position sensor can be analog or digital. The analog position sensor employs an analog transducer, such as a linear variable differential transformer, a synchro transformer, a resolver and so on. The digital position sensor may include a digital transducer, such as an optical encorder. The digital position sensor can also be introduced by an analog-digital combination, such as the resolver and the resolver-to-digital converter—see, for example, chapter 14 of the above named book of Analog devices, Inc.

4. It is to say that in the electrohydraulic, analog or digital, position servomechanisms, the motor position feedback signal $CX_1$ (or the like) is generated by the electromechanical sensor in a form of the electrical, analog or digital, signal, respectively.

5. It is also to say that in the electrohydraulic, analog or digital, position servomechanisms, the position input-command signal $X_o$ is also the electrical, analog or digital, signal, respectively. The position input-command signal $X_o$ can be generated by a variety of components—from a simple potentiometer to a computer.

6. In the hydromechanical position servomechanisms, the mechanical position sensor is simply a mechanical connection to the moving part 21 of the fluid motor 1. In this case, the motor position feedback signal $CX_1$ is a mechanical signal. The position input-command signal $X_o$ is also a mechanical signal.

7. In accordance with explanations given previously:

(a) the original position feedback control error signal $\Delta X_{or}$ is produced as a difference between the position input-command signal $X_o$ and the motor position feedback signal $CX_1$;

(b) the original position feedback control error signal $\Delta X_{or}$ is finally translated into the manipulated position feedback control error signal $\Delta X$;

(c) it can be said that the manipulated position feedback control error signal $\Delta X$ is derived in accordance with a difference between the position input-command signal $X_o$ and the output position signal $X_1$;

(d) the manipulated feedback control error signal $\Delta X$ is a mechanical signal, which is identified with the spool displacement of valve 2 from the neutral spool position $\Delta X \equiv 0$.

8. In the electrohydraulic position servomechanisms, the spool of valve 2 is most often actuated through the hydraulic amplifier of the position feedback control means. The spool valve 2, the hydraulic amplifier, and the electrical torque motor are usually integrated into what is called an "electrohydraulic servovalve".

9. In the hydromechanical position servomechanisms, the spool of valve 2 is also most often actuated through the hydraulic amplifier of the position feedback control means. The spool valve 2 and the hydraulic amplifier are usually integrated into what is called a "servovalve".

10. Still more comprehensive description of the optional position feedback control means (block 4) can be found in the prior art patents and publications including the books already named above.

A concept of load adaptive regeneration of energy.

Figure 9:
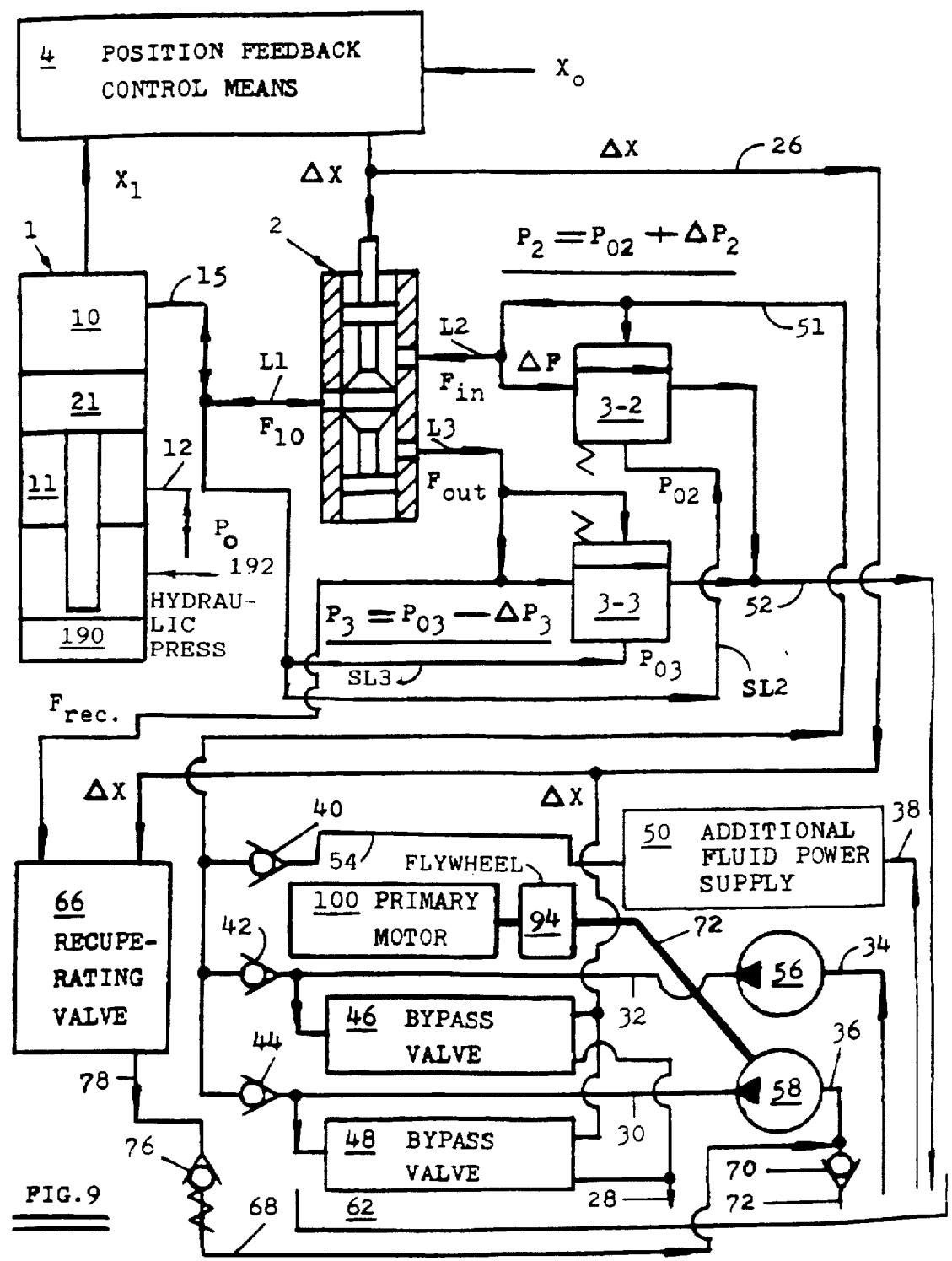
FIG. 9 illustrates the concept of load adaptive regeneration of energy.

In the applications, like high-speed short-stroke hydraulic presses, where a potential energy associated with the compressed hydraulic fluid is substantial in defining the system energy efficiency, a recuperation of this energy can be justified. FIG. 9 is basically a combination of FIG. 1 and FIG. 2. However, there are some new components including: a recuperating valve 66, the related check valves 76 and 70, and a fly wheel 94 which is attached to a "common shaft" 72 of a primary motor 100 and the pump 58. The recuperating valve 66 is connected to line L3 of valve 2 and to line 78 of check valve 76 and is controlled by the spool displacement signal $\Delta X$. The spring loaded check valve 76 is also connected through line 68 to line 36 of pump 58. The recuperating valve 66 can be constructed, for example, as the electrically controlled, spool-type, on-off valve, which is open while the spool displacement signal $\Delta X$ is relatively large. The spring loaded check valve 76 is open while the exhaust fluid pressure is relatively high.

During the decompression of chamber 10, the exhaust fluid is directed from line L3 through recuperating valve 66 and check valve 76 into line 36 of pump 58 which is operating as a motor. The check valve 70 is closed by the exhaust fluid pressure. As a result, the exhaust fluid energy from the exhaust power line L3 of the exhaust line pressure drop feedback control system is converted into kinetic energy of the pump motor 58 and the related rotated mass including fly wheel 94. This kinetic energy is finally reused through the supply power line L2 by the supply line pressure drop feedback control system. FIG. 9 also shows the frame 190 (of hydraulic press 192), against which the chamber 10 of cylinder 1 is loaded.

The concept of load adaptive regeneration of energy is further illustrated by considering the load adaptive, position feedback controlled, variable speed drive systems for the motor vehicle type applications (see FIGS. 10 and 11), where a kinetic energy associated with a mass of the motor vehicle is substantial in defining the over-all energy efficiency. It will be shown that load adaptability of these efficient and flexible drive systems, makes it easy to create the schematic conditions under which the energy accumulated during decelerating the motor vehicle is reused for accelerating the vehicle.

It is understood that availability of the motor position input-command signal $X_o$, makes it possible not only to regulate the fluid motor position $X_1$, but also to control the fluid motor velocity. It is now assumed, for simplicity, that motor vehicle is moving only in a horizontal direction.

Figure 10:
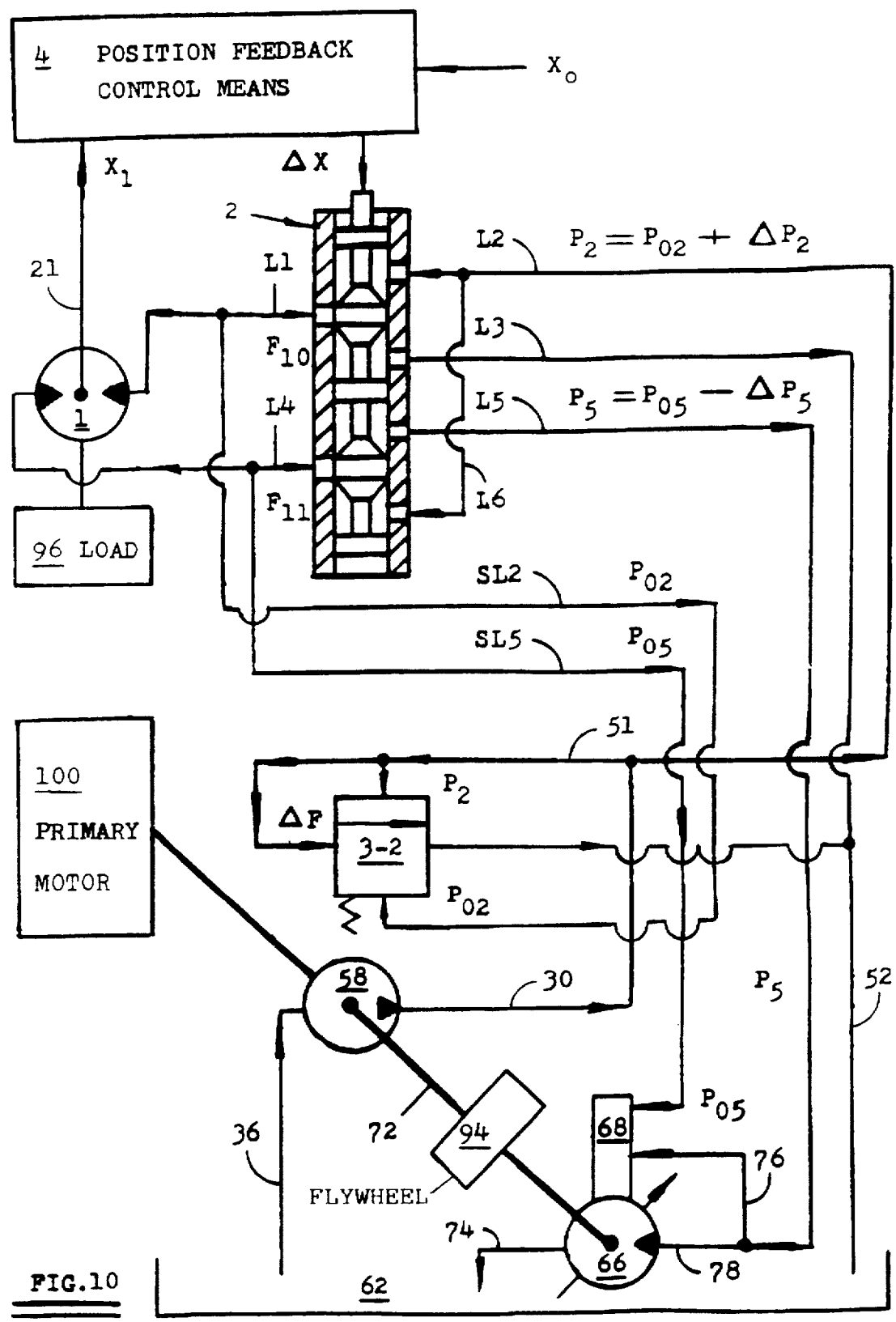
FIG. 10 shows the adaptive fluid servomechanism having a built-in energy regenerating circuitry.
Figure 11:
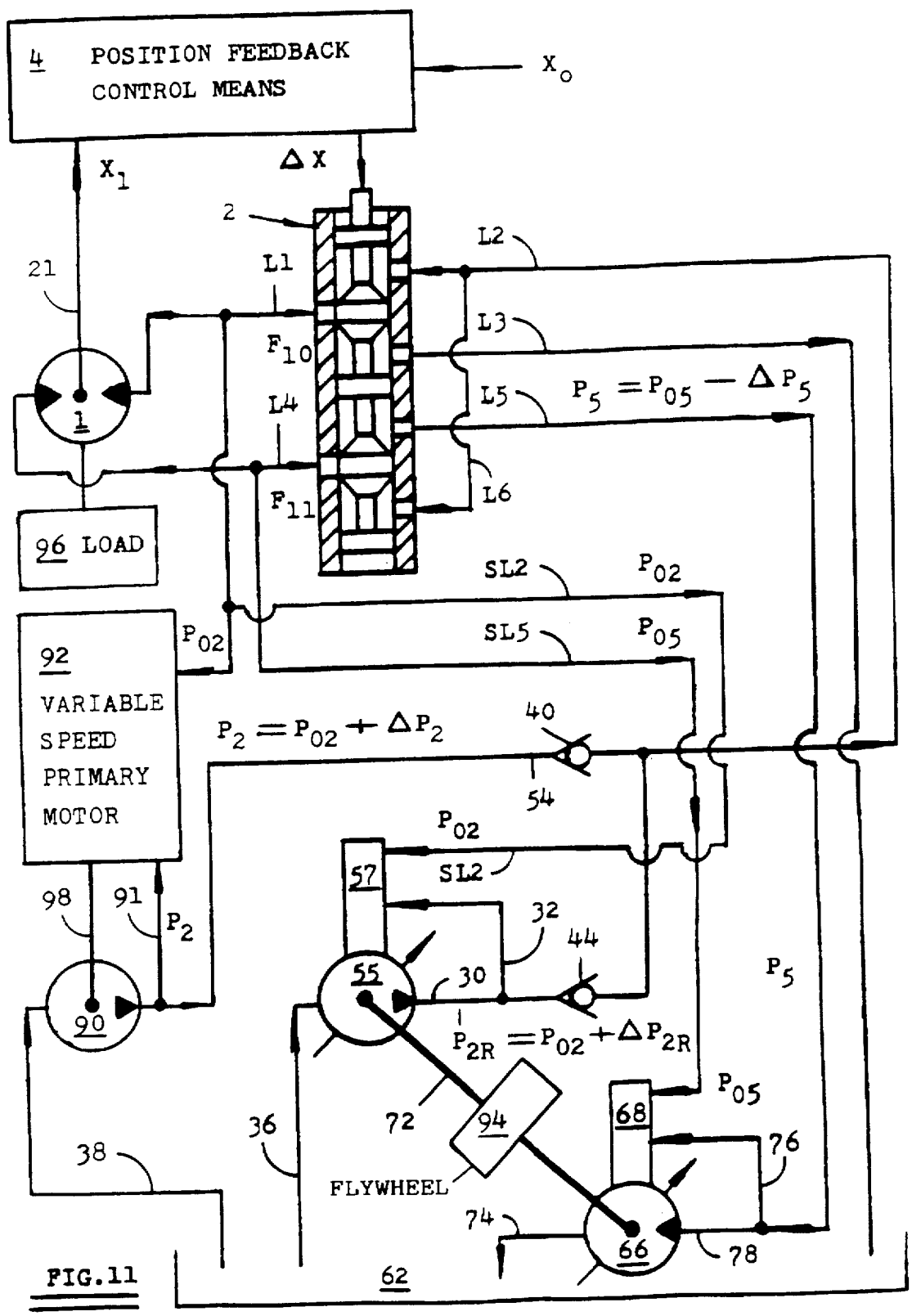
FIG. 11 shows the adaptive fluid servomechanism having an independent energy regenerating circuitry.

Accordingly, it is also assumed that five-way spool valve 2 is working now as a one-directional valve—it's spool can be moved only down from the neutral spool position and can be returned back to the neutral spool position only (which is shown on FIGS. 10 and 11). Note that FIGS. 10 and 11 are used only for a further study of load adaptive regeneration of energy. The related velocity feedback control (FIG. 16) and especially the related open-loop control (FIGS. 17 to 22, and 26) are, of course, more likely to be used for the motor vehicle type applications.

In general, the load adaptive, position feedback controlled, variable speed drive systems may incorporate a built-in regenerating circuitry or an independent regenerating circuitry. The drive system incorporating the built-in regenerating circuitry is shown on FIG. 10 which is originated by combining FIG. 6 and FIG. 2. However, the fluid power supply of FIG. 2 is represented on FIG. 10 mainly by pump 58. The regulator 3-3 is not needed now and, therefore, is not shown on FIG. 10. On the other hand, the regulator 3-4 is replaced by a variable displacement motor 66 having a variable displacement means 68, tank line 74, and pressure line 78 which is connected to line L5. The hydraulic cylinder 1 shown on FIG. 6 is replaced by the rotational hydraulic motor 1 which is loaded by a load 96 representing a mass of the motor vehicle. The fly wheel 94 is attached to the common shaft 72 connecting pump 58, motor 66, and the primary motor 100 of the motor vehicle. The variable displacement means 68 is modulated by the exhaust line pressure drop feedback signal, which is equal $P_{O5}-P_5$ and is measured between the line L5 (through line 76) and the related signal line SL5. The exhaust line pressure drop feedback control system including the variable displacement motor 66, regulates the exhaust fluid pressure drop $P_{O5}-P_5$ across spool valve 2 by varying the counter-pressure $P_5=P_{O5}-\Delta P_5$ in the exhaust power line L5 by the variable displacement means 68. In a simple case, the motor position command signal $X_o$ being varied with the constant speed, will generate a relatively constant velocity of motor 1 and the positional lag $\Delta X$ proportional to this velocity. In general, the shaft velocity of motor 1 can be controlled by the speed of varying the motor position command signal $X_o$. During the deceleration of the motor vehicle, the kinetic energy accumulated by a mass of the motor vehicle (load 96) is transmitted through motor 66 to the fly wheel 94. During the following acceleration of the motor vehicle, the kinetic energy accumulated by fly wheel 94 is transmitted back through pump 58 to the motor vehicle. The exchange of kinetic energy between the motor vehicle (load 96) and the flywheel 94 is correlated with the fly wheel speed fluctuations. It is assumed that a speed-torque characteristic of the primary motor 100 (such as the electrical motor or the internal-combustion engine) is soft enough to allow these fly wheel speed fluctuations.

The load adaptive, position feedback controlled, variable speed drive system having an independent regenerating circuitry is shown on FIG. 11, which can be considered as the further development (or modification) of FIG. 10. In this drive system, a variable speed primary motor 92 of the motor vehicle is not connected to shaft 72 but is driving the shaft 98 of a variable displacement primary pump 90. The tank line 38 of pump 90 is connected to tank 62. The pressure line 54 of pump 90 is connected through check valve 40 to the supply power line L2.

The variable speed primary motor 92, the related speed control circuitry which is meant to be included into block 92, and the constant displacement primary pump 90 are all included into the primary supply line pressure drop feedback control system. The variable speed primary motor 92 is modulated by the primary supply line pressure drop feedback signal $P_2-P_{O2}$ which is measured between line 54 (line 91) and line SL2. As a result, the primary supply line pressure drop feedback control system is capable of maintaining the primary supply fluid pressure drop $P_2-P_{O2}$ across spool valve 2 by varying the primary pressure rate $P_2=P_{O2}+\Delta P_2$ in the supply power line 54 by varying the speed of the variable speed primary motor 92, such as the internal-combustion engine or the electrical motor.

On the other hand, the pump 58, shown on FIG. 10 is replaced on FIG. 11 by an assisting variable displacement pump 55 having an assisting variable displacement means 57 to make up an assisting supply line pressure drop feedback control system. The line 36 of pump 55 is connected to tank 62. The pressure line 30 of pump 55 is connected through check valve 44 to line L2. The assisting variable displacement means 57 is modulated by an assisting supply line pressure drop feedback signal $P_{2R}-P_{O2}$, which is measured between line 30 (through line 32) and line SL2. As a result, the assisting supply line pressure drop feedback control system is capable of maintaining the assisting supply fluid pressure drop $P_{2R}-P_{O2}$ across spool valve 2 by varying the assisting pressure rate $P_{2R}=P_{O2}+\Delta P_{2R}$ in the supply power line 30. During the operation, the supply power line L2 is switched over to line 54 or line 30, whichever has the higher pressure rate, by the logic of check valves 40 and 44. The assisting pressure drop command signal $\Delta P_{2R}$ is selected to be just slightly larger than the primary pressure drop command signal $\Delta P_2$. Accordingly, while the speed of fly wheel 94 is still relatively high, the assisting pressure $P_{2R}=P_{O2}+\Delta P_{2R}$ will exceed the primary pressure $P_2=P_{O2}+\Delta P_2$ and, hence, the supply power line L2 will be connected to line 30 through check valve 44. At any other time, the supply power line L2 is connected to line 54 through check valve 40. In other words, the independent regenerating circuitry, including motor 66, pump 55, and fly wheel 94, is given a priority in supplying the fluid energy to the supply power line L2. This independent regenerating circuitry is automatically entering into and is automatically withdrawing from the regulation of the assisting supply fluid pressure drop across spool valve 2. The exchange of kinetic energy between the motor vehicle (load 96) and the fly wheel 94 is basically accomplished as considered above (for the schematic shown on FIG. 10); however, the undesirable interference between the primary motor 92, such as the electrical motor or the internal-combustion engine, and the regenerating circuitry is now eliminated.

More generally, the constant displacement pump 90 can be replaced by several constant displacement pumps which are selectively switched over to the power line 54 for achieving the additional control objectives, such as maximizing the energy efficiency of the internal-combustion engine 92. In fact, these additional control objectives can be similar to those which are usually persuaded in regulating the standart automotive transmissions of motor vehicles.

Figure 12:
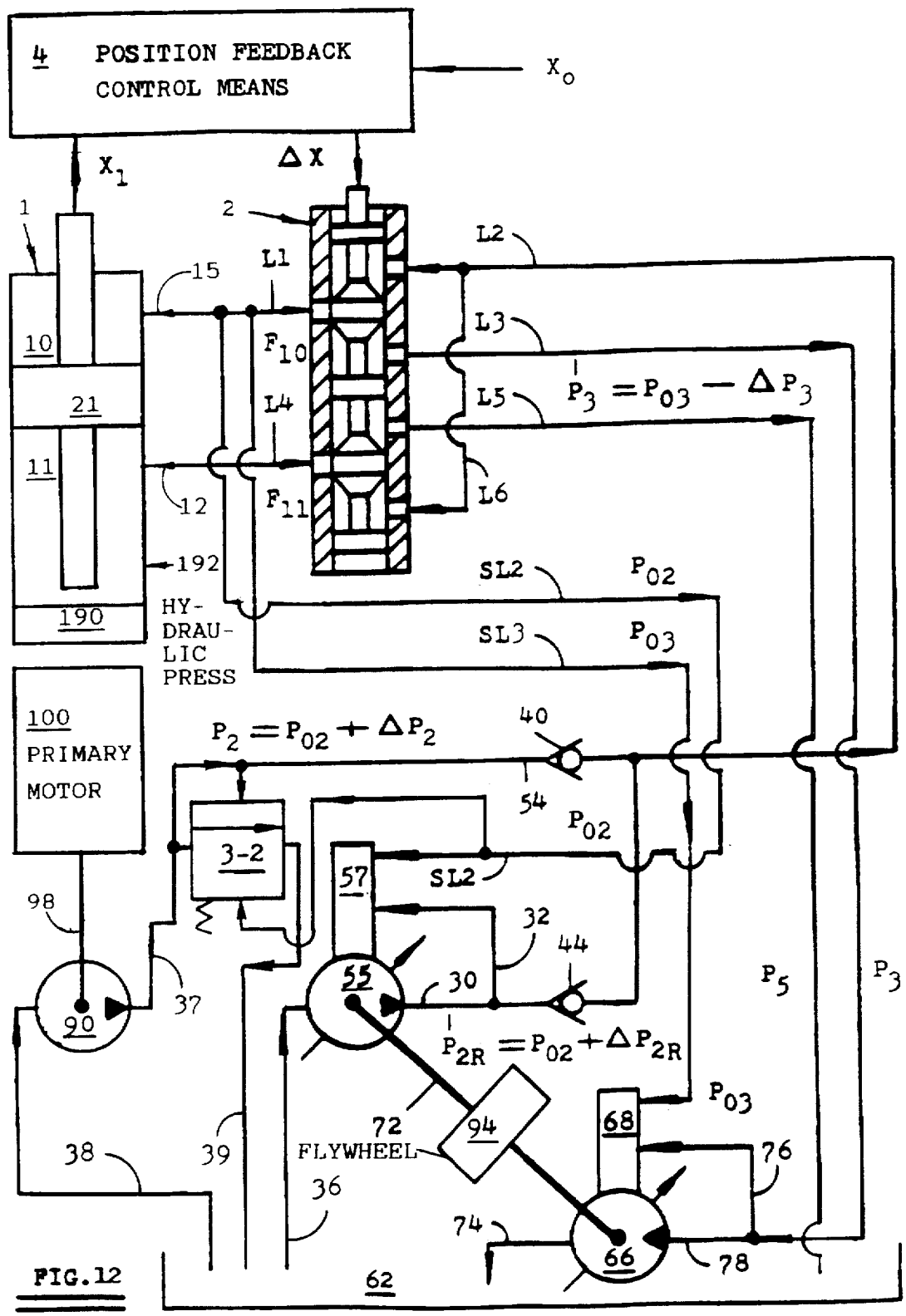
FIG. 12 is a modification of FIG. 11 for the hydraulic press type applications.

It should also be noted that schematic shown on FIG. 11 is of a very general nature and can be further modified and (or) simplified. If there is no additional control objectives, such as just indicated, the variable speed primary motor 92 is replaced by a relatively constant speed primary motor 100; however, the supply line pressure drop regulator 3-2 is added. The regulator 3-2 is included into the primary supply line pressure drop feedback control system and is employed for maintaining the primary pressure $P_2=P_{O2}+\Delta P_2$ in line 54. This case is illustrated by FIG. 12 which is a modification of FIG. 11 for the hydraulic press type application. In this case, the rotational hydraulic motor 1 is replaced by the double-acting cylinder 1. The exhaust line pressure drop feedback control system including motor 66 is adapted to maintain pressure $P_3=P_{O3}-\Delta P_3$ in the exhaust power line L3. The potential energy of the hydraulic fluid compressed in chamber 10 of cylinder 1 is regenerated now by the independent regenerating circuitry through the exhaust power line L3 and the related exhaust line pressure drop feedback control system including motor 66. In fact, the schematic of FIG. 12 is easily understood just by comparison with FIG. 11 and FIG. 9. For simplicity, the additional fluid power supply 50 is not shown on FIG. 12.

Some preliminary generalization.

The motor load and the motor load means are the structural components of any energy regenerating, load adaptive fluid motor control system. For this reason, FIG. 12 (as well as FIG. 9) also shows the frame 190 (of a hydraulic press 192), against which the chamber 10 of cylinder 1 is loaded. The compressed fluid energy is basically stored within chamber 10 of cylinder 1; however, the stretching of frame 190 of press 192 may substantially contribute to the calculations of the over-all press energy accumulated under the load.

It is noted that word "LOAD" within block 96 (see FIGS. 10, 11, 16 to 22, and 26) is also considered to be a substitute for the words, "the motor load means" and is related to all the possible applications of this invention.

Figure 22:
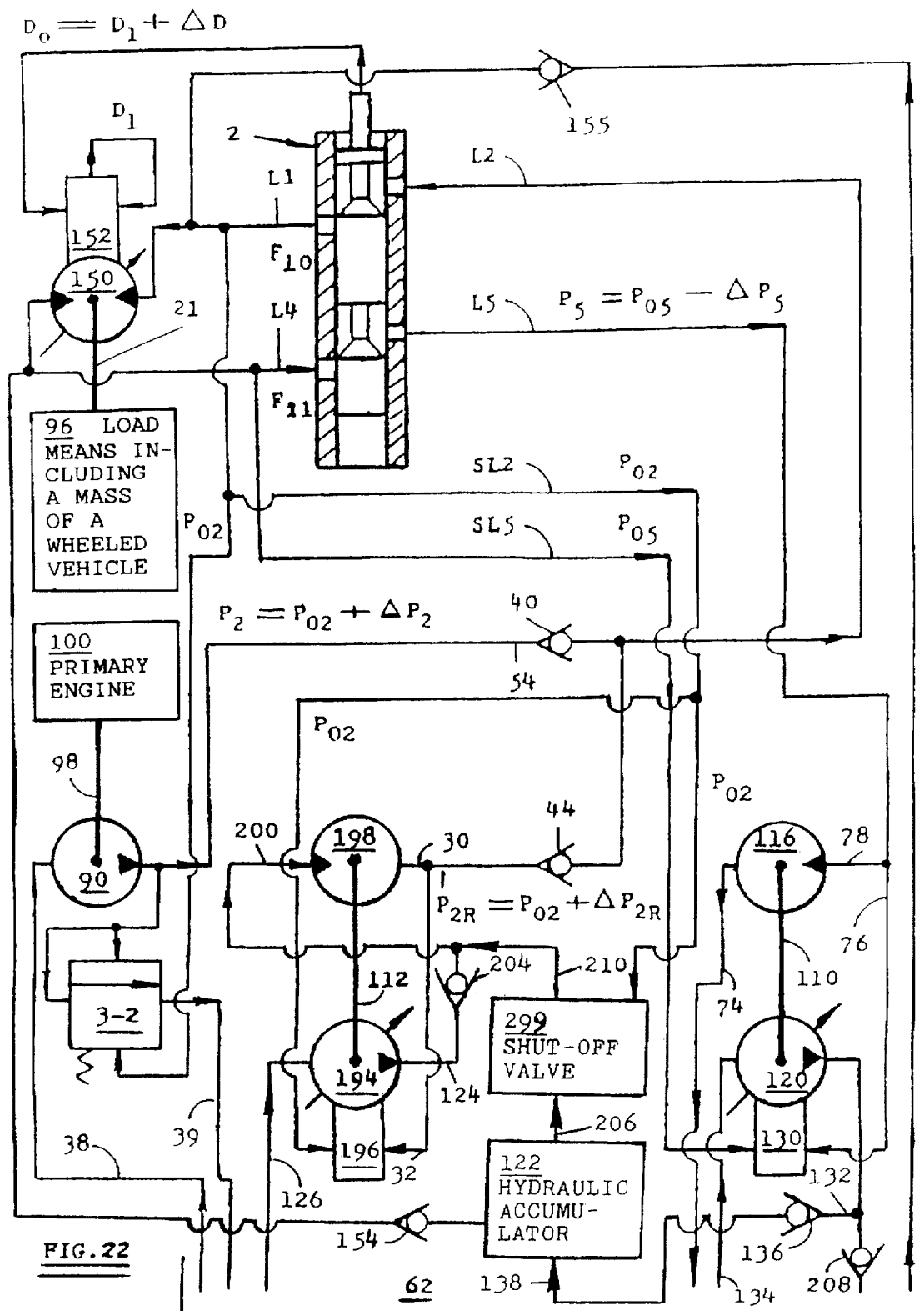
FIG. 22 shows a modified regenerative system having a hydraulic accumulator.

In a case of motor vehicle applications, the motor load means include a mass of a "wheeled" motor vehicle (as it is specifically indicated on the schematic of FIG. 22).

In the energy regenerating, load adaptive fluid motor control systems, such as shown on FIGS. 9 to 12, it is often justified to consider the fluid motor and load means as an integrated component. The fluid motor and load means include the fluid motor means and the motor load means and accumulate a load related energy, such as a kinetic energy of a load mass or a compressed fluid energy of the fluid motor-cylinder. The "exhaust fluid energy" is understood as a measure of the load related energy being transmitted through the exhaust power line (that is line L3 or line L5). The "exhaust fluid energy" can also be referred to as the "waste fluid energy", that is the energy which would be wasted unless regenerated.

There are basically two types of counterpressure varying means:

a) the counterpressure varying means which are not equipped for recupturing the load related energy (such as the exhaust line pressure drop regulator—see FIGS. 1, 4, and 6), and b) the counterpressure varying means which are equipped for recupturing the load related energy (such as the exhaust line variable displacement motor—see FIGS. 9, 10, 11, and 12). This counterpressure varying and energy recupturing means can also be referred to as the exhaust line energy recupturing means.

Still other modifications of the exhaust line energy recupturing means will be considered later.

Accordingly, there are basically two types of the load adaptive fluid motor control systems:

a) the load adaptive fluid motor control systems which are not equipped for regenerating the load related energy (see FIGS. 1, 4 and 6), and b) the load adaptive fluid motor control systems having an energy regenerating circuitry for regenerating the load related energy (see FIGS. 9 to 12). This second type of load adaptive fluid motor control systems can also be referred to as the regenerative adaptive fluid motor control systems. Still other modifications of the regenerative adaptive fluid motor control systems will be considered later.

It should be noted that regenerative adaptive fluid motor control schematics being considered are the concept illustrating schematics only and, therefore, are basically free from the details, which are more relevant to the engineering development of these concepts for specific applications. For example, the maximum and minimum pressures in hydraulic power lines must be restricted. Some design related considerations are summarized at the end of this description.

General criterion of dynamic stability of combined component systems.

The load adaptive fluid motor position feedback control system is typically a combination of at least three component feedback control systems—the fluid motor position feedback control system, at least one exhaust line pressure drop feedback control system, and at least one supply line pressure drop feedback control system. In order to prevent a possible complex interference between the combined components systems, the pressure drop feedback control systems must be properly regulated both with respect to the fluid motor position feedback control system and with respect to each other.

Accordingly, a general criterion of dynamic stability of combined component systems (which are stable while separated) can be introduced by a set of provisions (or by a combination of concepts) as follows:

(1) preventing a substantial schematic operation interference between the pressure drop feedback control systems and the fluid motor position feedback control system (this concept has been already discussed before);

(2) providing a significant dynamic performance superiority for the pressure drop feedback control systems against the fluid motor position feedback control system, in order to prevent a substantial dynamic operation interference between the pressure drop feedback control systems and the fluid motor position feedback control system (this concept will be discussed later);

(3) preventing a substantial pressure drop regulation interference between the supply and exhaust line pressure drop feedback control systems—this concept is discussed below.

The concept of preventing a substantial pressure drop regulation interference.

It should be noted that pressure-compensated flow characteristics which are shown on FIGS. 3-B, 5-B, and 7-B, can generally be reduced to each of two asymptotic characteristics as follows:

(a) a motor static speed characteristic describing the hydraulic motor speed versus the valve spool displacement, under the assumption that the hydraulic fluid is not compressible;

(b) a compression-decompression speed versus the valve spool displacement, under the assumption that the hydraulic motor speed is equal to zero.

As a result, the speed control of fluid motor 1 by any pressure drop feedback control system is generally effected by the processes of compression-decompression of hydraulic fluid and, therefore, is substantially inaccurate. This speed control is, of course, still further effected by some other factors, such as the static and dynamic errows in maintaining the pressure drop.

It is also understood that a simultaneous speed control of fluid motor 1 by the supply and exhaust line pressure drop feedback control systems may create a substantial pressure drop regulation interference between these two systems.

This pressure drop regulation interference may reveal itself in generating excessive pressure waves, producing hydraulic shocks, cavitating the hydraulic fluid, and accumulating an air in the hydraulic tracts. Moreover, the pressure drop regulation interference may lead to the over-all dynamic instability of the load adaptive fluid motor control system, such as the regenerative adaptive fluid motor control system.

The destructive conditions of pressure drop regulation interference can be avoided simply by preventing a simultaneous speed control of fluid motor 1 by two pressure drop feedback control systems, that is by the supply and exhaust line pressure drop feedback control systems. Without the loss of generality, the concept of preventing a pressure drop regulation interference is considered further more specifically for two examplified groops of schematics as follows:

(a) the load adaptive schematics having only one loadable chamber and, therefore, having only one pressure drop feedback control system controlling the speed of motor 1 at any given time—see FIGS. 1, 4, 9, and 12;

(b) the load adaptive schematics having two loadable chambers, and therefore, having two pressure drop feedback control systems which potentially may participate simultaneously in controlling the speed of motor 1—see FIGS. 11 and 16 to 22.

In the first groop of load adaptive schematics, the supply and exhaust line pressure drop feedback control systems will obviously never interfere. In these schematics, the speed of motor 1 is usually controlled only by a supply line pressure drop feedback control system (that is by the primary supply line pressure drop feedback control system or by the assisting supply line pressure drop feedback control system). The motor-cylinder 1 having only one loadable chamber is assumed to be loaded in only one direction by a static force. Accordingly, the motor load is measured by the pressure signals $P_{O2}=P_{O3}$. The exhaust line pressure drop feedback control system is usually in operation only during the decompression of chamber 10 of motor 1.

In the second groop of load adaptive schematics, a simultaneous speed control of motor 1 by the supply and exhaust line pressure drop feedback control systems is prevented by controlling the sequence of operation of these systems by the motor load of of motor 1, provided that pressure drop command signals $\Delta P_2$, $\Delta P_{2R}$, and $\Delta P_5$ are selected so that:

$$\Delta P_5 > \Delta P_{2R} > \Delta P_2 \qquad (3)$$

Let's consider now more specifically the second groop of load adaptive schematics. The magnitude and direction of the motor load is conveniently measured by the pressure signals $P_{O2}$ and $P_{O5}$, which are implemented for controlling the supply and exhaust line pressure drop feedback control systems, respectively. The load pressure signals $P_{O2}$ and $P_{O5}$ are also used for controlling the sequence of operation of these pressure drop feedback control systems, as it is illustrated below.

Let's assume that wheeled vehicle is tested in a horizontal direction only. And let's consider briefly the related stop-and-go energy regenerating circle (which is still further studied later—see FIG. 25).

1. The wheeled vehicle is moving with a constant speed. In this case, the motor load is positive, the load pressure signal $P_{O2}$ is relatively large, and the primary supply line pressure drop feedback control system is activated to maintain the primary supply fluid pressure drop $P_2-P_{O2}=\Delta P_2$ across spool valve 2. On the other hand, the pressure signal $P_{O5}$ is very small, and therefore, the exhaust line pressure drop feedback control system is not activated to maintain the exhaust fluid pressure drop $P_{O5}-P_5=\Delta P_5$ across spool valve 2. Note that in this case, the exhaust fluid pressure drop $P_{O5}-P_5$ is equal approximately to the primary supply line pressure drop command signal $\Delta P_2$, provided that supply and exhaust openings of valve 2 are identical. Note also that if $P_5 \cong 0$: $P_{O5} \cong \Delta P_2 < \Delta P_5$.

2. The wheeled vehicle is decelerated.

In this case, the motor load is negative, the load pressure signal $P_{O5}$ is large, and the exhaust line pressure drop feedback control system is activated to maintain the exhaust fluid pressure drop $P_{O5}-P_5=\Delta P_5$ across spool valve 2. On the other hand, the pressure $P_{O2}$ is very small and has a tendency of dropping "below zero". In practical applications, a vacuum in motor line L1 must be prevented by introducing a check valve (such as check valve 155 on FIGS. 20 and 22) connecting line L1 with the oil tank 62 (or with a low-pressure hydraulic accumulator). Note that by virtue of expression (3), the process of deceleration should be started onle after this check valve is open. It is understood that in this setuation, the supply line pressure drop feedback control systems have no effect on the process of deceleration of motor 1.

3. The wheeled vehicle is completely stopped.

In this case, the fluid motor 1 is not regulated.

4. The wheeled vehicle is accelerated.

In this case, the motor load is positive, the load pressure signal $P_{O2}$ is large, and the assisting supply line pressure drop feedback control system is activated to maintain the assisting supply fluid pressure drop $P_{2R}-P_{O2}=\Delta P_{2R}$ across spool valve 2. On the other hand, the pressure signal $P_{O5}$ is very small, and therefore, the exhaust line pressure drop feedback control system is not activated to maintain the exhaust fluid pressure drop $P_{O5}-P_5=\Delta P_5$ across spool valve 2. Note that in this case, the exhaust fluid pressure drop $P_{O5}-P_5$ is equal approximately to the assisting supply line pressure drop command signal $\Delta P_{2R}$, provided that supply and exhaust openings of valve 2 are identical. Note also that if $P_5 \cong 0$: $P_{O5} \cong \Delta P_{2R} < \Delta P_5$.

Finally, it can be concluded that in the load adaptive fluid motor control systems, the functions of the motor load are not limited to controlling separately each of the pressure drop feedback control systems. Indeed, the functions of the motor load are generally extended to include also the control over the sequence of operation of the supply and exhaust line pressure drop feedback control systems, in order to prevent a possible pressure drop regulation interference between these pressure drop feedback control systems.

The concept of providing a significant dynamic performance superiority.

It is important to stress that the concept of providing a significant dynamic performance superiority for the pressure drop feedback control systems against the fluid motor position feedback control system is an integral part of this invention. This concept introduces a criterion of dynamic stability of combined component systems which are stable while separated (provided that the concept of preventing a schematic operation interference and the concept of preventing a pressure drop regulation interference are already properly implemented). As it is already mentioned above, the load adaptive fluid motor position feedback control system is typically a combination of at least three component feedback control systems—the fluid motor position feedback control system, at least one exhaust line pressure drop feedback control system, and at least one supply line pressure drop feedback control system.

The theory and design of the separate closed-loop systems are described in numerous prior art publications—see, for example, the books already named above, and also:

a) Shinners S. M., "Modern Control System Theory and Application". Second Edition. Reading. Mass.: Addison-Wesley Publishing Company. 1972.
b) Davis S. A.. "Feedback and Control System". New York: Simon and Shuster 1974.

It is further assumed that each of the separate component systems is linearized and, thereby, is basically described by the ordinary linear differential equations with constant coefficients, as it is usually done in the engineering calculations of electrohydraulic, hydromechanical, and hydraulic closed-loop systems. Note that the fluid motor position feedback control system (separated from other component systems) is especially easy to linearized if to admit that the expected regulation of the exhaust and supply fluid pressure drops is already "in place".

Let's consider (without the loss of generality) the load adaptive fluid motor position feedback control system incorporating only three component systems—the fluid motor position feedback control system, only one exhaust line pressure drop feedback control system, and only one supply line pressure drop feedback control system. In this case, the criterion of dynamic stability of combined component systems can be reduced to only five conditions as follows:

(1) providing a dynamic stability of the fluid motor position feedback control system;
(2) providing a dynamic stability of the exhaust line pressure drop feedback control system;
(3) providing a dynamic stability of the supply line pressure drop feedback control system;
(4) preventing a substantial dynamic operation interference between the exhaust fluid pressure drop regulation and the motor position regulation by providing a significant dynamic performance superiority for the exhaust line pressure drop feedback control system against the fluid motor position feedback control system;
(5) preventing a substantial dynamic operation interference between the supply fluid pressure drop regulation and the motor position regulation by providing a significant dynamic performance superiority for the supply line pressure drop feedback control system against the fluid motor position feedback control system.

The presented above—first, second, and third conditions of dynamic stability are the requirements to the separate component systems. The fourth and fifth conditions of dynamic stability define limitations which must be imposed on the separate component systems in order to combine them together. The design of the separate closed-loop systems for the dynamic stability and required performance is well known in the art, as already emphasized above. For this reason, it is further assumed, for simplicity, that the first three conditions of dynamic stability are always satisfied if the last two conditions of dynamic stability are satisfied.

Because the last two conditions of dynamic stability are similar, they can also be specified by a general form as follows:

preventing a substantial dynamic operation interference between the pressure drop regulation (the exhaust or supply fluid pressure drop regulation) and the motor position regulation by providing a significant dynamic performance superiority for the pressure drop feedback control system (the exhaust or supply line pressure drop feedback control system, respectively) against the motor position feedback control system.

The provision of preventing "a substantial dynamic operation interference" is associated with the concept of providing "a significant dynamic performance superiority". The term "a substantial dynamic operation interference" is introduced to characterize the dynamic instability of combined component systems which are stable while separated. This dynamic instability can be detected in a frequency domain or in a time domain by $$\frac{\omega_{Rd}}{\omega_{Rp}} = 1 \tag{4}$$

or by $$\frac{t_{fp}}{t_{fd}} = 1, \tag{5}$$

respectively, where:

$\omega_{Rp}$ and $t_{fp}$ are the resonant frequency and the final transient time (respectively) of the fluid motor position feedback control system;

$\omega_{Rd}$ and $t_{fd}$ are the resonant frequency and the final transient time (respectively) of the pressure drop feedback control system.

The closed-loop resonant frequency $\omega_R$ (that is $\omega_{Rp}$ or $\omega_{Rd}$) is located by a resonant peak of the closed-loop frequency-response characteristic and, therefore, is also often called "a peaking frequency". This resonant peak is typically observed on a plot of the amplitude portion of the closed-loop frequency-response characteristic. However, the resonant peak is observed only if the system is underdamped. For this reason and for simplicity, the appropriate approximations of the ratio $$\frac{\omega_{Rd}}{\omega_{Rp}}$$

can also be employed. For example, the possible approximation is:

$$\frac{\omega_{Rd}}{\omega_{Rp}} \simeq \frac{\omega_{bd}}{\omega_{bp}}, \tag{6}$$

where:

$\omega_{bp}$ and $\omega_{bd}$ are the closed-loop bandwidths for the position feedback control system and the pressure drop feedback control system, respectively.

Moreover, as the first approach (roughly approximately):

$$\frac{\omega_{Rd}}{\omega_{Rp}} \simeq \frac{\omega_{ocd}}{\omega_{ocp}}, \tag{7}$$

where:

$\omega_{ocp}$ and $\omega_{ocd}$ are the open-loop cross-over frequencies for the position feedback control system and the pressure drop feedback control system, respectively.

The final transient time $t_f$ (that is $t_{fp}$ or $t_{fd}$) of the closed-loop system is the total output-response time to the step input. The transient time $t_f$ is also often called "a settling time" and is measured between $t=0$ and $t=t_f$—when the response is almost completed. The method of defining the closed-loop resonant frequency $\omega_R$, the closed-loop bandwidth $\omega_b$, the open-loop cross-over frequency $\omega_{oc}$, and the closed-loop final transient time $t_f$ are well known in the art—see for example, the above named books of S. M. Shinners, S. A. Davis, and A. F. D'Souza.

In accordance with equations (4) and (5), there are two interrelated but still different aspects of dynamic instability of combined component systems which are stable while separated. Indeed, the equation (4) symbolizes a frequency resonance type phenomenon between the component systems. On the other hand, the equation (5) represents a phenomenon which can be viewed as an operational break-down of the combined component systems. Note that the exhaust and supply line pressure drop feedback control systems are the add-on futures and may fulfill their destination within the load adaptive fluid motor position feedback control system only if the destructive impacts of "a substantial dynamic operation interference" are prevented by "a significant dynamic performance superiority".

Now, it is understood that if "a substantial dynamic operation interference" is identified by (4) or (5), then "a significant dynamic performance superiority" should be identified by:

$$\frac{\omega_{Rd}}{\omega_{Rp}} > S_\omega \quad (8)$$

and $$\frac{t_{fp}}{t_{fd}} > S_t, \quad (9)$$

where:

$S_\omega$ is the minimum stability margin in a frequency domain.

$S_t$ is the minimum stability margin in a time domain.

These minimum allowable stability margins can be specified approximately as: $S_\omega \cong 10$ and $S_t \cong 10$.

The formulas (8) and (9) must be introduced into the design of the load adaptive fluid motor position feedback control system. The way to do this is to design the separate component systems for the dynamic stability and required performance while the inequalities (8) and (9) for the combined component systems are satisfied. The approximate connections between the resonant frequencies and some other typical frequencies have been already illustrated by equations (6) and (7).

While the equations (8) and (9) are valid for the second— and higher—order differential equations, the principal relationship between the final transient time $t_f$ and the resonant frequency $\omega_R$ is more easy to illustrate for the second-order equation $$\frac{d^2z}{dt^2} + B_1 \frac{dz}{dt} + B_2 z = B_2 y,$$

which can be modified as:

$$\frac{d^2z}{dt^2} + 2\zeta\omega_2 \frac{dz}{dt} + \omega_2^2 z = \omega_2^2 y$$

and $$\frac{d^2z}{d\tau^2} + 2\zeta \frac{dz}{d\tau} + z = y,$$

where:

Y and Z are the input and output, respectively;

the undamped natural frequency $\omega_2 = \sqrt{B_2}$, the damping coefficient $$\zeta = \frac{B_1}{2\omega_2},$$

the dimensionless time $\tau = \omega_2 t$.

For this second-order equation, the output responses $Z(\tau)$ to a unit step input (while the initial conditions are zero) for various values of $\zeta$ are well known in the art—see, for example, the above named books of S. M. Shinners and S. A. Davis.

Note that for the second-order equation $$t = \frac{\tau}{\omega_2}$$

and, hence, the final transient time $$t_f = \frac{\tau_f}{\omega_2}.$$

The final transient dimensionless time $\tau_f$ is a function of the damping coefficient $\zeta$. More generally, when the right part of the second-order equation is more complicated, the final transient dimensionless time $\tau_f$ is also effected by the right part of this equation.

In the case of using second-order systems, the ratio $$\frac{\omega_{Rd}}{\omega_{Rp}}$$

can be approximated by the ratio $$\frac{\omega_{2d}}{\omega_{2p}}$$

and therefore:

$$\frac{t_{fp}}{t_{fd}} = \frac{\omega_{2d}}{\omega_{2p}} \cdot \frac{\tau_{fp}}{\tau_{fd}} \approx \frac{\omega_{Rd}}{\omega_{Rp}} \cdot \frac{\tau_{fp}}{\tau_{fd}},$$

where:

$\omega_{2p}$ and $\tau_{fp}$ are the undamped natural frequency and the final transient dimensionless time, respectively, for the position feedback control system;

$\omega_{2d}$ and $\tau_{fd}$ are the undamped natural frequency and the final transient dimensionless time, respectively, for the pressure drop feedback control system.

In general, for the second- and higher-order systems, it can be still stated, by the analogy with the second-order system, that the ratio $$\frac{t_{fp}}{t_{fd}}$$

is basically dependent on the ratio $$\frac{\omega_{Rd}}{\omega_{Rp}}$$

and is further dependent on the secondary factors, such as the effects of damping. It is to say that expression (8) can be viewed as a basic (or main) test on the dynamic stability of combined components systems which are stable while separated. This main test is needed to prevent the frequency resonance type phenomenon between the component systems. However, an additional test—equation (9) is still needed to prevent the operational break-down of the combined component systems.

In short, for the second- and higher-order systems:

a) the expression (8)—alone is a necessary criterion for the dynamic stability of combined component systems which are stable while separated;

b) the expressions (8) and (9)—together are a sufficient criterion for the dynamic stability of combined component systems which are stable while separated.

Note also that the concept of providing a significant dynamic performance superiority is actually a complex concept integrating two principal components as follows:

(a) the basic concept of providing a significant frequency-response superiority—as it is defined by expression (8), or the like; and (b) the supplementary concept of providing a significant final-transient-time superiority—as it is defined by expression (9).

Of course, still other terms, interpretations, and measurements can be generally found to further characterize what have been just clearly defined—based on the physical considerations—as being "a substantial dynamic operation interference" and "a significant dynamic performance superiority".

Adaptive fluid position feedback control: the scope of expected applications.

The load adaptive fluid position servomechanisms make it possible to substantially improve the energy, performance, and environmental characteristics of the position feedback control in comparison with the conventional fluid position servomechanisms. In particular, the load adaptive fluid position servomechanisms may combine the high energy-efficient and quiet operation with the relatively high speed and accuracy of performance. The artificial load adaptability of load adaptive fluid position servomechanisms is achieved by regulating the exhaust and supply fluid pressure drops by the exhaust and supply line pressure drop feedback control systems, respectively.

Because the artificial load adaptability is implemented by relatively simple design means, the load adaptive fluid position servomechanisms combine the very best qualities of the conventional fluid motor position feedback control systems and the naturally load adaptive, electric motor position feedback control systems. Moreover, the load adaptive fluid position servomechanisms may incorporate the energy regenerating circuitry.

Furthermore, maintaining the exhaust and supply fluid pressure drops across the directional control value may protect the position closed-loop against such destructive conditions as generating excessive pressure waves, producing hydraulic shocks, cavitating the hydraulic fluid, and accumulating an air in the hydraulic tracts. In other words, the transition to the adaptive servomechanisms makes it easy to control the fluid conditions in the hydraulic tracts and to provide a "full hermetization" of the hydraulic motor.

Accordingly, the scope of potential applications of the adaptive hydraulic position servomechanisms being considered is extremely wide. So, it is expected that the conventional hydraulic (electrohydraulic or hydromechanical) position servomechanisms will be replaced almost everywhere by the load adaptive hydraulic position servomechanisms. It is also expected that many naturally load adaptive, electric motor position feedback control systems will also be replaced by the artificially load adaptive, hydraulic motor position feedback control systems.

In addition, it is expected that many electrohydraulic, hydromechanical, and electromechanical open-loop position control systems will also be replaced by the load adaptive electrohydraulic and hydromechanical position servomechanisms.

The load adaptive fluid motor position feedback control systems can be used in machine tools (including presses), construction machinery, agricultural machinery, robots, land motor vehicles, ships, aircrafts, and so on.

In general, the load adaptive fluid position servomechanism can be viewed as a combination of a primary motor, such as the electrical motor or the combustion engine, and the load adaptive, position feedback controlled fluid power transmission, transmitting the mechanical power from a shaft of the primary motor to the load. The fundamental structural improvement of the position feedback controlled fluid power transmissions, as described in this invention, makes it possible to substantially increase the scope and the scale of their justifiable applications.

For example, the schematics shown on FIGS. 9 and 12 can be used for constructing the high energy-efficient hydraulic presses. The load adaptive hydraulic press may have advantages against the conventional hydraulic and mechanical presses due to a combination of factors as follows:

1. The high energy-efficiency of the hydraulic system combining the load adaptive primary power supply and the load adaptive regeneration of energy.
2. Superior performance and environmental characteristics including:
   the smooth and quiet operation of the moving slide,
   the smooth compression and decompression of the hydraulic fluid,
   the high speed, accuracy, and dynamic performance potentials.
3. The press is easy to control with respect to the moving slide position, stroke, speed, and acceleration. The press maximum tonage is also easy to restrict for the die-tool protection.
4. Simplicity of design—only one regenerative adaptive hydraulic position servomechanism is required to provide all the benefits described.

Finally, it should be noted that schematics shown on FIGS. 4 and 12, make it possible to absorb the shocks generated by a sudden disappearance of load, for example, during the punching operations on hydraulic presses. This is accomplished by decelerating the motor-cylinder 1 just before the load disappears to provide the valve spool to be close to its neutral point ($\Delta X=0$). Just after the load disappears, the position feedback control system locks the fluid in chamber 11 or even connects this fluid with the supply power line L2. It means that the potential energy of the fluid compressed in chamber 10, is used mostly to compress the fluid in chamber 11 and, finally, is converted to a heat.

Adaptive fluid motor feedback control.

Figure 8:
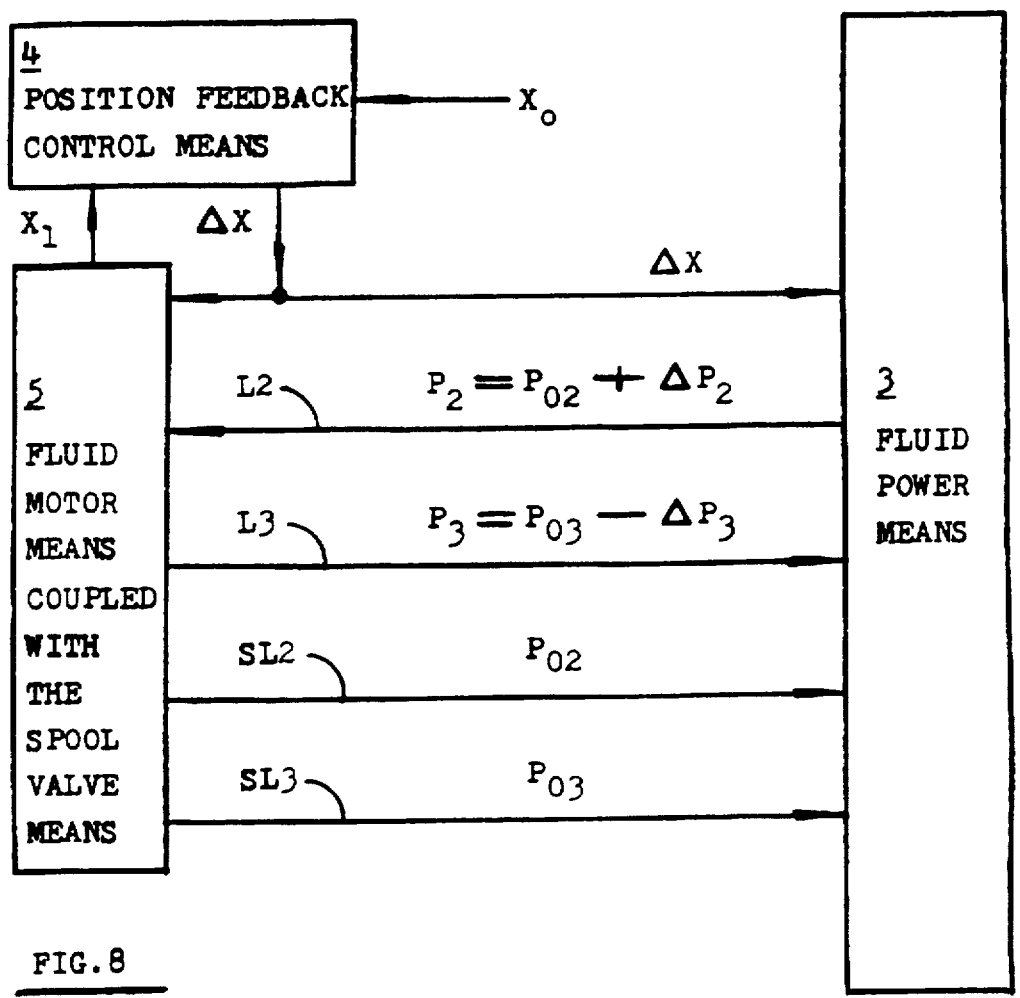
FIG. 8 shows a generalized model of adaptive fluid position servomechanisms.
Figure 13:
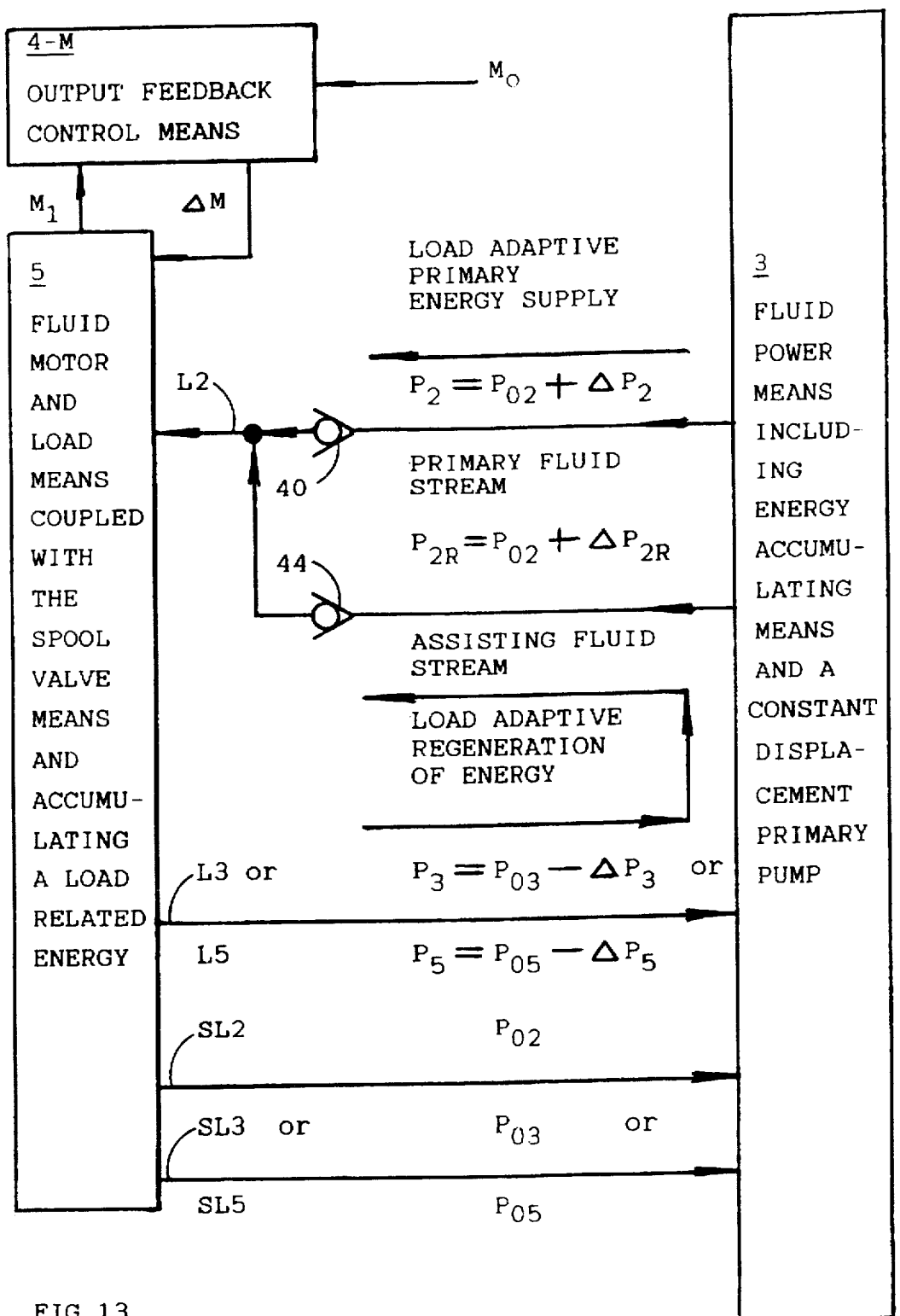
FIG. 13 shows a generalized model of the regenerative adaptive fluid motor output feedback control systems.

FIG. 13 shows a generalized model of the load adaptive fluid motor output feedback control systems which include an independent energy regenerating circuitry. This model can be viewed as a further development of FIG. 8 in view of FIGS. 11 and 12 and is mostly self-explanatory. Note that the position feedback control means (block 4) and the related signals $X_1$, $X_0$, and $\Delta X$, which are shown on FIG 8, are replaced by the (motor) output feedback control means (block 4-M) and the related signals $M_1$, $M_0$, and $\Delta M$, which are shown on FIG. 13.

More specifically, the motor position $X_1$, the position input-command signal $X_0$, and the position feedback control error signal $\Delta X$ are replaced by their "generic equivalents"—the motor output $M_1$, the related input-command signal $M_0$, and the motor output feedback control error signal $\Delta M$, respectively. By the analogy with the load adaptive fluid motor position feedback control system, the motor output feedback control error signal $\Delta M$ is produced by the output feedback control means (block 4-M) in accordance with a difference between the input-command signal $M_0$ and the motor output $M_1$.

Clearly, the motor output is a generic name at least for the motor position, the motor velocity, and the motor acceleration. Accordingly, the load adaptive fluid motor output feedback control system is a generic name at least for the following systems:

a) the load adaptive fluid motor position feedback control system;

b) the load adaptive fluid motor velocity feedback control system;

c) the load adaptive fluid motor acceleration feedback control system.

The general criterion of dynamic stability of combined component systems, which was formulated above with respect to the load adaptive fluid motor position feedback control system, is also applicable to the load adaptive fluid motor output feedback control system. In particular, the concept of providing "a significant dynamic performance superiority", which was formulated above with respect to the load adaptive fluid motor position feedback control system, is also applicable to the load adaptive fluid motor output feedback control system.

Figure 14:
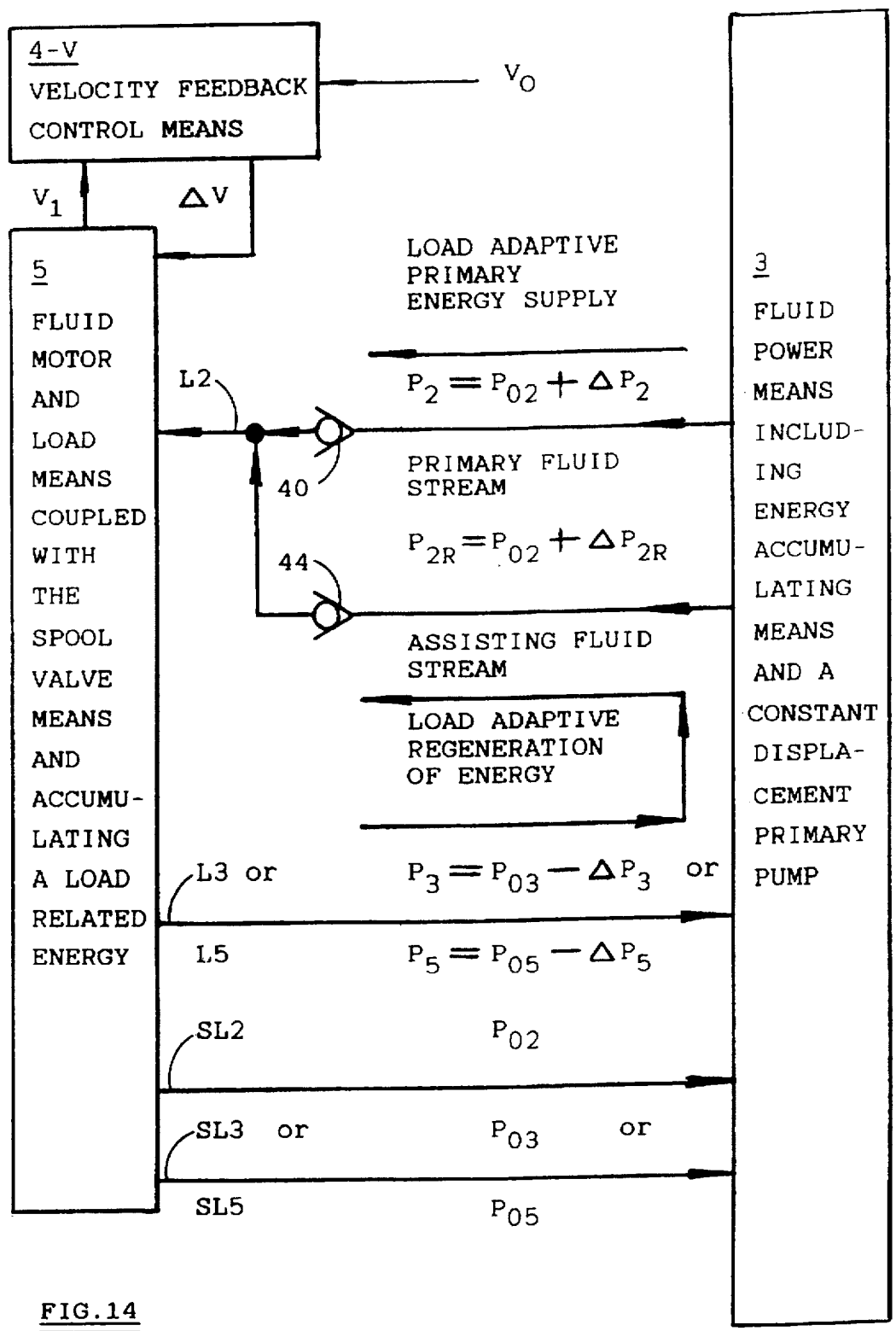
FIG. 14 shows a generalized model of the regenerative adaptive fluid motor velocity feedback control systems.

A generalized model of the regenerative adaptive fluid velocity servomechanisms is shown on FIG. 14. This model is derived from the one shown on FIG. 13 just by replacing the (motor) output feedback control means (block 4-M) and the related signals $M_1$, $M_0$, and $\Delta M$ by the velocity feedback control means (block 4-V) and the related signals $V_1$, $V_0$, and $\Delta V$, respectively. It is to say that the schematics for the adaptive fluid velocity servomechanisms being considered can also be derived from the above presented schematics for the adaptive fluid position servomechanisms just by replacing the position feedback control means (block 4) and the related signals $X_1$, $X_0$, and $\Delta X$ by the velocity feedback control means (block 4-V) and the related signal $V_1$, $V_0$, and $\Delta V$, respectively. The motor velocity $V_1$ is the velocity of the moving part 21 of the fluid motor 1. In fact, the motor velocity $V_1$ can also be viewed as a mechanical signal—the output velocity signal of the load adaptive fluid motor velocity feedback control system. The motor velocity $V_1$ is measured by the velocity sensor, which is included into block 4-V and is connected to the moving part 21 of the fluid motor 1. The velocity feedback control error signal $\Delta V$ is produced by the velocity feedback control means (block 4-V) in accordance with a difference between the velocity input-command signal $V_0$ and the motor velocity $V_1$. It is reminded that at the balance of the position feedback control: $\Delta X \cong 0$ and the spool of valve 2 is in the neutral spool position for any given value of the position command signal $X_0$. Accordingly, at the balance of the velocity feedback control: $\Delta V \cong 0$; however, the spool of valve 2 is not generally in the neutral spool position but is in the position which corresponds to the given value of the velocity command signal $V_0$. It is already understood that the velocity feedback control means (block 4-V) can be still further described basically by the analogy with the above brief description of the position feedback control means (block 4). The optional physical structure of the velocity feedback control means (block 4-V) is also disclosed by numerous prior art patents and publications describing the conventional fluid motor velocity feedback control systems and the related velocity feedback control technique—see, for example the books already named above.

Figure 16:
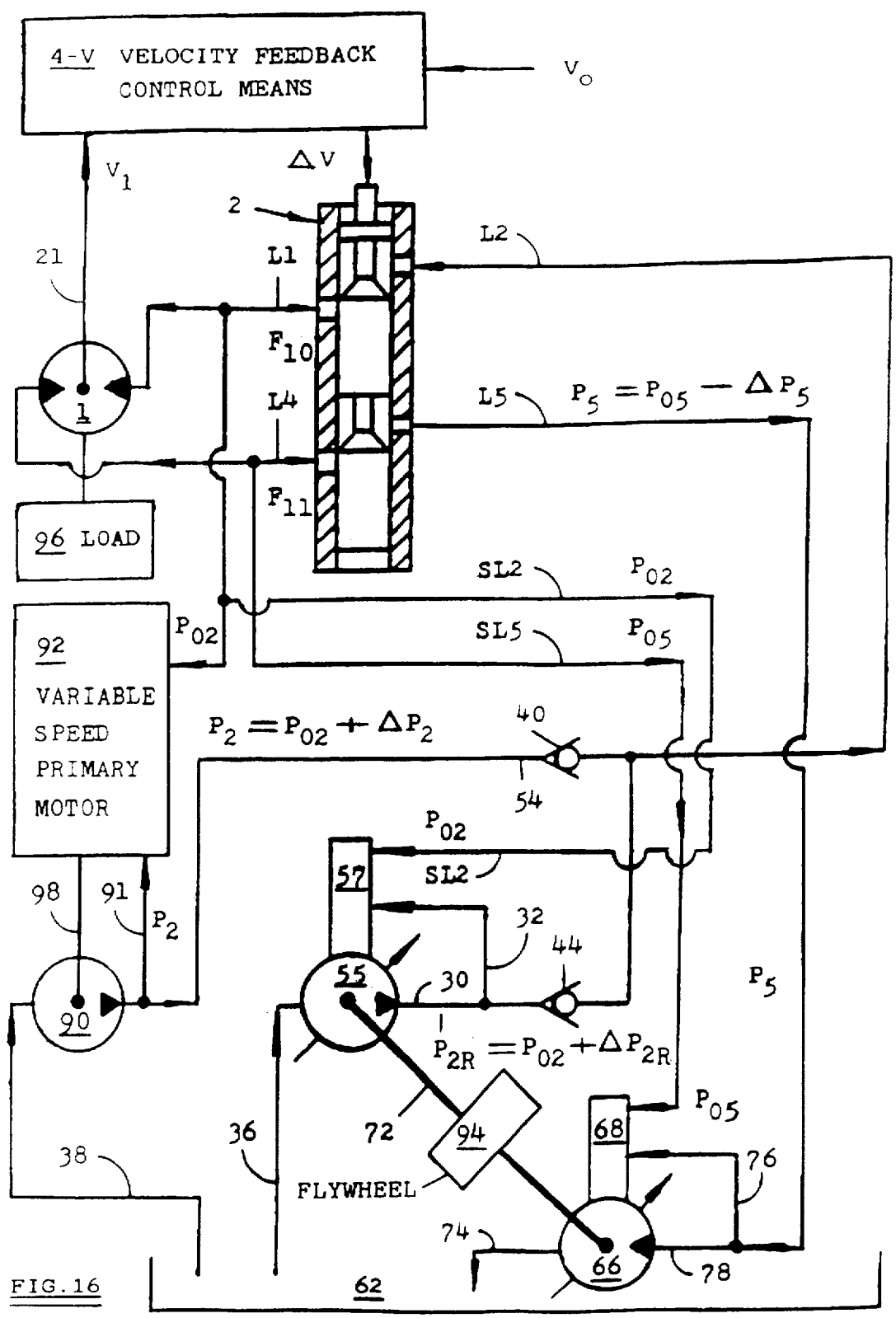
FIG. 16 is a modification of FIG. 11 for the motor vehicle type applications.

The schematic shown in FIG. 16 can be used for constructing the load adaptive, velocity feedback controlled, fluid power drive systems for the motor vehicles. This schematic is derived from the one shown on FIG. 11 by replacing the position feedback control means (block 4); and the related signals $X_0$, $X_1$, and $\Delta X$ by the velocity feedback control means (block 4-V) and the related signals $V_0$, $V_1$, and $\Delta V$, respectively. In addition and for simplicity, the five-way spool valve 2 shown in FIG. 11 is replaced by the four-way spool value 2 shown on FIG. 16. Accordingly, the supply power line L6 and the exhaust power line L3 are eliminated. The four-way spool valve 2 is considered now to be a one-directional valve—it's spool can be moved only down from the neutral spool position and can be returned back to the neutral spool position only (which is shown on FIG. 16).

Regenerative adaptive fluid motor control.

Figure 15:
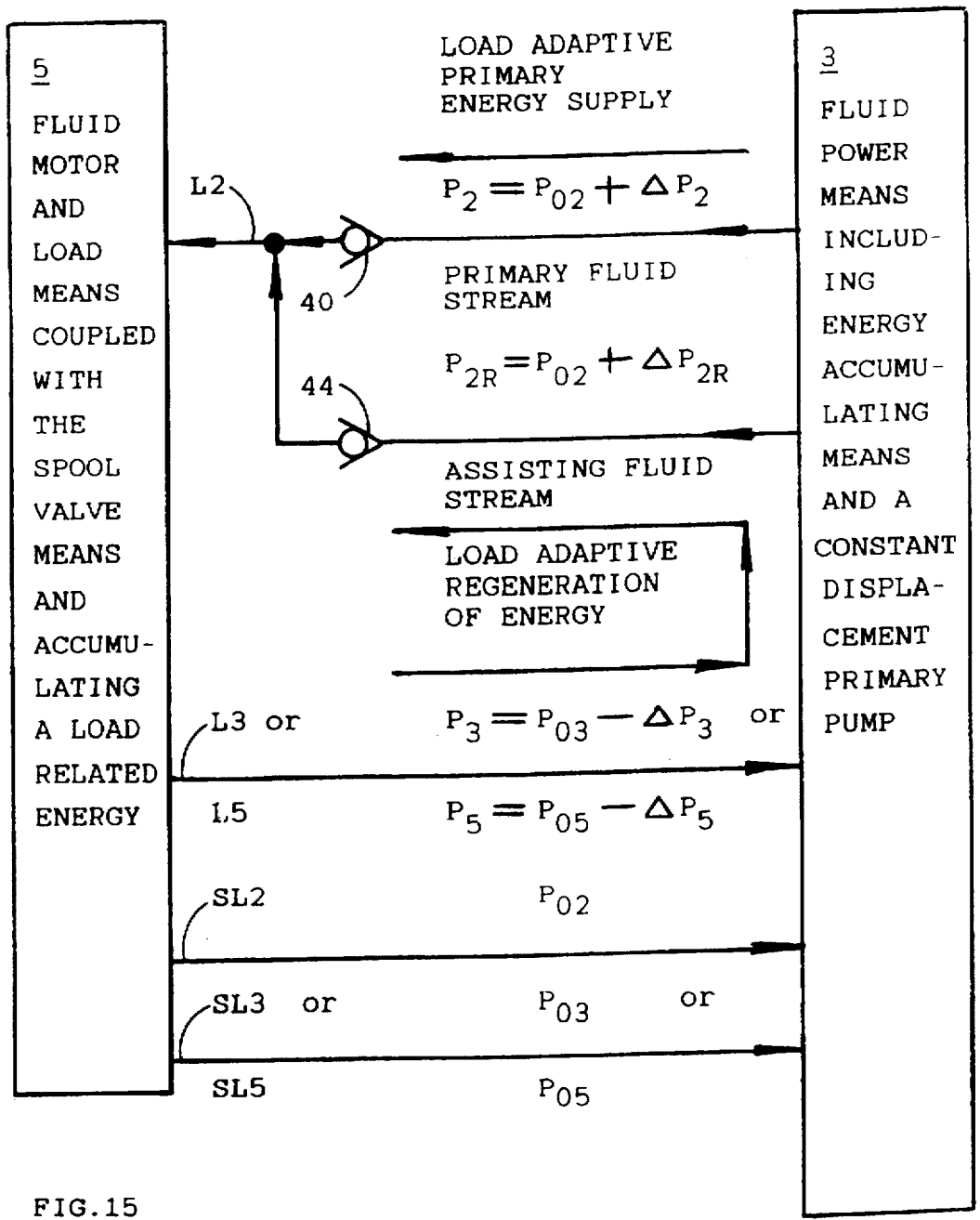
FIG. 15 shows a generalized model of the regenerative adaptive fluid motor open-loop control systems.

A generalized model of the regenerative adaptive fluid motor open-loop control systems is presented by FIG. 15 which is derived from FIG. 13 just by eliminating the output feedback control means (block 4-M) and the related signals $M_0$, $M_1$, and $\Delta M$. The schematics for the load adaptive fluid motor open-loop control systems can be derived from the above presented schematics for the load adaptive fluid motor position feedback control systems just by eliminating the position feedback control means (block 4) and the related signal $X_0$, $X_1$, and $\Delta X$.

Figure 17:
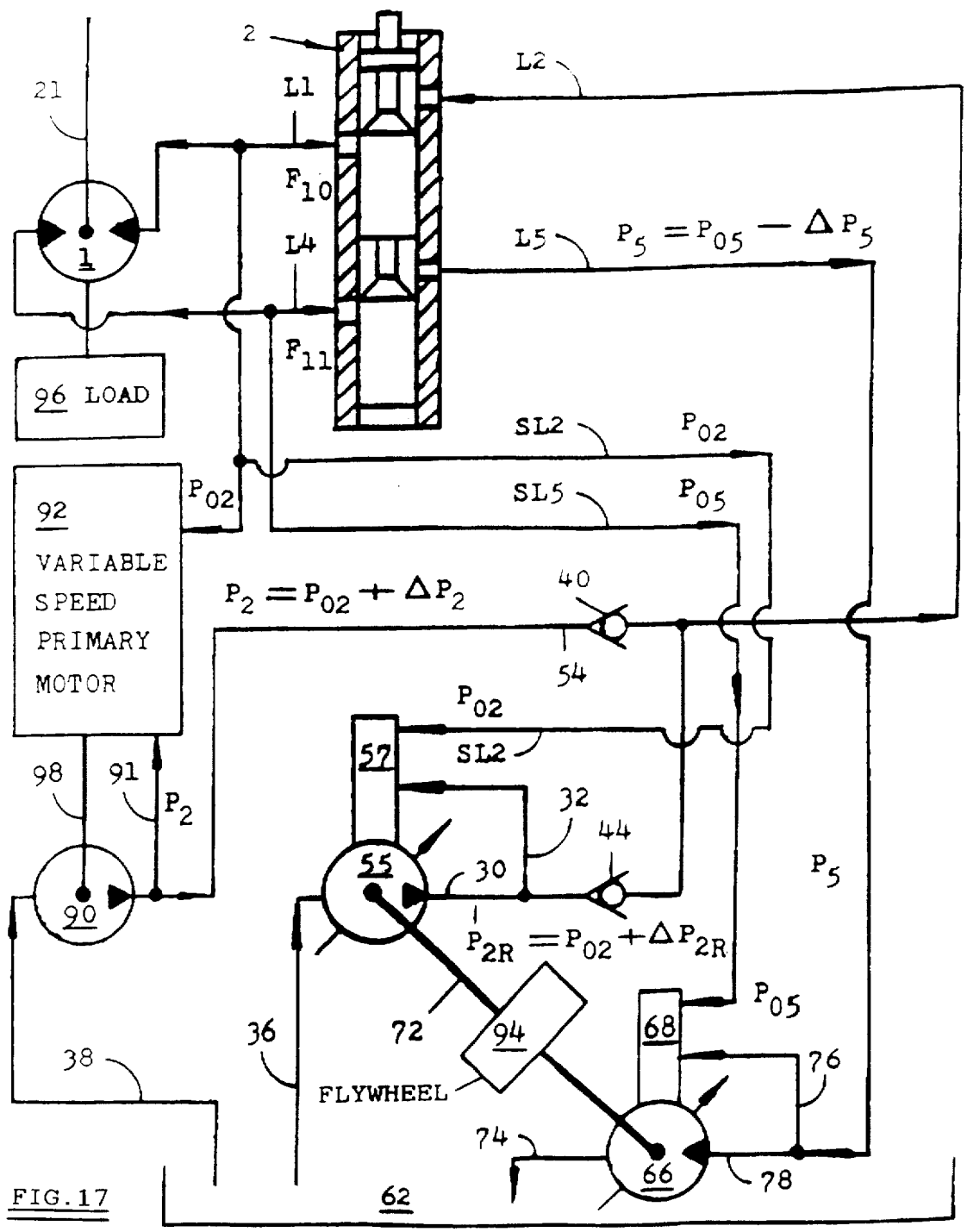
FIG. 17 shows a regenerative adaptive drive system for the motor vehicle type applications.

The open-loop schematic, which is shown on FIG. 17, is derived from the one shown on FIG. 16 just by eliminating the velocity feedback control means (block 4-V) and the related signals $V_0$, $V_1$, and $\Delta V$.

The schematic of FIG. 17 can be used for constructing the high energy-efficient load adaptive motor vehicles, as it will be still further discussed later.

The general criterion of dynamic stability of combined component systems, which was formulated above with respect to the load adaptive fluid motor position feedback control systems, is also applicable to the load adaptive fluid motor open-loop control systems. In particular, the concept of providing "a significant dynamic performance superiority", which is formulated above with respect to the load adaptive fluid motor position feedback control system, is also applicable to the load adaptive fluid motor open-loop control system.

A significant dynamic performance superiority of any pressure drop feedback control system against the fluid motor open-loop control system can be established, for example, by providing basically a significantly larger closed-loop bandwidth for this pressure drop feedback control system in comparison with an open-loop cross-over frequency of the fluid motor open-loop control system.

General principle of coordinated control: the constructive effect of motor load.

As it is already mentioned above, a regenerative adaptive fluid motor control system is typically a combination of at least three component control systems—a fluid motor control system, at least one exhaust line pressure drop feedback control system, and at least one supply line pressure drop feedback control system. The fluid motor control system may or may not include the output feedback control means.

Let's assume that for any driven regenerative adaptive fluid motor control system:

(1) all the separate component systems are dynamically stable (and provide the required dynamic performance) and (2) the general criterion of dynamic stability of combined component systems is satisfied, which means that:

(a) the concept of preventing a schematic operation interference, which was presented above, has been already properly implemented;

(b) the concept of providing a significant dynamic performance superiority, which was presented above, has been also properly implemented;

(c) the concept of preventing a pressure drop regulation interference, which was presented above, has been also properly implemented.

Under all these preconditions, one general principle can now be formulated, in order to clearly visualize why all the component systems will be working in unison to provide an operative regenerative system. This "general principle of coordinated control" can be formulated as follows:

In a regenerative adaptive fluid motor control system, the component systems will not interfere and will not "fall a part", but instead will be working in unison, to provide an operative regenerative system, by virtue of controlling all the pressure drop feedback control systems from only one "major coordinating center"—that is by the only one (total) motor load.

This general principle reveals the constructive effect of motor load.

In order to illustrate this principle more specifically, let's consider, for example, a regenerative adaptive fluid motor drive system for the motor vehicle. In accordance with FIGS. 10, 11, 16, and 17, the magnitude and direction of motor load of motor 1 are conveniently measured by the pressure signals $P_{O2}$ and $P_{O5}$. These pressure signals can also be viewed as the load related, input-command signals for the supply and exhaust line pressure drop feedback control systems, respectively. It means that all the pressure drop feedback control systems are, indeed, controlled in unison by the motor load of motor 1.

Finally, it can also be concluded that in the load adaptive motor vehicles, the vehicle speed is controlled by the driver via the fluid motor control system, while the energy supply and regeneration processes are all controlled in unison by the motor load via the pressure drop feedback control systems. In short, the load adaptive motor vehicle drive system is, indeed, an operative regenerative system having all the components working in unison.

SOME EXAMPLIFIED SYSTEMS

Adaptive fluid control and the motor vehicles.

The load adaptive motor vehicle drive systems, like the one shown on FIG. 17, may have advantages against the conventional motor vehicle drive systems in terms of such critical characteristics as energy efficiency, environmental efficiency, reliability, controlability, and dynamic performance. Some of the underlying considerations are:

1. By virtue of the load adaptability, the task of controlling the speed of the motor vehicle is conveniently separated from the tasks of controlling the energy supply and conservation.
2. The primary supply fluid pressure drop regulation by the variable speed primary motor (engine) 92 has an effect of the energy supply regulation in accordance with the actual energy requirements.
3. The exhaust fluid pressure drop regulation and the independent regenerating circuitry make it possible to create the schematic conditions, under which the energy accumulated during the deceleration of the motor vehicle is reused during the following acceleration of the vehicle. The energy accumulated during the vehicle down-hill motion will also be reused.
4. At the presence of load adaptive control, a standart braking system of the motor vehicle can be used mostly as a supplementary (or emergency) braking system.
5. In the load adaptive motor vehicles, a relatively smaller engine can usually be used.
6. Moreover, this smaller engine can be substituted by two still smaller engines, only one of which is operated all the time, while the second engine is switched-in only when needed—for example, when the vehicle is moving up-hill with a high speed, as it will be explained more specifically later.
7. The air pollution effect of the motor vehicles will be substantially reduced just by eliminating the waste of energy engines, and brakes.
8. In the load adaptive motor vehicles, no controlled mechanical transmission is needed.
9. The schematics of FIGS. 11, 16, and 17 can be modified by replacing the variable speed primary motor 92 by the constant speed primary motor 100 and by using the variable displacement means 93 of pump 90 for regulating the supply fluid pressure drop $P_2-P_{O2}=\Delta P_2$, as it was already illustrated by FIG. 12.

Adaptive fluid control and the City Transit Buses.

The load adaptive drive system, such as shown on FIG. 17, is especially effective in application to the buses which operate within the cities, where a stop-and-go traffic creates the untolerable waste of energy, as well as the untolerable level of air pollution. Let's assume, for simplicity, that the bus is moving in a horizontal direction only. And let's consider, for example, the process of bus deceleration-acceleration beginning from the moment when the bus is moving with some average constant speed and the "red light" is ahead. Up to this moment the spool of valve 2 have been hold pushed partially down by the driver, so that this valve is partially open.

In the process of bus deceleration:

the spool of valve 2 is being moved up—to close this valve;

the pressure $P_{O5}$ in line L4 is increasing;

the pressure $P_5$ in line L5 is also increasing;

the exhaust fluid energy of the exhaust fluid flow is being transmitted through motor 66 to the fly-wheel accumulator 94.

As the spool valve 2 is finally closed, the bus is almost stopped, and the complete stop is provided by using the bus brakes—as usually.

In the process of bus acceleration:

the spool of valve 2 is being moved down—to open this valve;

the pressure $P_{O2}$ in line L1 is increasing;

the pressures $P_2$ and $P_{2R}$ are also increasing; however $P_{2R}>P_2$ and therefore check valve 44 is open, and check valve 40 is closed;

the energy accumulated by fly-wheel 94 is transmitted through pump 55, check valve 44, lines L2 and L1 to the motor 1. When the energy accumulator 94 is almost discharged, the pressure $P_{2R}$ is being dropped so that the check valve 44 is closed, and the check valve 40 is open permitting the engine 92 to supply the power flow to the fluid motor 1.

The load adaptive drive systems, like the one shown on FIG. 17, can also be characterized by saying that these drive systems incorporate the energy regenerating brakes.

Adaptive fluid control with the hydraulic accumulator.

Figure 18:
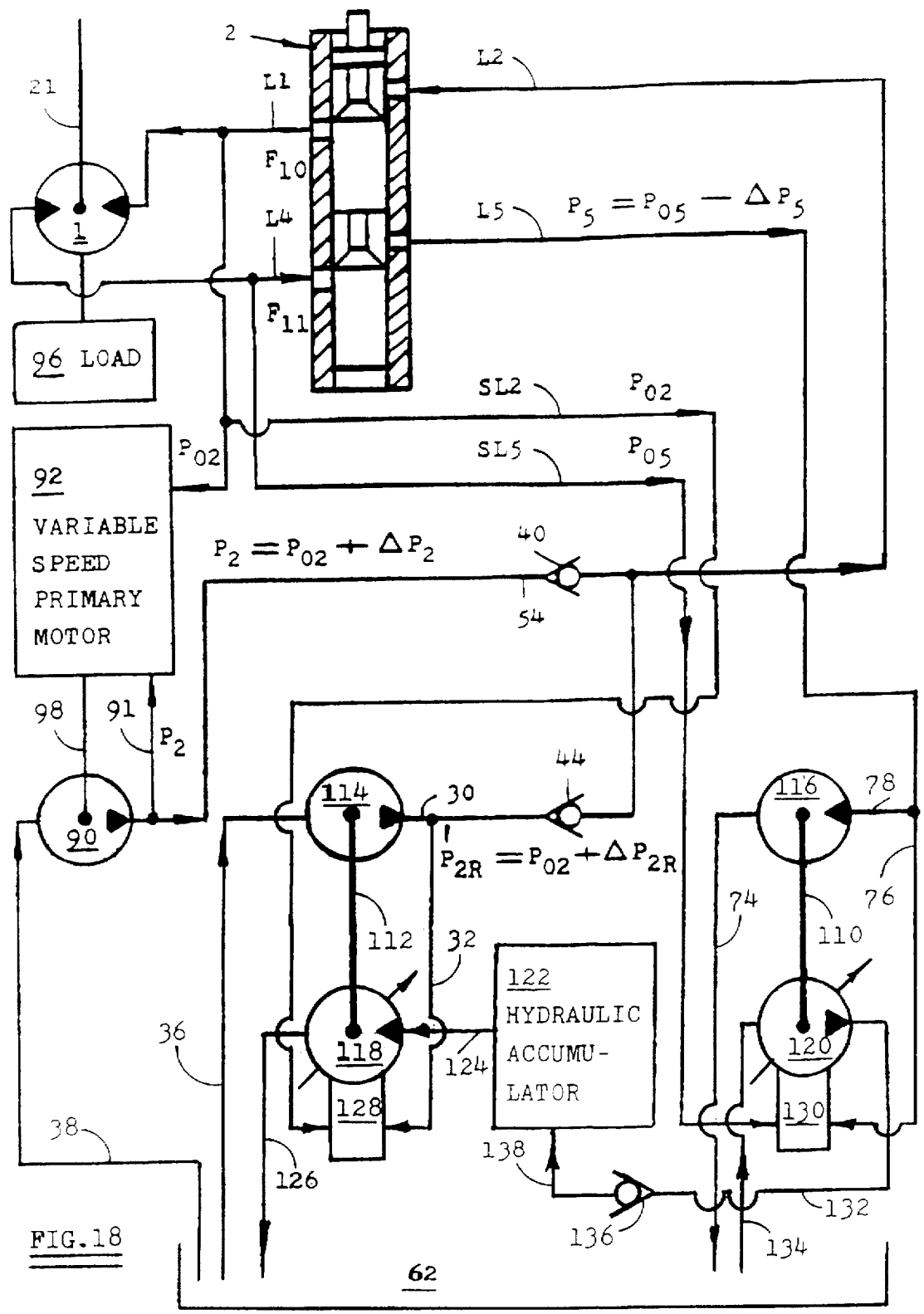
FIG. 18 shows a regenerative adaptive drive system having a hydraulic accumulator.

The regenerative adaptive fluid control schematic which is shown on FIG. 18, can also be used for the motor vehicle applications, and in particular, for the buses which operate within the cities. This schematic will be studied by comparison with the one shown on FIG. 17.

The fly-wheel 94 shown on FIG. 17 is substituted by a hydraulic accumulator 122 shown on FIG. 18. Accordingly, the exhaust line variable displacement motor 66 is replaced by the exhaust line constant displacement motor 116 driving the exhaust line variable displacement pump 120 which is powering the hydraulic accumulator 122 through check valve 136.

The exhaust line variable displacement pump 120 is provided with the variable displacement means 130 which is used to maintain counterpressure $P_5=P_{O5}-\Delta P_5$ in the exhaust power line L5—as before. In other words, a counterpressure transformer including fluid motor 116, shaft 110, fluid pump 120, tank lines 74 and 134, and power lines 78 and 132, is implemented to make up the counterpressure varying and energy recupturing means of the exhaust line pressure drop feedback control system maintaining counterpressure $P_5=P_{05}-\Delta P_5$ in the exhaust power line L5.

The assisting variable displacement pump 55 is replaced by the assisting constant displacement pump 114 being driven by the assisting variable displacement motor 118 which is powered by the hydraulic accumulator 122. The assisting variable displacement motor 118 is provided with the variable displacement means 128 which is used to maintain pressure $P_{2R}=P_{02}+\Delta P_{2R}$ in the line 30, as before. In other words, a pressure transformer, including fluid pump 114, shaft 112, fluid motor 118, tank lines 36 and 126, and power lines 30 and 124, is implemented to make up the assisting variable delivery fluid power supply of the assisting supply line pressure drop feedback control system maintaining pressure $P_{2R}=P_{02}+\Delta P_{2R}$ in the line 30.

Adaptive Fluid Control: the combined energy accumulating means.

It is understood that many of the modification and variations of regenerative adaptive fluid control schematics are possible. These schematics may include the fly-wheel, the hydraulic accumulator, the electrical accumulator, or any combined energy accumulating means. The examplified schematic showing the combined energy accumulating (and storing) means is presented by FIG. 19 which is basically a repitition of FIG. 18; however, two major components are added: the electrohydraulic energy converting means 142 and the electrical accumulator 144.

In addition, and just for diversity of the drawings presented, the variable speed primary motor 92 is replaced by the constant speed primary motor 100, so that now the supply line pressure drop regulator 3-2 is used for regulating the supply fluid pressure drop $P_2-P_{02}=\Delta P_2$, as it was already illustrated by FIG. 12. As the hydraulic accumulator 122 is almost fully charged, an excess fluid is released from this accumulator, and a hydraulic energy of the excess fluid is converted though the electrohydraulic energy converting means 142 to the electrical energy of electrical accumulator 144. On the other hand, as the hydraulic accumulator is almost fully discharged, the energy is transmitted back from the electrical accumulator 144 to the hydraulic accumulator 122.

Figure 19:
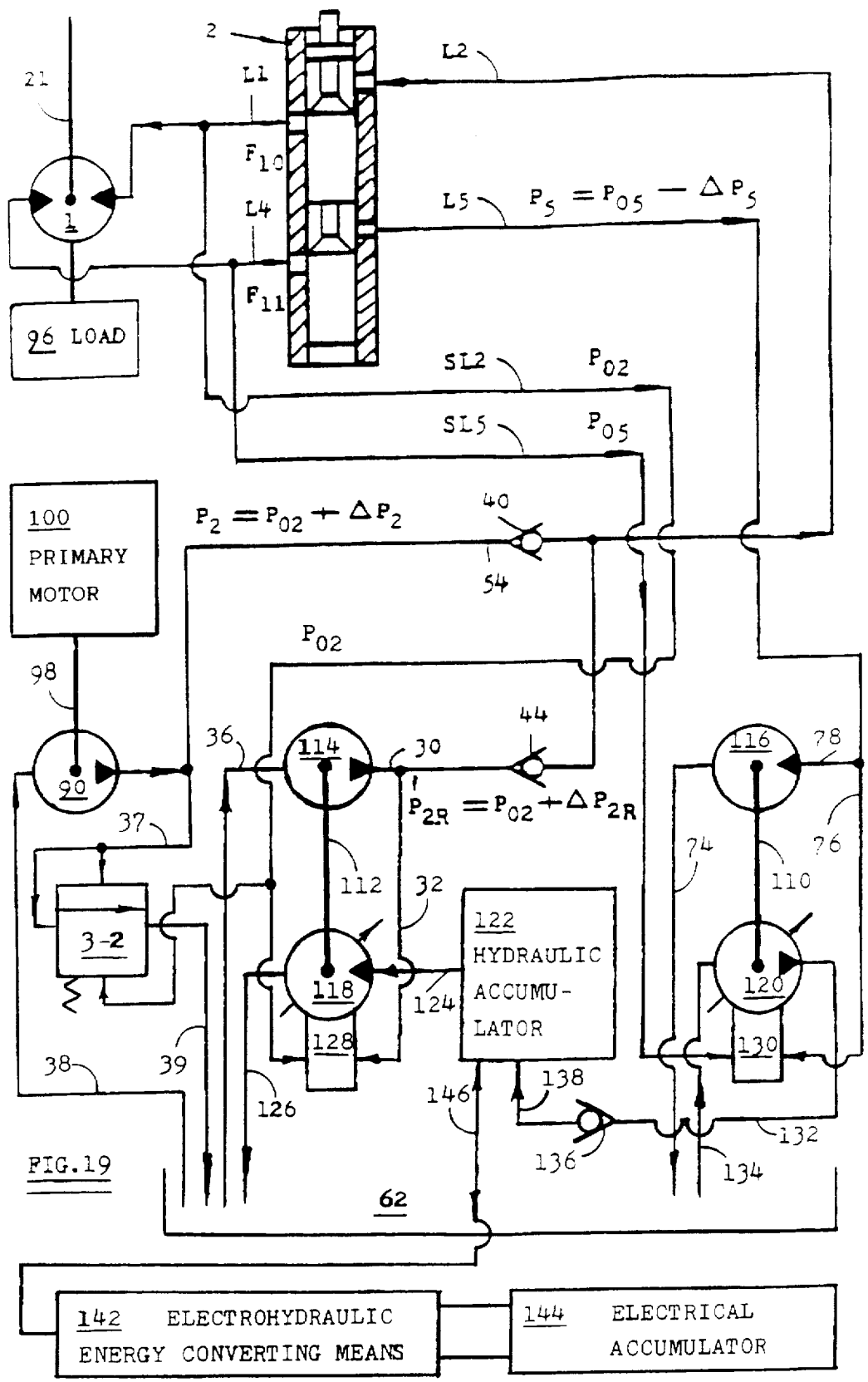
FIG. 19 shows a regenerative adaptive drive system having the combined energy regenerative means.

The schematic of FIG. 19 can be characterized by that the combined energy accumulating (and storing) means include the fluid energy accumulating means being implemented for powering the electrical energy accumulating means. More generally, the combined energy accumulating (and storing) means may include major (primary) energy accumulating means being implemented for powering supplementary (secondary) energy accumulating means.

Note that a common electrical power line can also be employed as an equivalent of the energy accumulating (and storing) means. For example, the combined energy accumulating (and storing) means may include fluid energy accumulating means (hydraulic accumulator 122 on FIG. 19) being implemented for powering the electrical power line (replacing electrical accumulator 144 on FIG. 19). In this case, the electrical power line will accept an excess energy from the hydraulic accumulator 122 and will return the energy back to the hydraulic accumulator 122—when it is needed.

Adaptive fluid control with a variable displacement motor driving the load.

Figure 20:
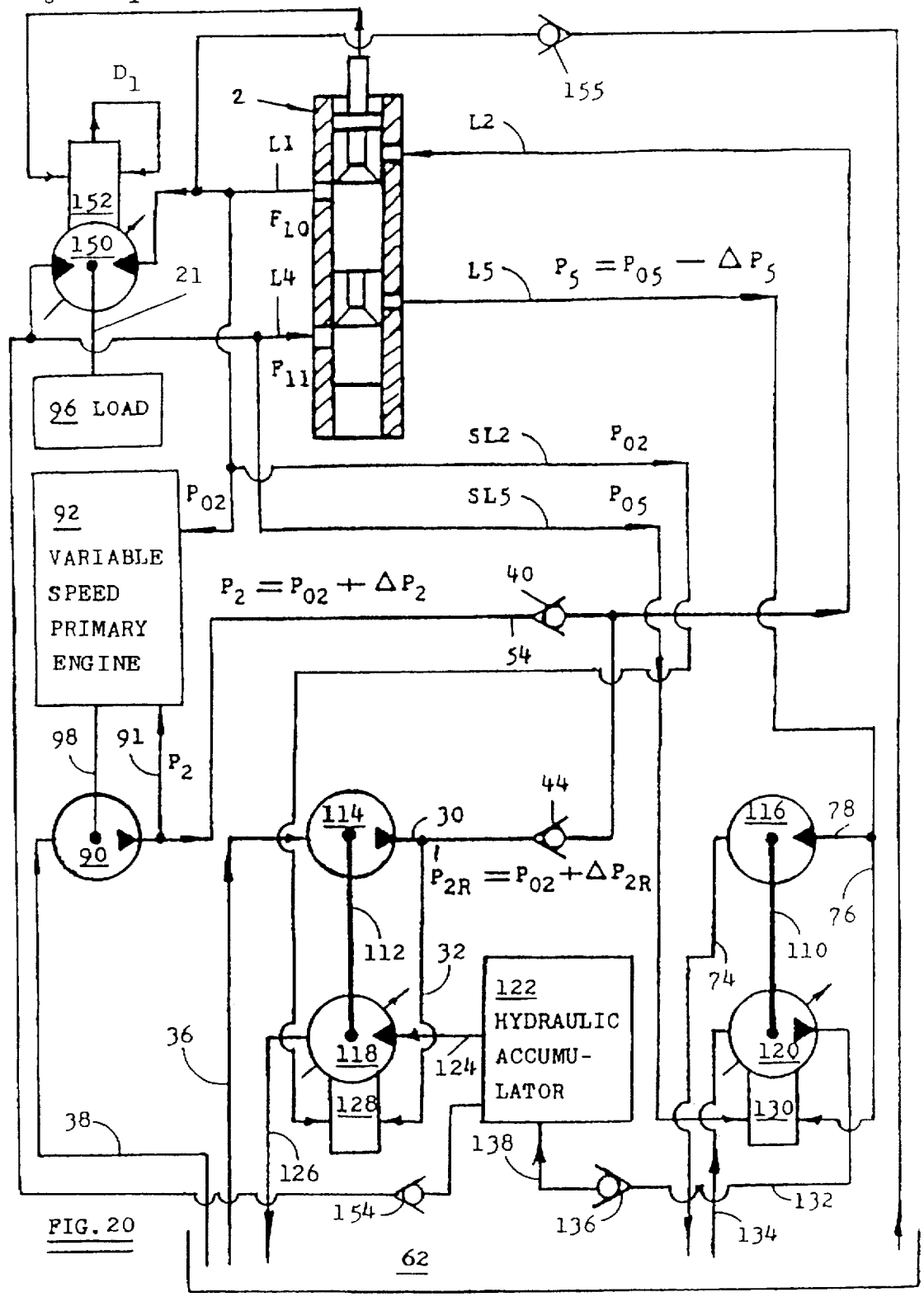
FIG. 20 shows a regenerative adaptive drive system having a variable displacement motor driving the load.

FIG. 20 is basically a repetition of FIG. 18; however, the variable speed primary motor 92 is introduced now by the variable speed primary internal-combussion engine 92. In addition, the constant displacement motor 1 driving the load 96 is replaced by a variable displacement motor 150 driving the same load. The variable displacement means 152 of motor 150 are constructed to make-up the displacement feedback control system including a variable displacement mechanism (of motor 150) and employing a displacement feedback control errow signal $\Delta D$. This errow signal is generated in accordance with a difference between a spool displacement (command signal) $D_o$ of valve 2 and a mechanism displacement (feedback signal) $D_1$ of the variable displacement mechanism of motor 150. The displacement feedback control errow signal $\Delta D=D_o-D_1$ is implemented for modulating the variable displacement mechanism of motor 150 for regulating the mechanism displacement $D_1$ of the variable displacement mechanism of motor 150 in accordance with the spool displacement $D_o$ of valve 2. It should be emphasized that the displacement feedback control system, which is well known in the art, is, in fact, the position feedback control system and that, therefore, the general position feedback control technique, which is characterised above with respect to the fluid motor position feedback control system, is also basically applicable to the displacement feedback control system.

As the spool of valve 2 is moving down from the "zero" position shown on FIG. 20, there are two consecutive stages of speed regulation of motor 150 the lower speed range is produced by changing the actual (orifice) opening of valve 2, the higher speed range is produced by changing the displacement of motor 150. Speaking more specifically, the lower speed range of motor 150 is defined between the "zero" spool position and the point of full actual (orifice) opening of valve 2. Up to this point, the command signal $D_o$ is kept constant, so that the displacement of motor 150 is maximum and is not changed.

The higher speed range of motor 150 is located beyond the point of full actual (orifice) opening of valve 2. Beyond this point (due to the spool shape of valve 2) the further spool displacements do not change any more the opening of valve 2. On the other hand, beyond this point, the command signal $D_o$ is being reduced by the further spool displacements of valve 2. Accordingly, the displacement $D_1=D_o-\Delta D$ of the variable displacement mechanism of motor 150 is being also reduced by the displacement feedback control system. The smaller the displacement of motor 150, the higher the speed of this motor (and the smaller the available torgue of this motor).

FIG. 20 also illustrates the use of check valves for restricting the maximum and minimum pressures in the hydraulic power lines. The check valve 154 is added to very efficiently restrict the maximum pressure in the exhaust motor line L4 by relieving an excess fluid from this line (through check valve 154) into the high-pressure hydraulic accumulator 122. The check valve 155 is added to effectively restrict the minimum pressure in the supply motor line L1 by connecting this line (through check valve 155) with the tank 62. Note that tank 62 can generally be replaced by a low-pressure hydraulic accumulator (accompanied by a small-supplementary tank).

Adaptive fluid control with a regenerative braking pump.

In the motor vehicles, such as the City Transit Buses, the available braking torque should be usually substantially larger than the available accelerating torque.

Figure 21:
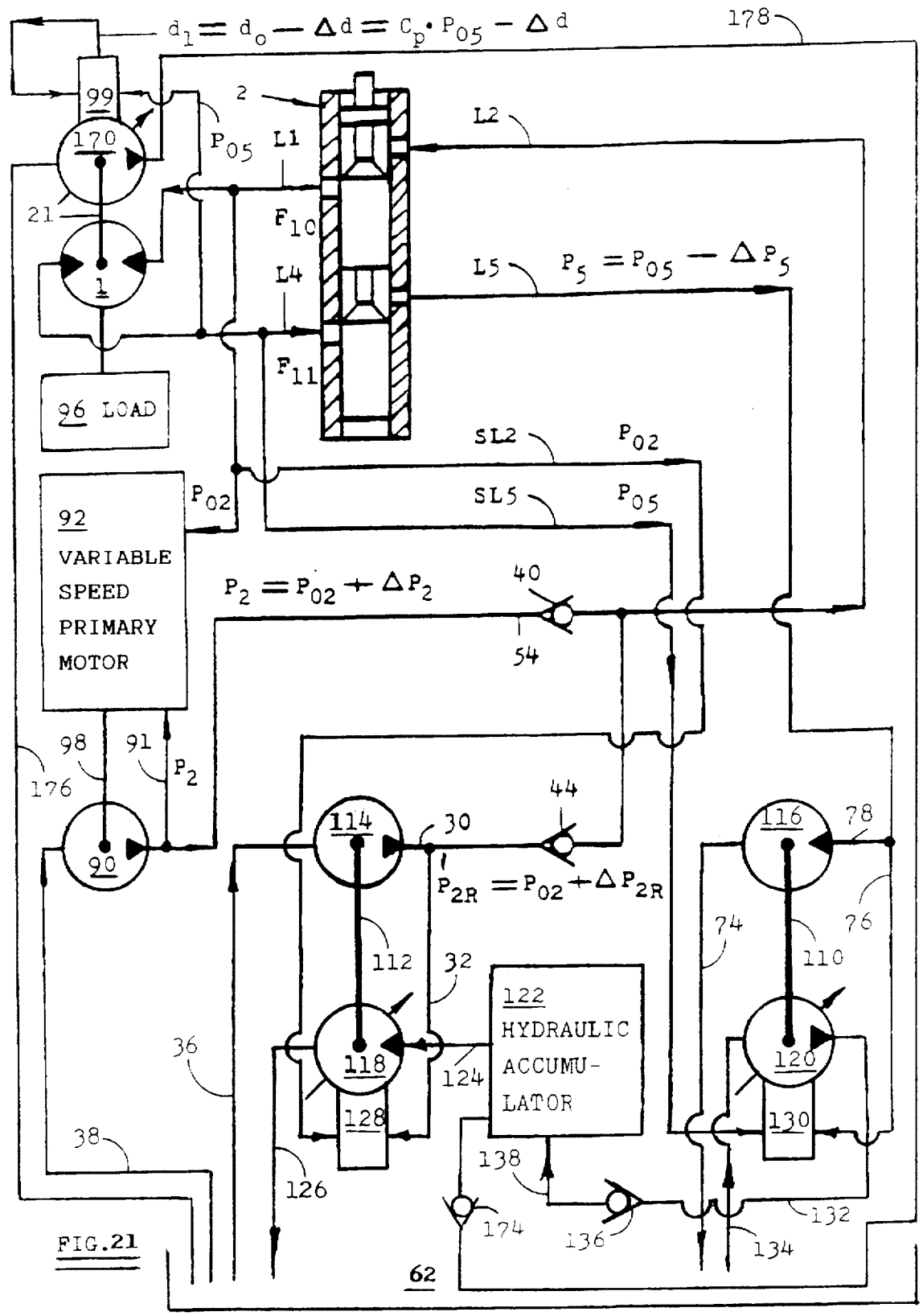
FIG. 21 shows a regenerative adaptive drive system having a regenerative braking pump.

FIG. 21 is basically a repetition of FIG. 18; however, the constant displacement motor 1 driving the load 96 is also driving a regenerative braking variable displacement pump 170 which is used to increase the available regenerative braking torque. The tank line 176 of pump 170 is connected to tank 62. The pressure line 178 of pump 170 is connected through check valve 174 to the hydraulic accumulator 122. The flow output of pump 170 is regulated in accordance with the pressure rate $P_{O5}$ in the motor line L4 conducting a motor fluid flow from the fluid motor 1, as it is more specifically explained below.

The variable displacement means 99 of pump 170 are constructed to make-up a displacement feedback control system including a variable displacement mechanism (of pump 170) and employing a displacement feedback control errow signal $\Delta d$. This errow signal is generated in accordance with a difference between a command-displacement signal $d_o = C_p \cdot P_{O5}$ (where $C_p$ is a constant coefficient) and a mechanism displacement (feedback signal) $d_1$ of the variable displacement mechanism of pump 170. A pressure-displacement transducer converting the pressure signal $P_{O5}$ to the proportional command-displacement signal $d_o = C_p \cdot P_{O5}$ is included into the variable displacement means 99 of pump 170. This transducer may incorporate, for example, a small spring-loaded hydraulic cylinder actuated by the pressure signal $P_{O5}$. This displacement feedback control errow signal $\Delta d = d_o - d_1$ is implemented for modulating the variable displacement mechanism of pump 170 for regulating the mechanism displacement $d_1$ of the variable displacement mechanism of pump 170 in accordance with the command signal $d_o$ (and hence, in accordance with the pressure rate $P_{O5} = d_o/C_p$ in the motor line L4). It should be emphasized that the displacement feedback control system, which is well known in the art, is, in fact, the position feedback control system and that, therefore, the general position feedback control technique, which is characterised above with respect to the fluid motor position feedback control system, is also basically applicable to the displacement feedback control system.

In general, the displacement control circuitry of pump 170 is adjusted so that, while the pressure $P_{O5}$ in the motor line L4 is comparatively low, this circuitry is not operative and $d_1 \cong 0$. As the pressure $P_{O5}$ in the motor line L4 is further raising-up, the displacement $d_1$ of pump 170 is increasing accordingly, so that the total regenerative braking torque is properly distributed between the fluid motor 1 and the regenerative braking pump 170.

Note that a significant dynamic performance superiority must be provided for the displacement feedback control system against the energy recupturing (recuperating) pressure drop feedback control system, in order to prevent their substantial dynamic operation interference. The concept of providing a "significant dynamic performance superiority" have been already generally introduced before and is further readily applicable to the displacement feedback control system versus the energy recupturing (recuperating) pressure drop feedback control system.

Adaptive fluid control patterns.

FIG. 22 is basically a repetition of FIG. 20; however, the variable speed primary internal-combussion engine 92 is now replaced by a relatively constant speed primary internal-combussion engine 100, while the constant displacement pump 90 is provided with a supply line pressure drop regulator 3-2 for maintaining the primary displacement pump 90 is adapted now for maintaining the pressure $P_2 = P_{O2} + \Delta P_2$ in line 54, as it was already illustrated, for example, by FIG. 19. In addition, the variable displacement motor 118 and the constant displacement pump 114 are replaced by the constant displacement motor 198 and the variable displacement pump 194, in order to provide a wider range of regulation of pressure $P_{2R} = P_{O2} + \Delta P_{2R}$ in line 30.

The assisting constant displacement motor 198 is powered by the hydraulic accumulator 122 (through shut-off valve 299) and is driving the assisting variable displacement pump 194 which is pumping the oil from tank 62 back into the accumulator 122 (through check valve 204 and shut-off valve 299). Actually, the output flow rate of accumulator 122 (in line 210) is equal to a difference between the input flow rate of motor 198 (in line 200) and the output flow rate of pump 194 (in line 124). The exhaust from motor 198 is used to power the line 30. The assisting variable displacement means 196 of pump 194 is modulated by the assisting pressure drop feedback signal $P_{2R} - P_{O2}$ to maintain pressure $P_{2R} = P_{O2} + \Delta P_{2R}$ in line 30—as before. The torque of pump 194 counterbalances the torque of motor 198. As the displacement of pump 194 is varied (by the assisting supply line pressure drop feedback control system) from the "maximum" to "zero", the pressure $P_{2R}$ in line 30 can be regulated from "almost zero" to the "maximum", accordingly. The check valve 208 connects line 132 (of pump 120) with the tank 62. The shut-off valve 299 is controlled by the load pressure signal $P_{O2}$. The check valve 208 and shut-off valve 299 are considered to be optional and are introduced only to illustrate more specifically some examplified patterns of controlling the load adaptive exchange of energy between the fluid motor and load means and the energy accumulating means. The related explanations are presented below.

Let's consider, first, a simple case, when the motor vehicle is moving in a horizontal direction only. While the motor vehicle is moving with a constant speed (or is being accelerated), the pressure $P_{O5}$ (in line L4) is very small and does not effect the initial displacement of pump 120, provided that pressure drop command signals $\Delta P_2$, $\Delta P_{2R}$, and $\Delta P_5$ are selected so that $\Delta P_5 > \Delta P_{2R} > \Delta P_2$, as it is required by expression (3). This initial pump displacement is made just slightly negative, in order to provide for the pump 120 a very small initial output (in line 134) directed to the tank 62, and thereby, to provide for the exhaust fluid flow (in line L5) a free passage through motor 116 to the tank 62. In other words, while the pressure signal $P_{O5}$ is very small, the check valve 208 is open, the check valve 136 is closed, and the pump 120 is actually disconnected from the accumulator 122. As the motor vehicle is being decelerated, the displacement of pump 120 is positive, the check valve 208 is closed, the check valve 136 is open, and the kinetic energy of a vehicle mass is converted to the accumulated energy of accumulator 122, as it was already explained above.

In a general case, the motor vehicle is moving in a horizontal direction, up-hill, and down-hill, and with the different speeds, accelerations, and decelerations; however, all what counts for controlling the energy recupturing pressure drop feedback control system, is the load rate and direction (which are measured by the pressure signals $P_{O5}$ and $P_{O2}$). While the pressure signal $P_{O5}$ is very small, the pump 120 is actually disconnected from the accumulator 122, and the exhaust fluid flow is passing freely through motor 116 to the tank 62. As the pressure signal $P_{O5}$ is increasing, the kinetic energy of a vehicle mass is converted to the accumulated energy of accumulator 122.

On the other hand, all what counts for controlling the primary and assisting supply line pressure drop feedback control systems (and the shut-off valve 299), is also just the load rate and direction (which are measured by the load pressure signals $P_{O2}$ and $P_{O5}$). While the pressure signal $P_{O2}$ is very small, the shut-off valve 299 is closed. After the pressure signal $P_{O2}$ is measurably increased, the shut-off valve 299 is open.

In short, there are many regenerative adaptive fluid control patterns which are basically adaptive to a motor load, while are also responsive to the specific needs of particular applications. All the variety of the regenerative adaptive fluid control patterns is, in fact, within the scope of this invention. FIG. 22 is still further studied later—with the help of supplementary FIGS. 23 to 25.

Adaptive fluid control: two major modifications.

There are two major modifications of adaptive fluid control having an independent regenerating circuitry. The first major modification is identified by using the variable speed primary motor 92 for regulating the primary supply fluid pressure drop, as illustrated by FIGS. 11, 16, 17, 18, 20, and 21. The second major modification is identified by using the supply line pressure drop regulator 3-2 for regulating the primary supply fluid pressure drop, as illustrated by FIGS. 12, 19, and 22. It is important to stress that these two major modifications are often convertible. For example, the schematics shown on FIGS. 11, 16, 17, 18, 20, and 21 can be modified by replacing the variable speed primary motor 92 by a constant speed primary motor 100 and by using the supply line pressure drop regulator 3-2 for regulating the primary supply fluid pressure drop $P_2-P_{O2}=\Delta P_2$, as it is illustrated by FIGS. 12, 19, and 22. The transition to the modified schematics is further simplified by providing a constant speed control system for the variable speed motor 92 and by converting, thereby, this variable speed motor to a constant speed motor.

Regenerative adaptive drive systems.

It should be emphasized that the combined schematics providing an automatic transition from the one mode of operation to the other are especially attractive for the motor vehicle applications. The examplified modifications of combined schematics can be briefly characterized as follows.

1. The motor vehicle is first accelerated by actuating the pressure drop regulator—as illustrated by FIG. 22, and is further accelerated by actuating the variable speed primary internal-combustion engine—as illustrated by FIG. 20. This first modification of combined schematics can be viewed as a basic (or first) option of operation.

2. The motor vehicle is first accelerated with actuating the pressure drop regulator 3-2—as illustrated by FIG. 22, is further accelerated by actuating the variable speed primary internal-combustion engine—as illustrated by FIG. 20, and is still further accelerated by actuating the variable displacement mechanism of motor 150—as illustrated by FIGS. 20 and 22. Note that in this case, the engine will be usually fully loaded only during the third stage of speed regulation—just after the displacement of motor 150 is sufficiently reduced. Note also that the minimum possible displacement of motor 150 must be restricted by the desirable maximum of engine load (which can be measured, for example, by the desirable maximum of pressure $P_{O2}$ in line L1 of motor 150).

3. The motor vehicle is first accelerated with actuating the pressure drop regulator 3-2—as illustrated by FIG. 22, and is further accelerated by actuating the variable speed primary internal-combustion engine—as illustrated by FIG. 20. Contrary to point 2, there is no third consecutive stage of speed regulation (by using the variable displacement motor 150). Instead, the displacement of motor 150 is controlled independently by using the pressure signal $P_{O2}$ which is provided by line L1. The larger the pressure signal $P_{O2}$, the larger the displacement of motor 150—within the given limits, of course.

4. The motor vehicle is provided with two relatively small engines. The first engine is usually in operation all the time. The second engine is usually switched-in only temporarily, while the motor vehicle is moving up-hill with a high speed. Each engine is driving a separate pump (like pump 90). Each engine-pump instalation is working with a separate spool valve (like spool valve 2).

5. The second option of operation (see point 2) is applied to the first engine-pump instalation of the two-engine vehicle of point 4.

6. The first option of operation (see point 1) is applied to the second engine-pump instalation of the two-engine vehicle of point 4.

7. The third option of operation (see point 3) is applied to the first engine-pump instalation of the two-engine vehicle of point 4.

8. The third option of operation (see point 3) is also applied to the second engine-pump instalation of the two-engine vehicle of point 4.

9. The independent regenerating circuitry, such as shown on FIGS. 11 to 22, can be easily switched-off by the driver in the process of operating a motor vehicle. This can be accomplished by using a directional valve switching over the exhaust power line L5 from the energy regenerating circuitry to the tank.

10. Note that regenerative adaptive drive system, such as shown on FIG. 22, can be modified by replacing the "stationary" exhaust line energy recupturing means (the constant displacement motor 116 driving the variable displacement pump 120) and the "stationary" assisting variable delivery fluid power supply (the constant displacement motor 198 driving the variable displacement pump 194) by only one "shuttle-type" motor-pump instalation including a constant displacement motor driving a variable displacement pump. Let's assume, for example, that wheeled vehicle is moving in a horizontal direction only. While the vehicle is decelerated, this motor-pump instalation is switched-in to perform as the "made-up" exhaust line energy recupturing means. While the vehicle is accelerated, this motor-pump instalation is switched-in to perform as the "made-up" assisting variable delivery fluid power supply.

Integrated drive system.

The energy regenerating, load adaptive drive system of a wheeled vehicle can be still further modified to provide an optional mechanical connection of the engine shaft with the wheels of the vehicle. This optional mechanical connection can be used, for example, for long-distance driving.

The design of modified-integrated drive system may include an integrating mechanical transmission to select one of two alternative—component systems as follows:

1. The basic regenerative adaptive drive system—see FIGS. 17 to 22. In this case, the engine of a vehicle is connected with the primary pump 90. The back axil of a vehicle is driven by the constant displacement motor 1 (or by the variable displacement motor 150).

2. The optional conventional power train. In this case, the shaft of the engine is connected mechanically to the back axil of a vehicle.

CONCLUSIONS

Regenerative adaptive fluid motor control: the energy recuperating pressure drop feedback control system.

A regenerative adaptive fluid motor control system having an independent regenerating circuitry (see FIGS. 11 to 22) is an integrated system incorporating only two major components:

a) the two-way load adaptive fluid motor control system which is adaptive to the motor load along the exhaust and supply power lines of the spool valve 2, and b) the two-way load adaptive energy regenerating system which is also adaptive to the motor load along the exhaust and supply power lines of the spool valve 2.

The regenerative system having an independent regenerating circuitry is characterized by that the primary and assisting supply line pressure drop feedback control systems are separated. On the other hand, the exhaust line pressure drop feedback control system (which can also be referred to as the energy recupturing pressure drop feedback control system) is shared between the two-way load adaptive fluid motor control system and the two-way load adaptive energy regenerating system. The energy recupturing pressure drop feedback control system includes an exhaust line energy recupturing means for varying a counterpressure rate in the exhaust power line and for recupturing a load related energy, such as a kinetic energy of a load mass or a compressed fluid energy of a fluid motor-cylinder. The energy recupturing pressure drop feedback control system and the exhaust line energy recupturing means can also be referred to as the energy recuperating pressure drop feedback control system and the exhaust line energy recuperating means, respectively.

Load adaptive energy regenerating system.

The above brief description of examplified load adaptive energy regenerating systems (see FIGS. 11 to 22) can be still further generalized and extended by the comments as follows.

1. In a load adaptive energy regenerating system, there are basically four major components; the fluid motor and load means, the first load adaptive energy converting means, the energy accumulating means, and the second load adaptive energy converting means.
2. The fluid motor and load means include the fluid motor means and the motor load means and accumulate a load related energy (such as a kinetic energy of a load mass or a compressed fluid energy of the fluid motor-cylinder) for storing and subsequent regeneration of this load related energy.
3. As it was already mentioned before, the "exhaust fluid energy" of the exhaust fluid flow is understood as a measure of the load related energy being transmitted through the exhaust power line (that is line L3 or line L5). The "exhaust fluid energy" can also be referred to as a "waste fluid energy", that is the energy which would be wasted unless regenerated.
4. The first load adaptive energy converting means include the energy recupturing pressure drop feedback control system and convert the load related energy of the fluid motor and load means to an accumulated energy of the energy accumulating means for storing and subsequent use of this accumulated energy. The high energy-efficient, load adaptive process of converting the load related energy to the accumulated energy is facilitated by regulating the exhaust fluid pressure drop across spool valve 2 by the energy recupturing pressure drop feedback control system and is basically controlled by the motor load. Note that the energy is being accumulated by the energy accumulating means, while the motor load is negative (for example, during the deceleration of a motor vehicle).
5. The second load adaptive energy converting means include the assisting supply line pressure drop feedback control system and convert the accumulated energy of the energy accumulating means to an assisting pressurized fluid stream being implemented for powering the supply power line L2 of spool valve 2. The assisting pressurized fluid stream is actually generated by an assisting variable delivery fluid power supply which is included into the assisting supply line pressure drop feedback control system and which is powered by the energy accumulating means. The high energy-efficient, load adaptive process of converting the accumulated energy to the assisting pressurized fluid stream is facilitated by regulating the assisting supply fluid pressure drop across spool valve 2 by the assisting supply line pressure drop feedback control system and is basically controlled by the motor load. Note that the energy is being released by the energy accumulating means, while the motor load is positive (for example, during the acceleration of the motor vehicle).
6. Because the accumulation, storage, and release of the accumulated energy are all controlled by the motor load, the load adaptive energy regenerating system, as a whole, is also basically controlled by the motor load.
7. It can also be concluded that:
   (a) the regeneration of a load related energy of the fluid motor and load means is facilitated by regulating the exhaust fluid pressure drop across valve 2 by the energy recupturing pressure drop feedback control system;
   (b) the regeneration of a load related energy of the fluid motor and load means is also facilitated by regulating the assisting supply fluid pressure drop across valve 2 by the assisting supply line pressure drop feedback control system.

Regenerative adaptive fluid motor control system.

The above brief description of examplified regenerative adaptive fluid motor control systems (see FIGS. 11 to 22) can be still further generalized and extended by the comments as follows.

1. The primary supply line pressure drop feedback control system includes a primary variable pressure fluid power supply generating a primary pressurized fluid stream being implemented for powering the supply power line L2 of the spool valve 2. The assisting supply line pressure drop feedback control system includes an assisting variable delivery fluid power supply generating an assisting pressurized fluid stream being also implemented for powering the supply power line L2 of the spool valve 2.
2. Note that assisting pressure rate $P_{2R}=P_{02}+\Delta P_{2R}$ of the assisting pressurized fluid stream is being correlated with the primary pressure rate $P_2=P_{02}+\Delta P_2$ of the primary pressurized fluid stream. Note also that $\Delta P_{2R}>\Delta P_2$ and, therefore, $P_{2R}>P_2$, while there is still any meaningful energy left in the energy accumulator.
3. In accordance with point 2, the assisting pressurized fluid stream has a priority over the primary pressurized fluid stream in supplying the fluid power to the supply power line L2.
4. Speaking more generally, it can be concluded that regeneration of a load related energy of the fluid motor and load means is accomadated by correlating the primary pressure rate of the primary pressurized fluid stream with the assisting pressure rate of the assisting pressurized fluid stream by regulating the primary supply fluid pressure drop across valve 2 and regulating the assisting supply fluid pressure drop across valve 2 by the primary supply line pressure drop feedback control system and the assisting supply line pressure drop feedback control system, respectively.
5. The exhaust line energy recupturing means of the energy recupturing pressure drop feedback control systems can be introduced by the exhaust line variable displacement motor 66—see FIGS. 11, 12, 16, 17, or by the exhaust line constant displacement motor 116 driving the exhaust line variable displacement pump 120—see FIGS. 18 to 22.
6. The assisting variable delivery fluid power supply, which is powered by the energy accumulating means, can be introduced by the assisting variable displacement pump 55—see FIGS. 11, 12, 16, 17, or by the assisting variable displacement motor 118 driving the assisting constant displacement pump 114—see FIGS. 18 to 21. The assisting variable delivery fluid power supply can also be introduced by the assisting constant displacement motor 198 driving the assisting variable displacement pump 194—as it is illustrated by FIG. 22.

7. The primary variable delivery fluid power supply can be introduced by the primary constant displacement pump 90 being by-passed by the supply line pressure drop regulator 3-2—see FIGS. 12, 19, and 22 or by the variable speed primary motor (or engine) 92 driving the primary fluid pump—see FIGS. 11, 16, 17, 18, 20 and 21.

8. In accordance with points 5, 6, and 7 and the above description, any pressure drop regulation is accomplished by the related pressure drop feedback control system by implementing the related pressure drop feedback signal for modulating one of the following:

a) the variable displacement means of the variable displacement pump, b) the variable displacement means of the variable displacement motor, c) the variable speed primary motor (or the variable speed primary engine) driving the primary fluid pump.

d) the pressure drop regulator which is well known in the Art as a standard component for the pressure drop regulation.

9. The variable displacement pumps having the built-in pressure drop feedback controllers are well known in the art. This type of control for the variable displacement pump is often called a "load sensing control" and is described in many patents and publications (see, for example, Budzich—U.S. Pat. No. 4,074,529 of Feb. 21, 1978). Moreover, the variable displacement pumps with the load-sensing pressure drop feedback controllers are produced (in a mass amount) by many companies which provide catalogs and other information on this load sensing control. Some of these companies are:

a) THE OILGEAR COMPANY, 2300 South 51th Street, Milwaukee, Wis. 53219, U.S.A. (see, for example, Bulletin 47016A);

b) SAUER-SUNDSTRAND COMPANY, 2800 East 13th Street, Ames, Iowa 50010, U.S.A. (see, for example, Bulletin 9825, Rev.E);

c) DYNEX/RIVETT, INC., 770 Capitol Drive, Pewaukee, Wis. 53072, U.S.A. (see, for example, Bulletin PES-1289). Furthermore, the additional information of general nature on the feedback control systems and the hydraulic control systems is also readily available from many publications—see, for example, the books already named above. In short, the load-sensing pressure drop feedback controllers of the variable displacement pumps are, indeed, well known in the Art.

10. Comparing points 8 and 9, it can be concluded that the load adaptive variable displacement means (of the variable displacement pumps and the variable displacement motors), which are used in this invention, are basically similar with the well-known load-sensing pressure drop feedback controllers of the variable displacement pumps. These load adaptive displacement means can also be referred to as the load adaptive displacement controllers.

11. It is important to stress that load adaptive displacement means and the related pressure drop feedback control systems, make it possible to eliminate the need for any special (major) energy commutating equipment.

Load adaptive displacement means and the energy regenerating circle.

Returning to FIG. 22, let's consider more specifically the load adaptive displacement means 196 of pump 194 and the load adaptive displacement means 130 of pump 120. The examplified schematics of load adaptive displacement means 196 and 130 are presented by FIGS. 23 and 24, respectively.

These simplified schematics show:

(1) swashplates 246 and 266 of the variable displacement pumps;

(2) swashplate hydraulic cylinders 242 and 262;

(3) forces $F_{S2}$ and $F_{S5}$ of the swashplate precompressed springs;

(4) swashplate displacement restrictors 248 and 268;

(5) swashplate spool valves 250 and 270;

(6) the spool precompressed springs 254 and 274 defining command signals $\Delta P_{2R}$ and $\Delta P_5$, respectively;

(7) the principal angular positions of swashplates ("zero" angle, regulated angles, maximum angle, and small negative angle).

Figure 23:
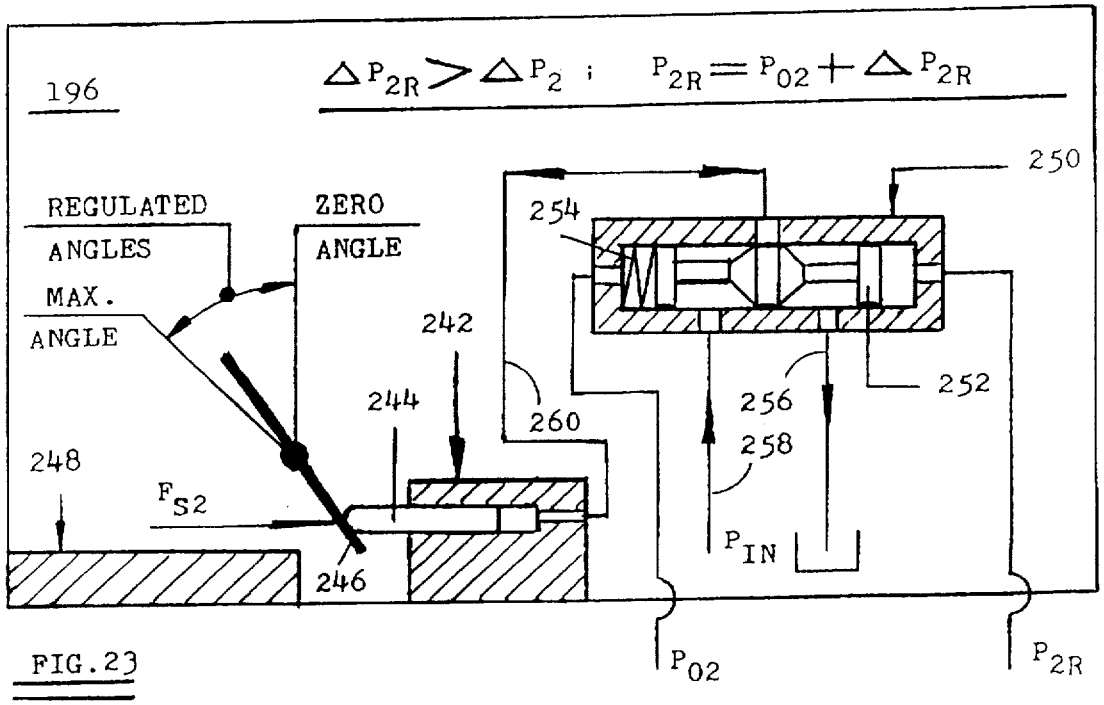
FIG. 23 shows the load adaptive displacement means of the assisting supply line pressure drop feedback control system.
Figure 24:
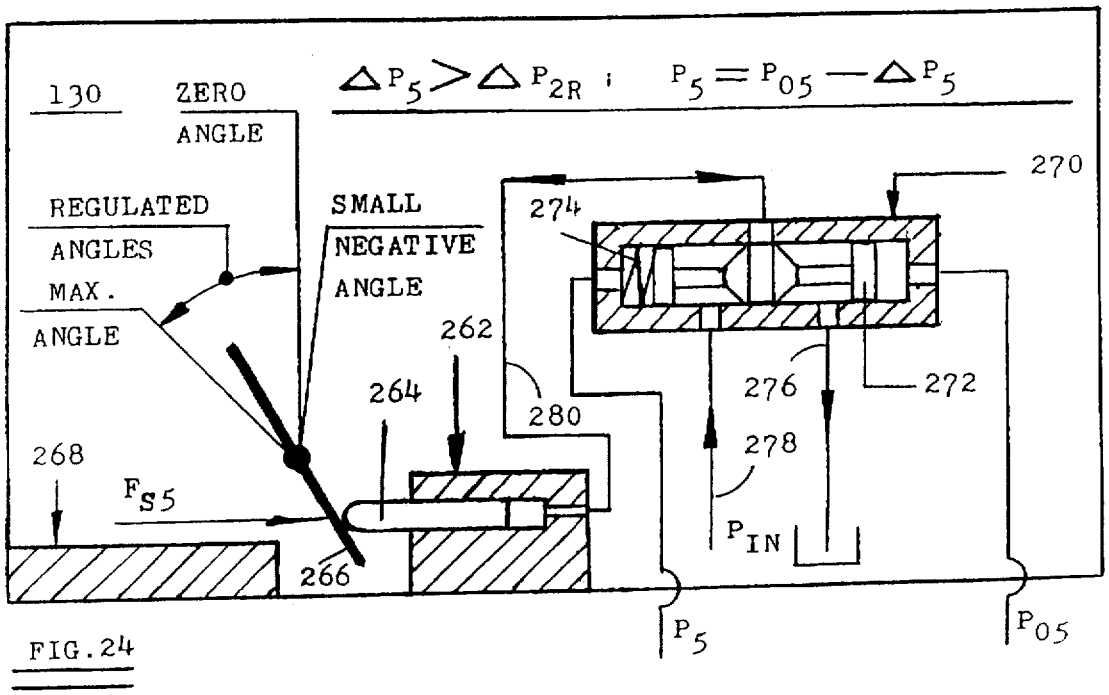
FIG. 24 shows the load adaptive displacement means of the energy recupturing pressure drop feedback control system.

FIGS. 23 and 24 are simplified and made similar to the extend possible. Each swashplate is driven by a plunger of the related cylinder against the force of a precompressed spring. Each hydraulic cylinder is controlled by the related three-way spool valve which is also provided with the pressure and tank lines. The pressure line is powered by an input pressure $P_{IN}$ which is supplied by any appropriate pressure sourse. The valve spool is driven by a pressure drop feedback signal against the force of the precompressed spring defining the pressure drop command signal. Note that three-way valve can also be replaced by a two-way valve which does not have the tank line (in this case the tank line is connected through a throutle valve to the line of hydraulic cylinder).

The assisting supply line pressure drop feedback signal $P_{2R}-P_{02}$ is applied to the spool 252 of valve 250 (see FIG. 23) to construct the assisting supply line pressure drop feedback control system and, thereby, to maintain pressure $P_{2R}=P_{02}+\Delta P_{2R}$ in the outlet line 30 of the assisting constant displacement motor 198 which is driving the assisting variable displacement pump 194 (as it was already basically explained before). At the balance of the assisting supply line pressure drop feedback control, the spool 252 of valve 250 is in the neutral spool position which is shown on FIG. 23. Note that $\Delta P_{2R} > \Delta P_2$, as it was already indicated before.

The exhaust line pressure drop feedback signal $P_{05}-P_5$ is applied to the spool 272 of valve 270 (see FIG. 24) to construct the energy recupturing pressure drop feedback control system and, thereby, to maintain pressure $P_5=P_{05}-\Delta P_5$ in the exhaust line L5 powering the exhaust line constant displacement motor 116 which is driving the exhaust line variable displacement pump 120 (as it was already basically explained before). At the balance of the exhaust line pressure drop feedback control, the spool 272 of valve 270 is in the neutral spool position which is shown on FIG. 24. Note that pressure drop command signals $\Delta P_2$, $\Delta P_{2R}$, and $\Delta P_5$ are selected so that $\Delta P_5 > \Delta P_{2R} > \Delta P_2$, as it is required by expression (3).

FIG. 25 illustrates an examplified energy regenerating circle. It is assumed that the wheeled vehicle is moving in a horizontal direction only. As the vehicle is moving with a constant speed, decelerated, completely stoped, and accelerated, the related energy regenerating circle is completed. This stop-and-go energy regenerating circle has been already briefly introduced before (to explain the concept of preventing a substantial pressure drop regulation interference) and is easily readable on FIG. 25, when considered in conjuction with FIGS. 22 to 24 and the related text. For example, while the vehicle is decelerated, the swashplate 266 is positioned as indicated on FIG. 24. While the vehicle is accelerated, the swashplate 246 is positioned as indicated on FIG. 23.

Regenerative drive system having the combined energy accumulating means.

The schematic shown on FIG. 19 is now further modified to replace the independent regenerating circuitry by the built-in regenerating circuitry and to improve the utilization of the combined energy accumulating means. Accordingly, the assisting variable delivery fluid power supply (motor 118 driving pump 114), the check valves 40 and 44, and the electrohydraulic energy converting means 142 are eliminated. The modified schematic is shown on FIG. 26. The added components are: (a) electrical motor-generator 290, (b) constant displacement motor 300, (c) shut-off valve 298, and (d) check valve 296. The primary engine (motor) 100, the direct-current motor-generator 290, the hydraulic motor 300, and the hydraulic pump 90 are all mechanically connected by a common shaft 98. The motor-generator 290 is also electrically connected (through lines 292 and 294) with the electrical accumulator 144. On the other hand, the hydraulic accumulator 122 is hydraulically connected (through shut-off valve 298) with the inlet line 302 of motor 300.

Figure 26:
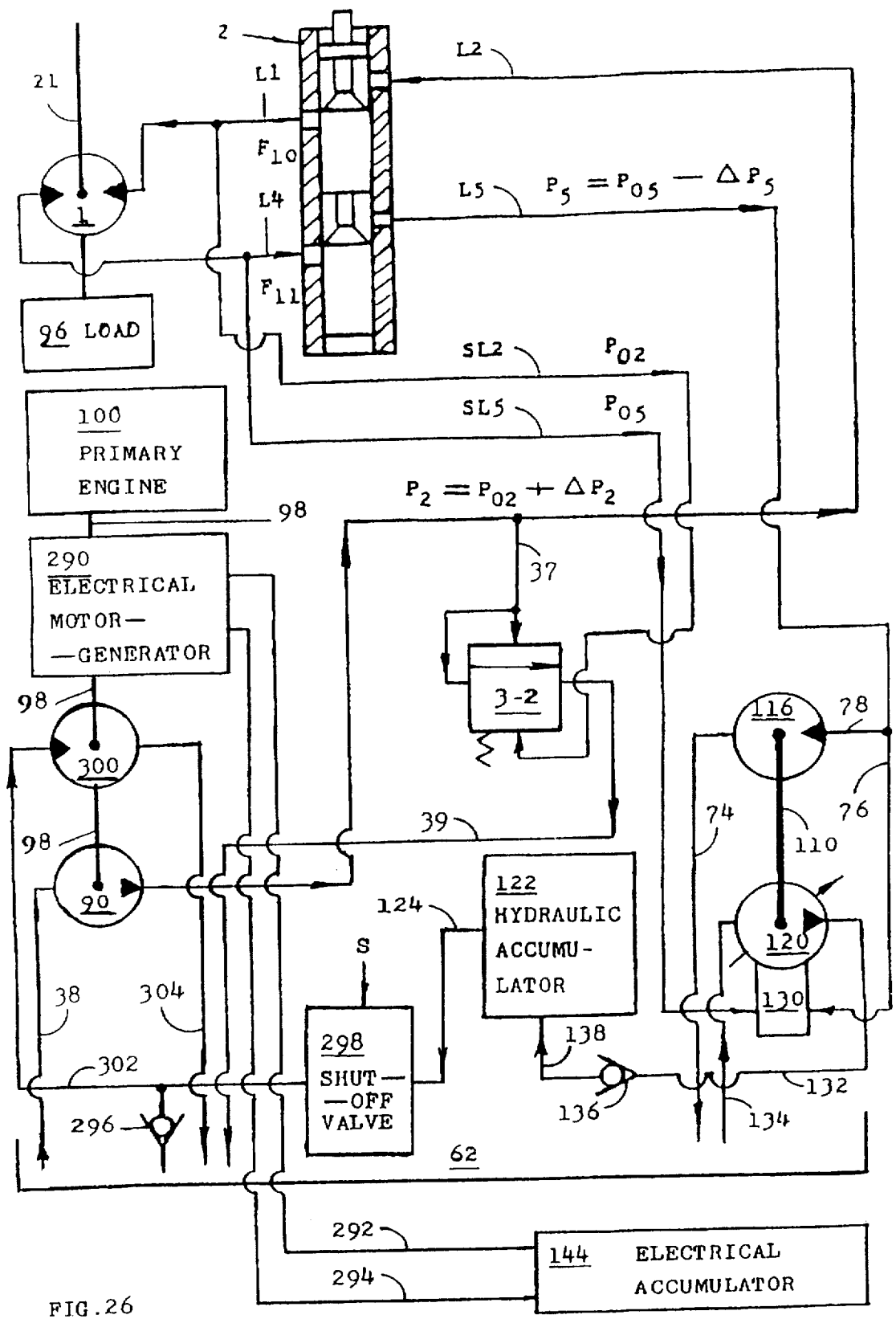
FIG. 26 shows a modified regenerative system having the combined energy regenerating means.

The regenerative drive system of FIG. 26 makes it possible to minimize the required engine size of a wheeled vehicle. The engine 100 is provided with a speed control system which is assumed to be included in block 100 and which is used to maintain a preselected (basic) speed of shaft 98 while allowing some speed fluctuations under the load which is applied to the shaft 98. The related margin of accuracy of the speed control system is actually used to maintain a balance of power on the common shaft 98 and, thereby, to minimize the required engine size of a wheeled vehicle.

The driving torque of shaft 98 is generally produced by engine 100, by motor-generator 290 (when it is working as a motor), and by motor 300 (when it is powered by the hydraulic accumulator 122 through shut-off valve 298). The loading torque of shaft 98 is basically provided by pump 90 and by motor-generator 290 (when it is working as a generator). Note that at some matching speed of shaft 98 (within the margin of accuracy of the speed control system) a speed-dependent voltage of generator 290 is equal to a charge-dependent voltage of accumulator 144, so that no energy is transmitted via lines 292 and 294. As the speed of shaft 98 is slightly reduced, the electrical energy is transmitted from the electrical accumulator 144 to the electrical motor 290 helping engine 100 to overcome the load. On the other hand, as the speed of shaft 98 is slightly increased, the electrical energy is transmitted from the electrical generator 290 to the electrical accumulator 144, allowing to utilize the excess power of shaft 98 for recharging the electrical accumulator 144. Note also that shut-off valve 298 is normally closed and is open only under some preconditions—in order to power the constant displacement motor 300 by the hydraulic energy of accumulator 122.

Let's assume, first, that a wheeled vehicle, such as a city transit bus, is moving in a horizontal direction only. And let's consider briefly the related energy regenerating circle.

1. As the bus is moving with a constant speed, the pump 90 is basically powered by engine 100.
2. As the bus is decelerated, the mechanical energy of a bus mass is converted to the hydraulic energy of accumulator 122. The excess energy of accumulator 122 is converted—via valve 298, motor 300, and generator 290—to the electrical energy of accumulator 144. The primary engine 100 may also participate in recharging the electrical accumulator 144.
3. As the bus is stoped, the engine 100 is used only for recharging the electrical accumulator 144.
4. As the bus is accelerated, the pump 90 is basically powered by motor 300 and is also powered by engine 100 and motor 290. The constant displacement motor 300 is powered by the hydraulic accumulator 122 through shut-off valve 298.

As the bus is moving up-hill, the pump 90 is driven by engine 100 and motor 290 which is powered by electrical accumulator 144. As the bus is moving down-hill, the mechanical energy of a bus mass is converted to the hydraulic energy of accumulator 122, and this hydraulic energy is further converted—via valve 298, motor 300, and generator 290—to the electrical energy of accumulator 144.

An optional control signal "S" which is applied to the shut-off valve 298, is produced by an optional control unit which is not shown on FIG. 26. This control unit can be used for controlling such optional functions as follows:

(a) opening shut-off valve 298—when the vehicle is accelerated;
(b) opening shut-off valve 298—when the vehicle is moving down-hill and after accumulator 122 is substantially charged;
(c) opening shut-off valve 298—when the vehicle is decelerated, in order to convert the excess energy of hydraulic accumulator 122 to the electrical energy of accumulator 144;
(d) opening shut-off valve 298 just after accumulator 122 is substantially charged.

It should be emphasized that schematic of FIG. 26 is of a very general nature. The examplified modifications of this schematic can be briefly characterized as follows:

(a) the constant displacement motor 300 is of a smaller flow capacity in comparison with the variable displacement pump 90;
(b) the variable displacement pump 90 is also used as a motor to provide an alternative route for transmission of energy from accumulator 122 to the common shaft 98;
(c) providing at least two preselectable (basic) speeds of shaft 98 to respond to the changing load invironments;
(d) modifying the hybrid motor means driving pump 90—as it is explained at the end of this description.

Two basic types of regenerative systems.

Figure 27:
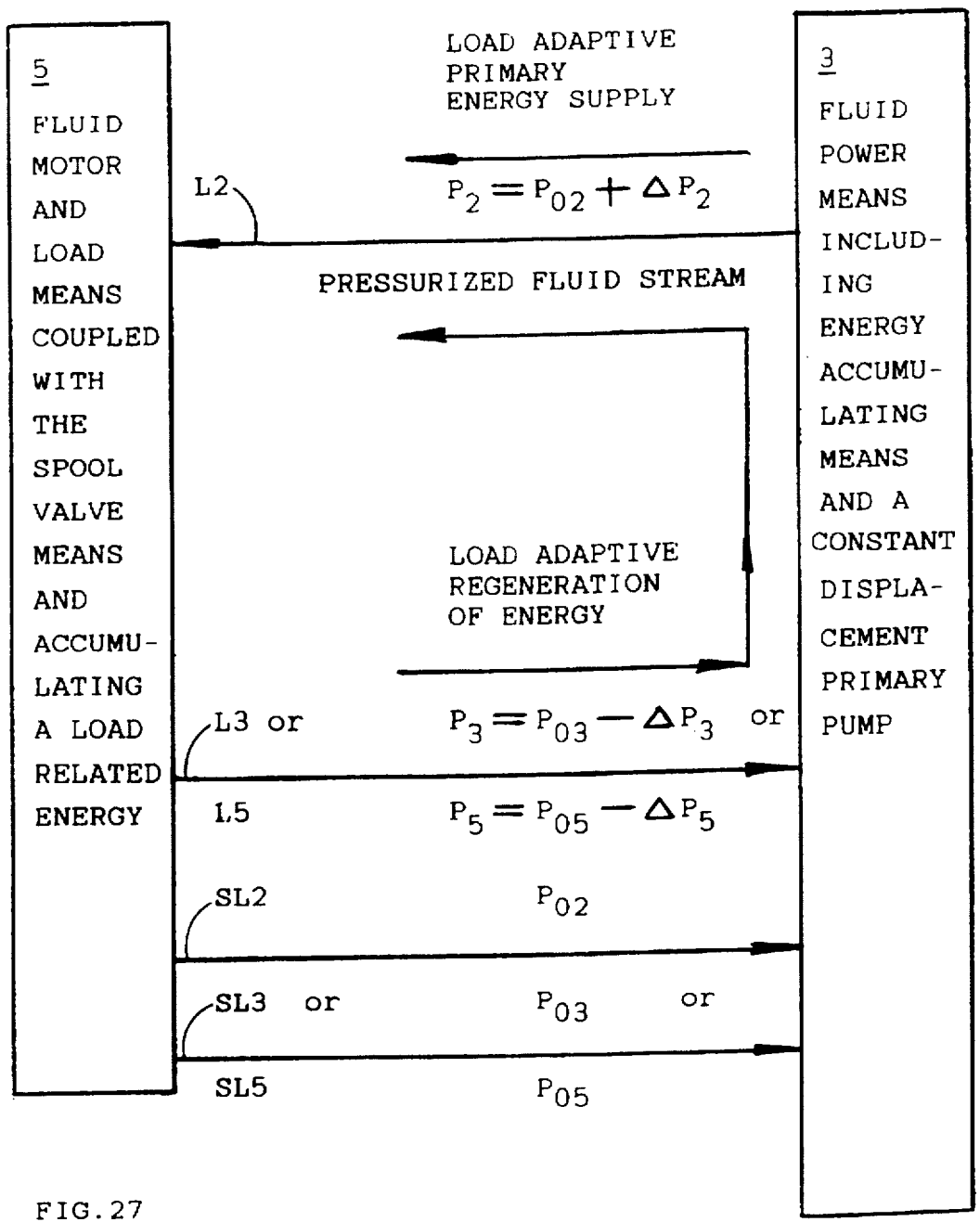
FIG. 27 shows a generalized regenerative system having a built-in regenerating circuitry.

There are basically two types of regenerative adaptive fluid motor control systems: (a) the regenerative system having an independent regenerating circuitry (see FIGS. 11 to 22) and (b) the regenerative system having a built-in energy regenerating circuitry (see FIGS. 9, 10, and 26). The first type of regenerative systems is identified by that the primary and assisting supply line pressure drop feedback control systems are separated. The second type of regenerative systems is identified by that the primary and assisting supply line pressure drop feedback control systems are not separated and are represented by only one supply line pressure drop feedback control system. The generalized first-type systems have been already introduced by FIGS. 13, 14, and 15. A generalized second-type system is shown on FIG. 27, which is mostly self-explanatory and is still further understood when compaired with FIGS. 9, 10, 26, and 15.

Note that transition from the first to the second type of regenerative systems is accomplished typically by replacing the separated primary and assisting supply line pressure drop feedback control systems by only one supply line pressure drop feedback control system and by implementing the primary power supply means for powering the energy accumulating means. For example, in the regenerative system of FIG. 22, the transition from the independent regenerating circuitry to the built-in regenerating circuitry can be accomplished by eliminating the separated primary supply line pressure drop feedback control system and by implementing the primary pump 90 for powering the hydraulic accumulator 122 (the resulted schematic can be still further modified to incorporate also an electrical accumulator).

The two basic types of regenerative systems can generally be combined to include both—the built-in regenerating circuitry and the independent regenerating circuitry. For example, in the regenerative system of FIG. 26, the transition to the combined schematic can be accomplished by adding an assisting supply line pressure drop feedback control system, which is shown on FIG. 22 and which includes the constant displacement motor 198 driving the variable displacement pump 194. The resulted combined schematic is also applicable to the wheeled vehicles.
Adaptive fluid control and the load environments.

It is understood that this invention is not limited to any particular application. It is to say that FIGS. 1, 4, 9, and 12, are not related only to the hydraulic presses. It is also to say that FIGS. 10, 11, 16 to 22, and 26 are not related only to the motor vehicles. In fact, the typical adaptive schematics which are shown on FIGS. 1, 4, 6, 9 to 12, 16 to 22, and 26 are exclusively associated only with a type of motor load of the fluid motor 1 (or 150), as it is characterized below:

(a) the schematics shown on FIGS. 1, 4, 9, and 12 are adaptive to the one-directional static load force:

(b) the schematics shown on FIGS. 10, 11, 16 to 22, and 26 are adaptive to the two-directional dynamic load force, which is generated during acceleration and deceleration of a load mass moving only in one direction;

(c) the schematic shown on FIG. 6, is adaptive to the two-directional static load forces.

The above load-related simplified classification of typical adaptive schematics is instrumental in modifying these schematics for the modified load environments.

For example, the schematic shown on FIG. 18 is adaptive to the two-directional dynamic load force, which is generated during acceleration and deceleration of a load mass moving only in one direction. If the load environments are modified by replacing this two-directional dynamic load force by the one-directional static load force, the schematic of FIG. 18 must be also modified. The modified schematic may include the five-way spool valve 2 instead of the four-way spool valve 2 which is shown on FIG. 18. In this case, the energy regenerating circuitry using hydraulic accumulator 122 must be switched over from the exhaust power line L5 to the exhaust power line L3, as it is illustrated by FIG. 12—for a case of using the fly wheel accumulator 94. Adaptive fluid control with a supplementary output motor.

There is one special modification of independent regenerating circuitry which is not covered by the generalized schematic of FIG. 15 and which, therefore, is considered below. The regenerative braking pump 170 of FIG. 21 can also be used as a variable displacement motor to make-up a supplementary variable displacement motor/pump. The pump functions of this supplementary output motor/pump have been already studied with the help of FIG. 21. For simplicity, the motor functions of this supplementary output motor/pump will also be studied separately.

Figure 28:
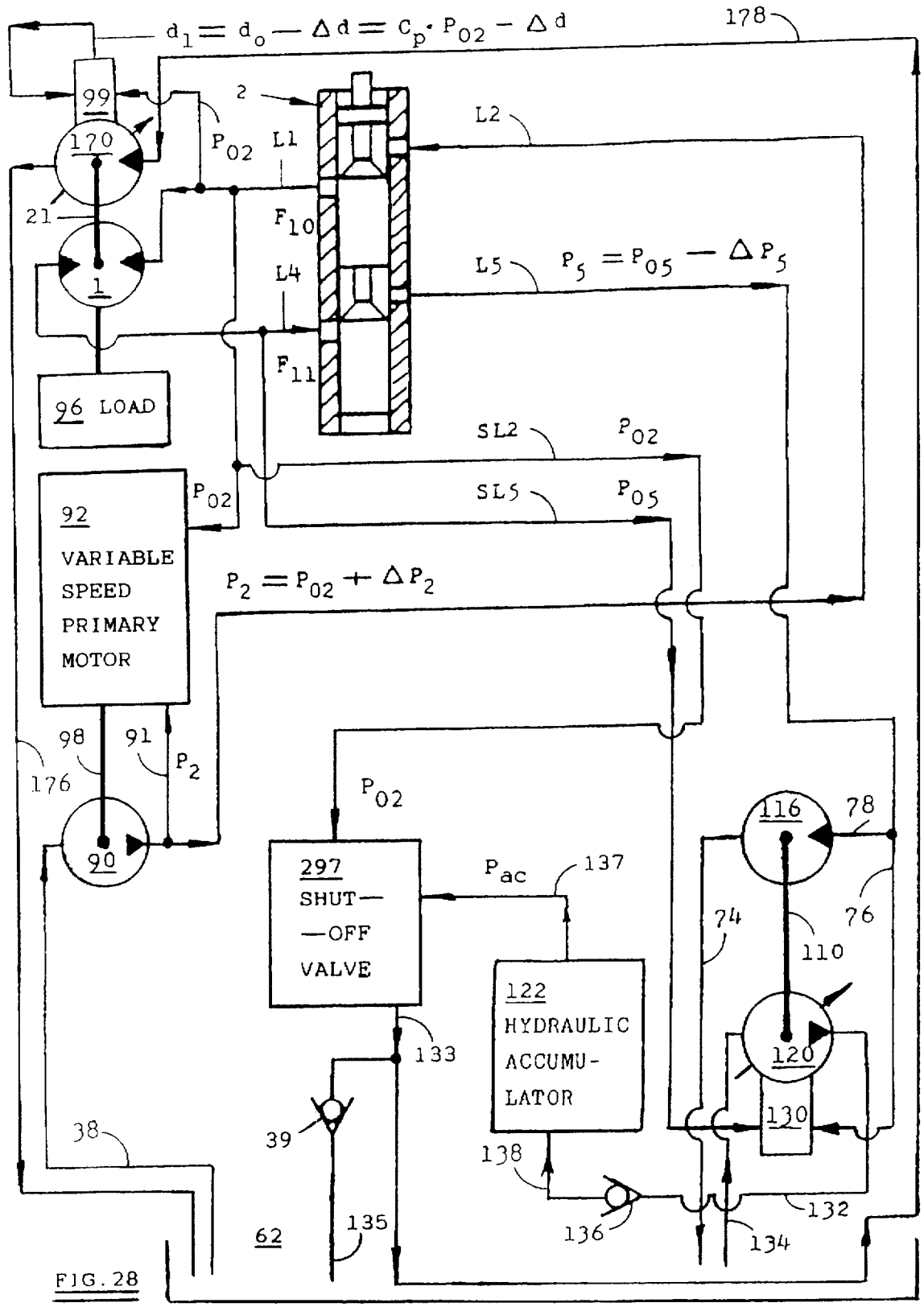
FIG. 28 shows a regenerative adaptive drive system having a supplementary output motor.

FIG. 28 is derived from FIG. 21 by replacing the supplementary output pump 170 by the supplementary output motor 170 and by eliminating the assisting supply line pressure drop feedback control system (including motor 114 and pump 118) and some other components (check valves 40, 44, and 174). The variable displacement motor 170 is powered by the hydraulic accumulator 122 through a shut-off valve 297 which is basically controlled by pressure signal $P_{O2}$. While this pressure signal is comparatively small, the shut-off valve 297 is closed. As signal $P_{O2}$ is further raising-up, the shut-off valve 297 is open, provided that there is still enough energy stored in the hydraulic accumulator 122.

The variable displacement means 99 of motor 170 are constructed to make-up a displacement feedback control system including a variable displacement mechanism (of motor 170) and employing a displacement feedback control errow signal $\Delta d$. This errow signal is generated in accordance with a difference between a command-displacement signal $d_o = C_p \cdot P_{O2}$ (where $C_p$ is a constant coefficient) and a mechanism displacement (feedback signal) $d_1$ of the variable displacement mechanism of motor 170. A pressure-displacement transducer converting the pressure signal $P_{O2}$ into the proportional command-displacement signal $d_o = C_p \cdot P_{O2}$ is included into the variable displacement means 99 of motor 170. This transducer may incorporate, for example, a small spring-loaded hydraulic cylinder actuated by the pressure signal $P_{O2}$. The displacement feedback control errow signal $\Delta d = d_o - d_1$ is implemented for modulating the variable displacement mechanism of motor 170 for regulating the mechanism displacement $d_1$ of the variable displacement mechanism of motor 170 in accordance with the command signal $d_o$ (and hence, in accordance with the pressure rate $P_{O2} = d_o C_p$ in the motor line L1). It should be emphasized that the displacement feedback control system, which is well known in the art, is, in fact, the position feedback control system and that, therefore, the general position feedback control technique, which is characterised above with respect to the fluid motor position feedback control system, is also basically applicable to the displacement feedback control system.

In general, the displacement feedback control circuitry of motor 170 is adjusted so that, while the pressure $P_{O2}$ in the motor line L1 is comparatively low, this circuitry is not operative and $d_1 \cong 0$. As the pressure $P_{O2}$ in the motor line L1 is further raising-up, the displacement $d_1$ of motor 170 is increasing accordingly, so that the total accelerating torque is properly distributed between the fluid motor 1 and the supplementary motor 170. The use of motor 170 makes it possible to substantially increase the available (total) accelerating torque of the wheeled vehicle.

Note that the use of motor 170 on small displacements should be avoided for as much as possible. Note also that a significant dynamic performance superiority must be provided for the displacement feedback control system against the primary supply line pressure drop feedback control system, in order to prevent their substantial dynamic operation interference. The concept of providing "a significant dynamic performance superiority" have been already generally introduced before and is further readily applicable to the displacement feedback control system versus the primary supply line pressure drop feedback control system.

Figure 29:
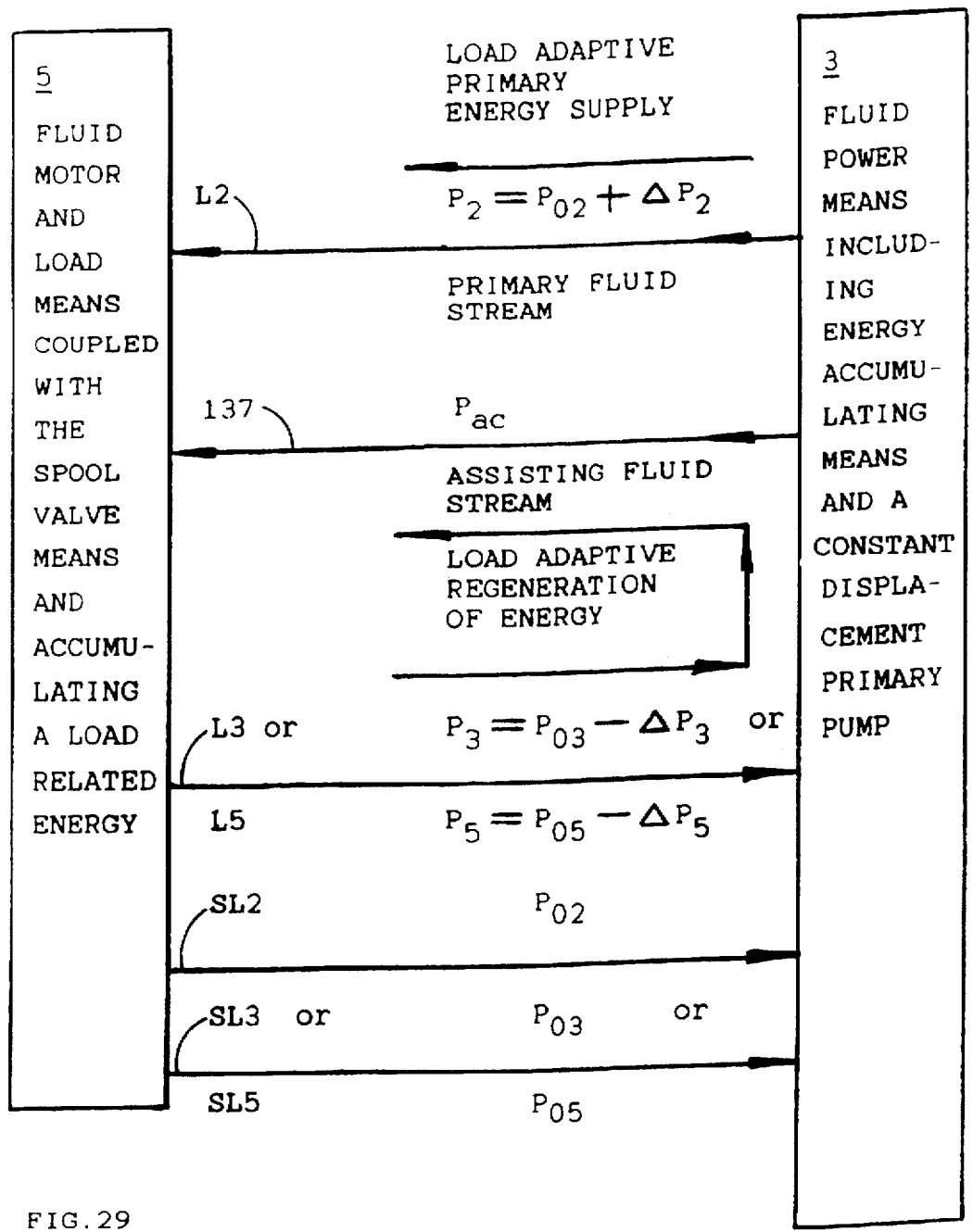
FIG. 29 shows a generalized regenerative system having a supplementary output motor.

The related generalized schematic of FIG. 29 is derived from FIG. 15, is mostly self-explanatory, and is reflective of the facts that the assisting supply line pressure drop feedback control system is now eliminated and that pressure $P_{ac}$ from the hydraulic accumulator 122 is now applied to the supplementary output motor 170 of the fluid motor and load means.

Some other related considerations.

The schematic of FIG. 26 can be modified by changing the hybrid motor means driving pump 90. The examplified modifications are as follows.

1. The electrical motor-generator 290 and the related electrical accumulator 144 are exluded from this schematic. The constant displacement motor 300 is replaced by a variable displacement motor which is used to construct a supplementary shaft-speed feedback control system maintaining the preinstalled speed of shaft 98 when this variable displacement motor is powered by accumulator 122. As a result, the hydraulic energy of accumulator 122 is transmitted to shaft 98 in accordance with the actual energy requirement. Note that possible interference between the main shaft-speed feedback control system (of primary engine 100) and the supplementary shaft-speed feedback control system (of the variable displacement motor) is prevented by providing $$V_{CS} = V_{CM} + \Delta V$$

where:

$V_{CM}$—is a velocity command-signal for the main shaft-speed feedback control system, $V_{CS}$—is a velocity command-signal for the supplementary shaft-speed feedback control system, and $\Delta V$—is a sufficient velocity margin between these two systems.

In other words, the supplementary speed control system should actually be regulated just "slightly above" the main speed control system.

2. The primary engine 100 is excluded from the schematic of FIG. 26. In this case, the primary energy should be supplied by the electrical accumulator 144.

It should be emphasized that adaptive fluid control schematics being considered are the concept illustrating schematics only. Some design related considerations are as follows:

1. The maximum and minimum pressures in any fluid power line must be restricted.
2. The primary supply power line 54 (see FIGS. 11 to 22) can be protected by the maximum pressure relief valve. In general, the maximum pressure relief valves can also be used to protect other hydraulic lines.
3. The check valve 154 (FIGS. 20 and 22) is added to very efficiently restrict the maximum pressure in the exhaust motor line L4 by relieving an excess fluid from this line (through check valve 154) into the high-pressure hydraulic accumulator 122.
4. Similar to point 3, the check valves can be used to restrict the maximum pressure in still other power lines.
5. The check valve 155 (FIGS. 20 and 22) is added to effectively restrict the minimum pressure in the supply motor line L1 by connecting this line (through check valve 155) with the tank 62.
6. Similar to point 5, the check valves can be used to restrict the minimum pressure in still other power lines. For example, the exhaust power line L5 (or L3) should usually be connected through a check valve to the tank to avoid creating a vacuum in this line.
7. The oil tank capacity can often be reduced, the oil cooling system can often be eliminated.
8. The oil tank 62 can often be replaced by a low-pressure hydraulic accumulator (accompanied by a small-supplementary tank).
9. The oil tank 62 can also be supplemented by a low-pressure centrifugal pump.

Regenerative adaptive fluid control versus Non-regenerative adaptive fluid control.

As it was already mentioned before, there are basically two types of the two-way load adaptive fluid motor control systems. The non-regenerative adaptive fluid motor control systems are equipped with an exhaust line pressure drop feedback control system including an exhaust line pressure drop regulator. On the other hand, the regenerative adaptive fluid motor control systems are equipped with an energy recuperating pressure drop feedback control system including an exhaust line energy recuperating means.

The above description is presented in a way of transition from the non-regenerative adaptive fluid motor control to the regenerative adaptive fluid motor control. Note that the resulted regenerative adaptive fluid control schematics being considered are, in fact, convertable. The transition from these schematics back to the non-regenerative adaptive fluid control can generally be accomplished by replacing the energy recuperating pressure drop feedback control system (and the related energy regenerating circuitry) by the exhaust line pressure drop feedback control system including the exhaust line pressure drop regulator.

While my above description contains many specificities, those should not be construed as limitations on the scope of the invention, but rather as an examplification of some preferred embodiments thereof. Many other variations are possible. For example, the schematic shown on FIG. 4 can be easily modified to convert the five-way valve 2 to the six-way valve by separating the supply power line L6 from the supply power line L2. The separated line L6 can be then connected directly to the line 54 of the additional hydraulic power supply 50 shown on FIG. 2.

Various modifications and variations, which basically rely on the teachings through which this disclosure has advanced the art, are properly considered within the scope of this invention as defined by the appended claims and their legal equivalents.

What is claimed is:

1. A regenerative adaptive fluid motor control method comprising the steps of:

constructing a fluid motor control system including fluid motor and load means, spool valve means, and fluid power means;

said fluid motor and load means including fluid motor means and motor load means and accumulating a load related energy;

said spool valve means having at least three fluid power lines including a motor line conducting a motor fluid flow to or a motor fluid flow from said fluid motor means of said fluid motor and load means, a supply power line, and an exhaust power line;

said fluid power means including at least one primary constant displacement pump generating a primary pressurized fluid stream being implemented for powering said supply power line of said spool valve means;

introducing an exhaust line energy recuperating means for varying a counterpressure rate in said exhaust power line and for recuperating said load related energy of said fluid motor and load means;

constructing an energy recuperating pressure drop feedback control system including said exhaust line energy recuperating means;

regulating an exhaust fluid pressure drop across said spool valve means by said energy recuperating pressure drop feedback control system by varying said counterpressure rate in said exhaust power line by said exhaust line energy recuperating means;

constructing a load adaptive energy regenerating system including first load adaptive energy converting means, energy accumulating means, and second load adaptive energy converting means;

said first load adaptive energy regenerating system including first load adaptive energy converting means, energy accumulating means, and second load adaptive energy converting means;

said first load adaptive energy converting means including said energy recuperating pressure drop feedback control system;

providing a load adaptive regeneration of said load related energy of said fluid motor and load means by said load adaptive energy regenerating system by converting said load related energy through said first load adaptive energy converting means including said energy recuperating pressure drop feedback control system to a recuperated energy of said energy accumulating means, by storing said recuperated energy by said energy accumulating means, and by converting said recuperated energy through said second load adaptive energy converting means to a regenerated energy reusable by said fluid motor and load means;

facilitating said load adaptive regeneration of said load related energy of said fluid motor and load means by regulating said exhaust fluid pressure drop across said spool valve means by said energy recuperating pressure drop feedback control system;

introducing a primary supply line pressure drop regulator bypassing said primary constant displacement pump;

constructing a primary supply line pressure drop feedback control system including said primary constant displacement pump and said primary supply line pressure drop regulator;

regulating a primary supply fluid pressure drop across said spool valve means by said primary supply line pressure drop feedback control system by varying a primary pressure rate of said primary pressurized fluid stream by said primary supply line pressure drop regulator.

2. The method according to claim 1, wherein said exhaust line energy recuperating means includes an exhaust line variable displacement motor being powered by said exhaust power line, and wherein varying said counterpressure rate in said exhaust power line is accomplished by an exhaust line variable displacement means of said exhaust line variable displacement motor.

3. The method according to claim 1, wherein said exhaust line energy recuperating means includes an exhaust line fluid motor being powered by said exhaust power line and driving an exhaust line variable displacement pump, and wherein varying said counterpressure rate in said exhaust power line is accomplished by an exhaust line variable dispalcement means of said exhaust line variable displacement pump.

4. The method according to claim 1, wherein said fluid motor means include at least one hydraulic cylinder having at least one loadable chamber, and wherein said load related energy of said fluid motor and load means includes a compressed fluid energy of said loadable chamber of said hydraulic cylinder.

5. The method according to claim 1, wherein said motor load means include a frame of a hydraulic press, wherein said fluid motor means include at least one hydraulic cylinder of said hydraulic press, wherein said hydraulic cylinder includes a loadable chamber being loaded against said frame of said hydraulic press, and wherein said load related energy of said fluid motor and load means includes a compressed fluid energy of said loadable chamber of said hydraulic cylinder of said hydraulic press.

6. The method according to claim 1, wherein said motor load means include a mass load of said fluid motor means, and wherein siad load related energy of said fluid motor and load means includes a mechanical energy of a mass of said mass load.

7. The method according to claim 1, wherein said motor load means include a mass of a wheeled vehicle, wherein said fluid motor means are loaded by said mass of said wheeled vehicle, and wherein said load related energy of said fluid motor and load means includes a mechanical energy of said mass of said wheeled vehicle.

8. The method according to claim 1, wherein said fluid power means include a plurality of primary constant displacement pumps selectable to generate said primary pressurized fluid stream being implemented for powering said supply power line of said spool valve means, and wherein a total fluid flow rate of said primary constant displacement pumps selected to generate said primary pressurized fluid stream is regulated approximately in accordance with a spool displacement signal of said spool valve means.

9. The method according to claim 1, wherein said fluid motor means include a variable displacement motor, and wherein said method further comprising:

constructing a displacement feedback control system including a variable displacement mechanism of said variable displacement motor;

regulating a mechanism displacement of said variable displacement mechanism of said variable displacement motor by said displacement feedback control system at least approximately in accordance with a mechanism displacement command signal being correlated with a spool displacement signal of said spool valve means.

10. The method according to claim 1, further comprising:

constructing a fluid motor output feedback control system including said fluid motor control system and having output feedback control means measuring a motor output of said fluid motor means and producing an output feedback control error signal;

regulating said motor output of said fluid motor means by said fluid motor output feedback control system by modulating said spool valve means by said output feedback control error signal;

preventing a substantial dynamic operation interference between regulating said exhaust fluid pressure drop and regulating said motor output by providing a significant dynamic performance superiority for said energy recuperating pressure drop feedback control system against said fluid motor output feedback control system by providing either a significant frequency-response superiority or a significant final-transient-time superiority for said energy recuperating pressure drop feedback control system against said fluid motor output feedback control system;

preventing a substantial dynamic operation interference between regulating said primary supply fluid pressure drop and regulating said motor output by providing a significant dynamic performance superiority for said primary supply line pressure drop feedback control system against said fluid motor output feedback control system by providing either a significant frequency-response superiority or a significant final-transient-time superiority for said primary supply line pressure drop feedback control system against said fluid motor output feedback control system.

11. The method according to claim 10, wherein said fluid motor output feedback control system is represented by a fluid motor position feedback control system, wherein said output feedback control means are represented by position feedback control means, wherein said motor output is represented by a motor position, and wherein said output feedback control error signal is represented by a position feedback control error signal.

12. The method according to claim 1, wherein said energy accumulating means are implemented for powering an assisting variable delivery fluid power supply generating an assisting pressurized fluid stream being implemented for powering said fluid motor means through said spool valve means, wherein said second load adaptive energy converting means include an assisting supply line pressure drop feedback control system containing said assisting variable delivery fluid power supply and regulating an assisting supply fluid pressure drop across said spool valve means by varying an assisting pressure rate of said assisting pressurized fluid stream by an assisting variable delivery means of said assisting variable delivery fluid power supply, and wherein said method further comprising:

accommodating said load adaptive regeneration of said load related energy of said fluid motor and load means by correlating said primary pressure rate of said primary pressurized fluid stream with said assisting pressure rate of said assisting pressurized fluid stream by regulating said primary supply fluid pressure drop across said spool valve means and regulating said assisting supply fluid pressure drop across said spool valve means by said primary supply line pressure drop feedback control system and said assisting supply line pressure drop feedback control system, respectively.

13. A regenerative adaptive fluid motor control system comprising:

a fluid motor control system including fluid motor and load means, spool valve means, and fluid power means;

said fluid motor and load means including fluid motor means and motor load means and accumulating a load related energy;

said spool valve means having at least three fluid power lines including a motor line conducting a motor fluid flow to or a motor fluid flow from said fluid motor means of said fluid motor and load means, a supply power line, and an exhaust power line;

said fluid power means including at least one primary constant displacement pump generating a primary pressurized fluid stream being implemented for powering said supply power line of said spool valve means;

an exhaust line energy recuperating means for varying a counterpressure rate in said exhaust power line and for recuperating said load related energy of said fluid motor and load means;

an energy recuperating pressure drop feedback control system including said exhaust line energy recuperating means and operable to regulate an exhaust fluid pressure drop across said spool valve means by varying said counterpressure rate in said exhaust power line by said exhaust line energy recuperating means;

a load adaptive energy regenerating system including first load adaptive energy converting means, energy accumulating means, and second load adaptive energy converting means;

said first load adaptive energy converting means including said energy recuperating pressure drop feedback control system and operable to convert said load related energy of said fluid motor and load means to a recuperated energy of said energy accumulating means for storing and subsequent use of said recuperated energy;

said second load adaptive energy converting means operable to convert said recuperated energy of said energy accumulating means to a regenerated energy reusable by said fluid motor and load means;

a primary supply line pressure drop regulator bypassing said primary constant dispalcement pump;

a primary supply line pressure drop feedback control system including said primary constant displacement pump and said primary supply line pressure drop regulator and operable to regulate a primary supply fluid pressure drop across said spool valve means by varying a primary pressure rate of said primary pressurized fluid stream by said primary supply line pressure drop regulator.

14. The system according to claim 13, wherein said energy accumulating means are implemented for powering an assisting variable delivery fluid power supply generating an assisting pressurized fluid stream being implemented for powering said fluid motor means through said spool valve means, and wherein said second load adaptive energy converting means include an assisting supply line pressure drop feedback control system containing said assisting variable delivery fluid power supply and operable to regulate an assisting supply fluid pressure drop across said spool valve means by varying an assisting pressure rate of said assisting pressurized fluid stream by an assisting variable delivery means of said assisting variable delivery fluid power supply.

15. A regenerative adaptive fluid motor control method comprising the steps of:

constructing a fluid motor control system including fluid motor and load means, spool valve means, and fluid power means;

said fluid motor and load means including fluid motor means and motor load means and accumulating a load related energy;

said spool valve means having at least three fluid power lines including a motor line conducting a motor fluid flow to or a motor fluid flow from said fluid motor means of said fluid motor and load means, a supply power line, and an exhaust power line;

said fluid power means including energy accumulating means being implemented for powering at least one constant displacement pump generating a pressurized fluid stream being implemented for powering said supply power line of said spool valve means;

introducing an exhaust line energy recuperating means for varying a counterpressure rate in said exhaust power line and for recuperating said load related energy of said fluid motor and load means;

constructing an energy recuperating pressure drop feedback control system including said exhaust line energy recuperating means;

regulating an exhaust fluid pressure drop across said spool valve means by said energy recuperating pressure drop feedback control system by varying said counterpressure rate in said exhaust power line by said exhaust line energy recuperating means;

introducing a supply line pressure drop regulator bypassing said constant displacement pump;

constructing a supply line pressure drop feedback control system including said constant displacement pump and said supply line pressure drop regulator;

regulating a supply fluid pressure drop acorss said spool valve means by said supply line pressure drop feedback control system by varying a pressure rate of said pressurized fluid stream by said supply line pressure drop regulator;

constructing a load adaptive energy regenerating system including first load adaptive energy converting means, said energy accumulating means, and second load adaptive energy converting means;

said fist load adaptive energy converting means including said energy recuperating pressure drop feedback control system;

said second load adaptive energy converting means including said supply line pressure drop feedback control system;

prodividing a load adaptive regeneration of said load related energy of said fluid motor and load means by said load adaptive energy regenerating system by converting said load related energy through said first load adaptive energy converting means including said energy recuperating pressure drop feedback control system to a recuperated energy of said energy accumulating means, by storing said recuperated energy by said energy accumulating means, and by converting said recuperated energy through said second load adaptive energy converting means including said supply line pressure drop feedback control system to a regenerated energy of said pressurized fluid stream being implemented for powering said supply power line of said spool valve means;

facilitating said load adaptive regeneration of said load related energy of said fluid motor and load means by regulating said exhaust fluid pressure drop across said spool valve means and regulating said supply fluid pressure drop across said spool valve means by said energy recuperating pressure drop feedback control system and said supply line pressure drop feedback control system, respectively.

16. The method according to claim 15, wherein said fluid power means include a primary power supply being implemented for powering said constant displacement pump, and wherein a primary energy of said pressurized fluid stream is supplied by said primary power supply through said constant displacement pump.

17. The method according to claim 15, wherein said fluid power means include a primary power supply being implemented for powering said energy accumulating means, and wherein a primary energy of said pressuried fluid stream is supplied by said primary power supply through said energy accumulating means.

18. The method according to claim 15, wherein said fluid power means include a plurality of constant displacement pumps selectable to generate said pressurized fluid stream being implemented for powering said supply power line of said spool valve means, and wherein a total fluid flow rate of said constant displacement pumps selected to generate said pressurized fluid stream is regulated approximately in accordance with a spool displacement signal of said spool valve means.

19. The method according to claim 15, further comprising:

constructing a fluid motor output feedback control system including said fluid motor control system and having output feedback control means measuring a motor output of said fluid motor means and producing an output feedback control error signal;

regulating said motor output of said fluid motor means by said fluid motor output feedback control system by modulating said spool valve means by said output feedback control error signal;

preventing a substantial dynamic operation interference between regulating said exhaust fluid pressure drop and regulating said motor output by providing a significant dynamic performance superiority for said energy recuperating pressure drop feedback control system against said fluid motor output feedback control system by providing either a significant frequency-response superiority or a significant final-transient-time superiority for said energy recuperating pressure drop feedback control system against said fluid motor output feedback control system;

preventing a substantial dynamic operation interference between regulating said supply fluid pressure drop and regulating said motor output by providing a significant dynamic performance superiority for said supply line pressure drop feedback control system against said fluid motor output feedback control system by providing either a significant frequency-response superiority or a significant final-transient-time superiority for said supply line pressure drop feedback control system against said fluid motor output feedback control system.

20. The method according to claim 19, wherein said fluid motor output feedback control system is represented by a fluid motor position feedback control system, wherein said output feedback control means are represented by position feedback control means, wherein said motor output is represented by a motor position, and wherein said output feedback control error signal is represented by a position feedback control error signal.

21. A regenerative adaptive fluid motor control system comprising:

a fluid motor control system including fluid motor and load means, spool valve means, and fluid power means;

said fluid motor and load means including fluid motor means and motor load means and accumulating a load related energy;

said spool valve means having at least three fluid power lines including a motor line conducting a motor fluid flow to or a motor fluid flow from said fluid motor means of said fluid motor and load means, a supply power line, and an exhaust power line;

said fluid power means including energy accumulating means being implemented for powering at least one constant displacement pump generating a pressurized fluid stream being implemented for powering said supply power line of said spool valve means;

an exhaust line energy recuperating means for varying a counterpressure rate in said exhaust power line and for recuperating said load related energy of said fluid motor and load means;

an energy recuperating pressure drop feedback control system including said exhaust line energy recuperating means and operable to regulate an exhaust fluid pressure drop across said spool valve means by varying said counterpressure rate in said exhaust power line by said exhaust line energy recuperating means;

a supply line pressure drop regulator bypassing said constant displacement pump;

a supply line pressure drop feedback control system including said constant displacement pump and said supply line pressure drop regulator and operable to regulate a supply fluid pressure drop across said spool valve means by varying a pressure rate of said pressurized fluid stream by said supply line pressure drop regulator;

a load adaptive energy regenerating system including first load adaptive energy converting means, said energy accumulating means, and second load adaptive energy converting means;

said first load adaptive energy converting means including said energy recuperating pressure drop feedback control system and operable to convert said load related energy of said fluid motor and load means to a recuperated energy of said energy accumulating means for storing and subsequent use of said recuperated energy;

said second load adaptive energy converting means including said supply line pressure drop feedback control system and operable to convert said recuperated energy of said energy accumulating means to a regenerated energy of said pressurized fluid stream being implemented for powering said supply power line of said spool valve means.

\* \* \* \* \*